(12) United States Patent
Moore et al.

(10) Patent No.: US 12,496,553 B2
(45) Date of Patent: Dec. 16, 2025

(54) APPARATUS AND METHOD FOR MEDIATION OF PFAS CONTAMINATION IN AN ENVIRONMENT

(71) Applicants: Randall P. Moore, Powell, TN (US); Kevin B. Jackson, Knoxville, TN (US)

(72) Inventors: Randall P. Moore, Powell, TN (US); Kevin B. Jackson, Knoxville, TN (US)

( * ) Notice: Subject to any disclaimer, the term of this patent is extended or adjusted under 35 U.S.C. 154(b) by 1233 days.

(21) Appl. No.: 17/237,040

(22) Filed: Apr. 21, 2021

(65) Prior Publication Data
US 2022/0135446 A1 May 5, 2022

Related U.S. Application Data

(63) Continuation-in-part of application No. 17/087,728, filed on Nov. 3, 2020, now Pat. No. 12,172,909.

(51) Int. Cl.
*B01D 61/42* (2006.01)
*B01D 61/46* (2006.01)
(Continued)

(52) U.S. Cl.
CPC ......... *B01D 61/422* (2013.01); *B01D 61/461* (2022.08); *B01D 69/02* (2013.01);
(Continued)

(58) Field of Classification Search
CPC .............. C02F 1/4693; C02F 2301/08; C02F 2101/14; C02F 2101/36; C02F 2101/363;
(Continued)

(56) References Cited

U.S. PATENT DOCUMENTS

| | | |
|---|---|---|
| 7,074,316 B2 | 7/2006 | Haibara |
| 9,957,172 B2 | 5/2018 | Niu |

(Continued)

FOREIGN PATENT DOCUMENTS

| | | |
|---|---|---|
| EP | 3390285 B1 | 10/2018 |
| EP | 3895817 A1 | 10/2021 |

(Continued)

OTHER PUBLICATIONS

Chemosphere vol. 232, Oct. 2019, pp. 224-231;Chemosphere—Electrodialytic per- and polyfluoroalkyl substances (PFASs) removal mechanism for contaminated soil.

(Continued)

*Primary Examiner* — Joshua L Allen
(74) *Attorney, Agent, or Firm* — MARK A. LITMAN & ASSOCIATES, P.A.

(57) ABSTRACT

A method of moderating concentration of at least highly fluorinated alkyl materials (e.g., molecules) from a contaminated aqueous feed liquid containing an original composition of between 5 parts/trillion and 3000 parts/billion of the at least highly fluorinated materials per liter of water into an aqueous electronic separator having multiple chambers including a feed chamber having a liquid exit port from which a mediated aqueous contaminated feed liquid exits and a liquid input port into which the contaminated aqueous feed liquid enters the feed chamber; an anodic electrode chamber filled with an aqueous anodic liquid; and a cathodic electrode chamber filled with an aqueous cathodic liquid; wherein the feed chamber is between and adjacent to the anodic electrode chamber and the cathodic electrode chamber and the feed chamber is separated from each of the anodic electrode chamber and the cathodic electrode chamber by at least one semipermeable membrane.

19 Claims, 21 Drawing Sheets

(51) Int. Cl.
*B01D 69/02* (2006.01)
*C02F 1/469* (2023.01)
*C02F 101/14* (2006.01)
*C02F 101/36* (2006.01)

(52) U.S. Cl.
CPC ........ *C02F 1/4693* (2013.01); *B01D 2325/00* (2013.01); *B01D 2325/20* (2013.01); *C02F 2101/14* (2013.01); *C02F 2101/36* (2013.01)

(58) Field of Classification Search
CPC .......... C02F 1/4698; C02F 2201/46115; C02F 2201/4613; C02F 2201/46135; B01D 61/42; B01D 61/44; B01D 61/422; B01D 61/461; B01D 69/02; B01D 2325/00; B01D 2325/20; Y02W 10/37
See application file for complete search history.

(56) References Cited

U.S. PATENT DOCUMENTS

| | | | |
|---|---|---|---|
| 10,734,672 | B2 | 8/2020 | Chen |
| 2008/0023334 | A1 | 1/2008 | Nakagawa |
| 2015/0291452 | A1* | 10/2015 | Jikihara ............... B01D 61/463 |
| 2019/0185351 | A1 | 6/2019 | Huang |
| 2019/0185352 | A1 | 6/2019 | Chiang |
| 2021/0323848 | A1 | 10/2021 | Schuelke |
| 2021/0379602 | A1 | 12/2021 | Fan |
| 2021/0387874 | A1* | 12/2021 | Lee ......................... B01D 65/08 |
| 2022/0009812 | A1* | 1/2022 | Hill ............................ C02F 9/00 |
| 2022/0220012 | A1* | 7/2022 | Ben Salah ................ C02F 1/66 |
| 2022/0298029 | A1* | 9/2022 | Kullberg ............... B01D 61/16 |

FOREIGN PATENT DOCUMENTS

| | | |
|---|---|---|
| WO | WO2021151195 A1 | 8/2021 |
| WO | WO2021195134 A2 | 9/2021 |

OTHER PUBLICATIONS

Degree Project in Environmental Engineering,, Second Cycle, 30 Credits Stockholm, Sweden 2018 Electrodialytic Remediation of PFAS-Contaminated Soil Georgios Niarchos et al.

* cited by examiner

APPARATUS AND METHOD FOR MEDIATION OF PFAS CONTAMINATION IN AN ENVIRONMENT

RELATED APPLICATIONS DATA

The present application claims priority as a Continuation-in-Part under 35 U.S.C. 120 from U.S. patent application Ser. No. 17/087,728, filed 3 Nov. 2020 and titled "APPARATUS AND METHOD FOR MEDIATION OF PFAS CONTAMINATION IN AN ENVIRONMENT." That Application is incorporated herein in its entirety by reference.

BACKGROUND OF THE INVENTION

1. Field of the Invention

The present invention relates a pre-treatment technology to remove PFAS from contaminated environments including ground waste, aerial waste and most importantly industrial wastewaters. This inventive technology is referred to as the Aqueous Electrostatic Concentrator (AEC).

2. Background of the Art

Perfluoroalkyl and polyfluoroalkyl substances (PFAS) are a class of man-made compounds that have been used to manufacture consumer products and industrial chemicals, including, inter alia, aqueous film forming foams (AFFFs), stain resistant treatments, motor coolant, anti-slip surfaces and the like. AFFFs have been the product of choice for firefighting at military and municipal fire training sites around the world. AFFFs have also been used extensively at oil and gas refineries for both fire training and firefighting exercises. AFFFs work by blanketing spilled oil/fuel, cooling the surface, and preventing re-ignition, PFAS in AFFFs have contaminated the groundwater at many of these sites and refineries, including more than 100 U.S. Air Force sites.

PFAS may be used as surface treatment/coatings in consumer products such as carpets, upholstery, stain resistant apparel, cookware, paper, packaging, and the like, and may also be found in chemicals used for chemical plating, electrolytes, lubricants, and the like, which may eventually end up in the water supply.

PFAS are bio-accumulative in wildlife and humans because they typically remain in the body for extended periods of time. Laboratory PFAS exposure studies on animals have shown problems with growth and development, reproduction, and liver damage. In 2016, the U.S. Environmental Protection Agency (EPA) issued the following health advisories (HAs) for perfluorooctanesulfonic acid (PFOS) and perfitioroortanoic acid (PFOA): 0.07 µg/L for both the individual constituents and the sum of PFOS and PFOA concentrations, respectively. Additionally, PFAS are highly water soluble in water, result in large, dilute plumes, and have a low volatility.

PFAS are very difficult to treat largely because they are extremely stable compounds which include carbon-fluorine bonds. Carbon fluorine bonds are the strongest known bonds in nature and are highly resistant to breakdown.

The vast majority of available conventional water treatment systems and methods to remove PFAS from water have proven to be ineffective. Conventional activated carbon adsorption system and methods to remove PFAS from water have shown to be somewhat effective on the longer-chain PFAS, but have difficulty in removing branched and shorter chain compounds.

Conventional anion exchange treatment systems and methods typically employ anion exchange resin where positively charged anion exchange resin beads are disposed in a lead vessel which receives a flow of water contaminated with anionic contaminants, such as PFAS. The negatively charged contaminants are trapped by the positively charged resin beads and clean water flows out of the lead anion exchange vessel into a lag vessel, also containing anion exchange resin beads. A sample tap is frequently used to determine when the majority of the anion exchange beads in the lead exchange vessel have become saturated with contaminants. When saturation of the resin anion exchange beads is approached, a level of contaminants will be detected in the effluent tap. When this happens, the lead vessel is taken off line and the contaminated water continues flowing to the lag vessel which now becomes the lead vessel. The lead-lag vessel configuration ensures that a high level of treatment is maintained at all times.

As discussed above, some conventional anion exchange resins can also be used to remove PFAS from water. A number of known methods exist to regenerate the anion exchange beads in the anion exchange vessel. Some known methods rely on flushing the resin with a brine or caustic solution. Other known methods may include the addition of solvents, such as methanol or ethanol, to enhance the removal of the PFAS trapped on the anion exchange beads. Effective resin regeneration has been demonstrated by passing a solvent (e.g., methanol or ethanol), blended with a sodium chloride or sodium hydroxide solution, through the resin. However, such methods may generate a large amount of toxic regenerant solution which must be disposed of at significant expense.

Du et al., Adsorption Behavior and Mechanism of Perfluorinated Compounds on Various Adsorbents—A Review, J. Haz. Mat. 274, pp. 443-454 (2014), incorporated by reference herein, discloses a need to further treat the waste regenerant solution to concentrate the PFAS and reduce the volume of waste. This is a good step, because resin regeneration produces a significant volume of toxic waste.

Published US Patent Document 2019/0185352 (Chiang) discloses electrochemical oxidation of PFAS in an effluent stream after reconcentration. This document is incorporated by reference in its entirety herein.

The known methods for removing PFAS from water discussed above typically do not optimize the anion exchange resin and may have limited capacity for removing PFAS mass. Such known methods may also incompletely regenerate the anion exchange resin by attempting to desorb the PFAS from the resin. Such known methods may incompletely regenerate the anion exchange resin which may lead to a loss of capacity, otherwise known as active sites, during each successive loading and regeneration cycle. This cumulative buildup of PFAS on the ion exchange resin is often referenced to as a "heel," and results in reduced treatment effectiveness as the heel builds up over time. Such known methods may also not reclaim and reuse the spent regenerant solution which may increase the amount spent regenerant solution with removed PFAS therein. This increases the amount of toxic spent regenerant solution with PFAS, which must be disposed of at significant expense.

Conventional systems and methods for attempting to remove PFAS also include biological treatment, air stripping, reverse osmosis, and advanced oxidation. All of these conventional techniques are ineffective and/or extremely expensive.

SUMMARY OF THE INVENTION

A method and system moderates concentration of at least highly fluorinated alkyl materials from a contaminated aqueous feed liquid containing as little as 5 to 70 parts per trillion (ppt) in treating water that ultimately may be potable in its use, and in solid remediation or water mediation for non-potable use, the system is preferably used with the liquid concentration less than 10 parts/billion, or even at least 20 parts per billion of the at least highly fluorinated materials per liter of water into an aqueous electronic separator, wherein the aqueous electronic separator comprises at least three chambers, a feed chamber having a liquid exit port from which a mediated aqueous contaminated feed liquid exits and a liquid input port into which the contaminated aqueous feed liquid enters the feed chamber; an anodic electrode chamber filled with an aqueous anodic liquid; and a cathodic electrode chamber filled with an aqueous cathodic liquid. The feed chamber is between and adjacent to the anodic electrode chamber and the cathodic electrode chamber and the feed chamber is separated from each of the anodic electrode chamber and the cathodic electrode chamber by at least one semipermeable membrane; and wherein the process comprises:
  i) feeding the contaminated aqueous feed liquid into the feed chamber through the liquid input port;
  ii) feeding a second aqueous liquid into and through the anodic electrode chamber in contact with an anodic electrode;
  iii) feeding a third aqueous liquid into and through the cathodic electrode chamber in contact with a cathodic electrode;
  iv) applying a current between the anodic electrode chamber and the cathodic electrode chamber and across the feed chamber from a first electrode in the anodic electrode chamber to a second electrode in the cathodic electrode chamber;
  v) the current driving at least highly fluorinated alkyl materials from the feed liquid into and through the semipermeable membrane between the feed chamber and the anodic electrode chamber and into the second aqueous liquid thereby forming the mediated feed solution within the feed chamber; and
  vi) removing the mediated feed liquid through the liquid exit port with the mediated feed liquid having less than 10 parts per billion of the at least highly fluorinated materials per liter of water.

The invention includes a method of moderating concentration of at least highly fluorinated alkyl materials from a contaminated aqueous feed liquid containing an original concentration of between 5 parts per trillion and 3000 parts per billion of the at least highly fluorinated molecules in water into an aqueous electronic separator as described herein.

A practice of removing voltage or reducing voltage potential and capacitance at or near the surface of semipermeable membrane adjacent to the aqueous liquid with the contaminating PFAS, referred to herein often as an anion exchange membrane (AEM) in a method and system moderates concentration of at least highly fluorinated alkyl materials from a contaminated aqueous feed liquid (such as the BioLargo Aqueous Electrostatic Concentrator (AEC), reduces the energy potential within the system and extends the useful life of the semipermeable membrane (e.g., the AEM).

DETAILED DESCRIPTION OF THE INVENTION

Figure 1:
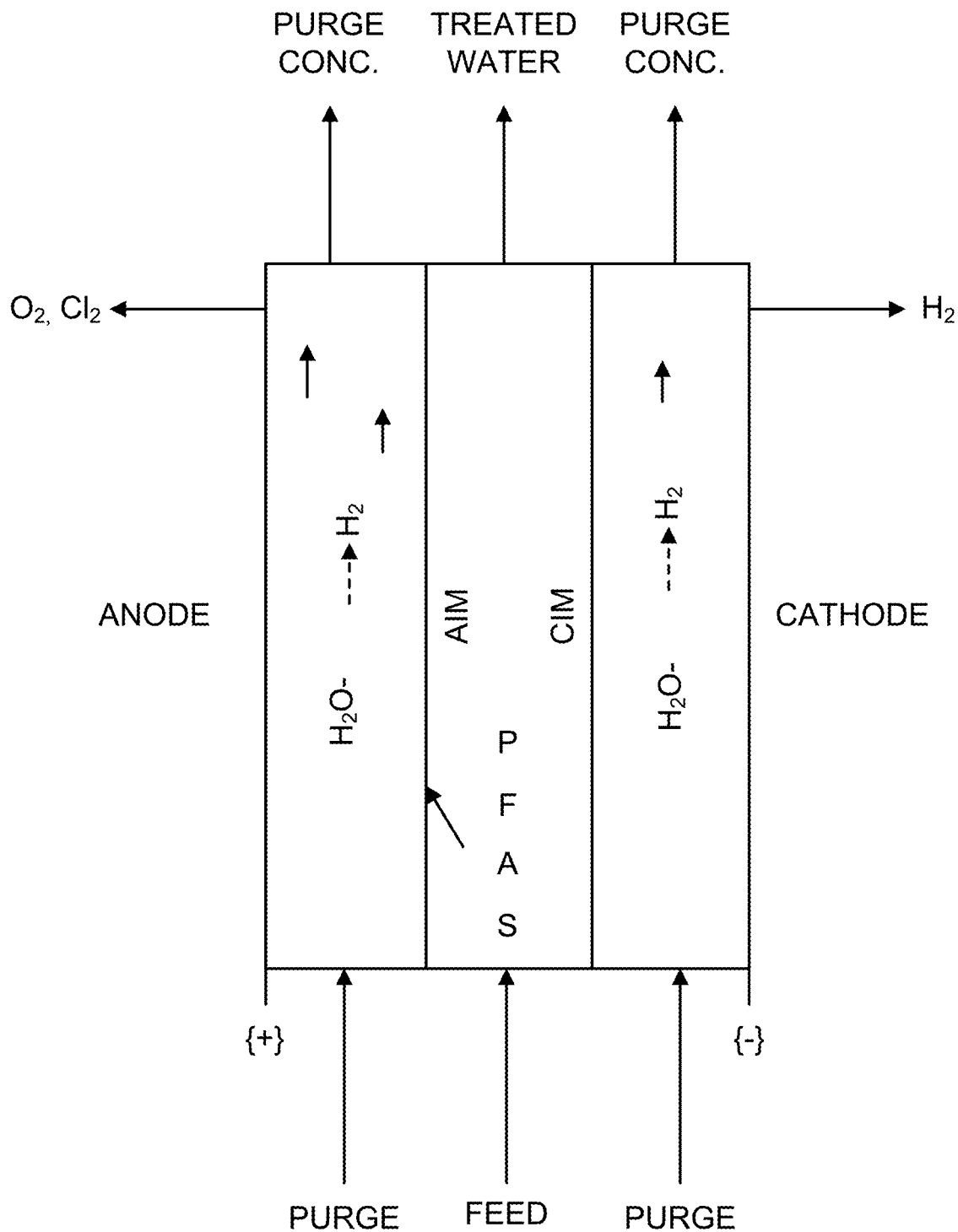
FIG. 1 is a schematic of a cross-section of an AEC of the present technology.

A method and system mediate concentration of at least highly fluorinated alkyl materials from a contaminated aqueous feed liquid containing as little as less than 67 or 70 parts per trillion or for at least 20 parts per billion of the at least highly fluorinated materials per liter of water into an aqueous electronic separator. The term or acronym "PFAS" stands for "poly- and perfluoroalkyl substances." No single chemical within the PFAS class can be both polyfluorinated and perfluorinated, so by definition "PFAS" is plural and inclusive of multiple compounds. Some authors elect to add a small "s" to this acronym (PFASs) to emphasize the fact that it is plural, but it is not needed. When referring to a single chemical within the PFAS class, it is usually more accurate to simply name that specific chemical.

There are many different types and classes of PFAS that are used in commerce and have found their unwelcomed way into the environment. It is the monomeric or dimeric PFAS materials that are most damaging, although polymeric PFAS degrade into lower molecular weight fluorinated materials that are more damaging. Among the classes are:

Perfluoroalkyl carboxylic acids (PFCAs) having a —COOH group, such as Perfluorooctanoic acid (PFOA), $C_7F_{15}COOH$; perfluoroalkyl carboxylates (PFCAs) having a —COO— group, such as perfluorooctanoate (PFOA), $C_7F_{15}COO$; perfluoroalkane sulfonic acids (PFSAs) having a —$SO_3H$ group, such as perfluorooctane sulfonic acid (PFOS), $C_8F_{17}SO_3H$; perfluoroalkane sulfonates (PFSAs) having a —$SO_3$— group, such as perfluorooctane sulfonate, (PFOS), $C_8F_{17}SO_3$; perfluoroalkane sulfonamides, N-Alkyl perfluoroalkane sulfonamides (MeFASAs, EtFASAs, BuFASAs having a —$SO_2N(R')H$ group, where $R'=C_nH_{2n+1}$ (n=0, 1, 2, 4) N-Ethyl perfluorooctane sulfonamide (EtFOSA), $C_8F_{18}SO_2N(C_2H_5)H$, including N-Methyl perfluorooctane sulfonamide (MeFOSA), $C_8F_{18}SO_2N(CH_3)H$; perfluoroalkane sulfonamido ethanols (FASEs) and N-alkyl perfluoroalkane sulfonamido ethanols (MeFASEs, EtFASEs, BuFASEs; perfluoroalkane sulfonamido acetic acids (FASAAs) and N-alkyl perfluoroalkane sulfonamido acetic acids (MeFASAAs, EtFASAAs, BuFASAAs); perfluoroundecanoate; perfluoroundecanoic acid; perfluoroundecane sulfonate; perfluoroundecane sulfonic acid; perfluorododecanoate; perfluorododecanoic acid; perfluorohexane sulfonic acid; perfluorooctane sulfonate; perfluorooctane sulfonic acid; perfluorononanoate; perfluorooctane sulfonate; perfluorooctane sulfonic acid; perfluorodecane sulfonate; and the like. The partially chlorinated equivalents, such as monochloro equivalents such as $C_8F_{17}ClSO_2$— groups, $C_7F_{17}ClCOO$— groups; dichloro equivalents such as $C_8F_{16}C_{12}SO_2$-groups, $C_7F_{16}C_{12}COO$— groups; and the like as partially chlorinated equivalents of the perfluoroalkane and perfluoroalkyl groups.

The aqueous electronic separator may have at least three chambers, a feed chamber having a liquid exit port from which a mediated aqueous contaminated feed liquid exits and a liquid input port into which the contaminated aqueous feed liquid enters the feed chamber; an anodic electrode chamber filled with an aqueous anodic liquid; and a cathodic electrode chamber filled with an aqueous cathodic liquid. There is of course an electrode in each of the two electrode chambers. These electrodes may be constructed of any material that has the electrical or electronic properties to act as an electrode, but in view of the harsh chemical environment (with acids, fluorides and chlorides of the present technology), more resistant materials such as metals, metal alloys and the like should be used, such as, preferably only, tungsten, titanium, boron doped diamond, mixed metal oxides, silver, gold and platinum surfaces will be used. The feed chamber is between and adjacent to the anodic electrode chamber and the cathodic electrode chamber and the feed chamber is separated from each of the anodic electrode chamber and the cathodic electrode chamber by at least one semipermeable membrane. Multiple aqueous electronic separators may be used in combination to treat PFAS contaminated water, either serially (less preferred because of the efficiency of the system) or in parallel, which increases the volume of water that can be treated. The process may include, for example:

i) feeding the contaminated aqueous feed liquid into the feed chamber through the liquid input port;
ii) feeding a second aqueous liquid into and through the anodic electrode chamber in contact with an anodic electrode;
iii) feeding a third aqueous liquid into and through the cathodic electrode chamber in contact with a cathodic electrode;
iv) applying a current between the anodic electrode chamber and the cathodic electrode chamber and across the feed chamber from a first electrode in the anodic electrode chamber to a second electrode in the cathodic electrode chamber;
v) the current driving at least highly fluorinated alkyl materials from the feed liquid into and through the semipermeable membrane between the feed chamber and the anodic electrode chamber and into the second aqueous liquid thereby forming the mediated feed solution within the feed chamber; and
vi) removing the mediated feed liquid through the liquid exit port with the mediated feed liquid having less than 60 or less than 70 parts per trillion for potable liquid directing systems or less than 10 parts per billion for only mediation of the at least highly fluorinated materials per liter of water.

The above describes a relatively minimum attainable efficiency, with the system capable of addressing PFAS concentrations of 50, 75, 100, 125, 150, 175 and 200 parts per billion and more and reducing that by 70%, 75%, 80%, 85%, 90% and even 95% in a single pass at moderate flow rates (e.g., 1-100 liters/minute) and a range of currents, later discussed and evidenced.

The aqueous electrostatic concentrator (e.g., AEC) technology operates by attracting PFAS compounds toward an anode and through semipermeable membrane (e.g., an anion exchange membrane or AEM). The membranes are like those used in electronic desalination, and in that service the membranes are typically expected to achieve a service life of over three years. However, experimentation in the AEC system initially yielded useful service lives of only several days to several weeks. It was discovered by the inventor that due to the level of voltages used in the AEC and the desired, required or optimized physical spacing of the membranes from the electrodes, which can range from one (1) millimeter to ten (10) millimeters, that microscopic damage was occurring, which over time delaminated the membrane material from the polymer substrate and grew into macroscopic areas of irreparably damaged surface. This damage is likely the result of the following factors, to which theories the inventor is not bound:

Ohmic Characteristics of the AEC Cell-Damage caused by products of water electrolysis at the AEM Chlorine Generation-Damage caused by chlorine production in the anodic chamber.

Electrostatic Charge Dissipation-Accumulation of electrical charge at or near the AEM, causing transient current flow across the AEM producing damage.

Ohmic Characteristics of the AEC Cell

Figure 34:
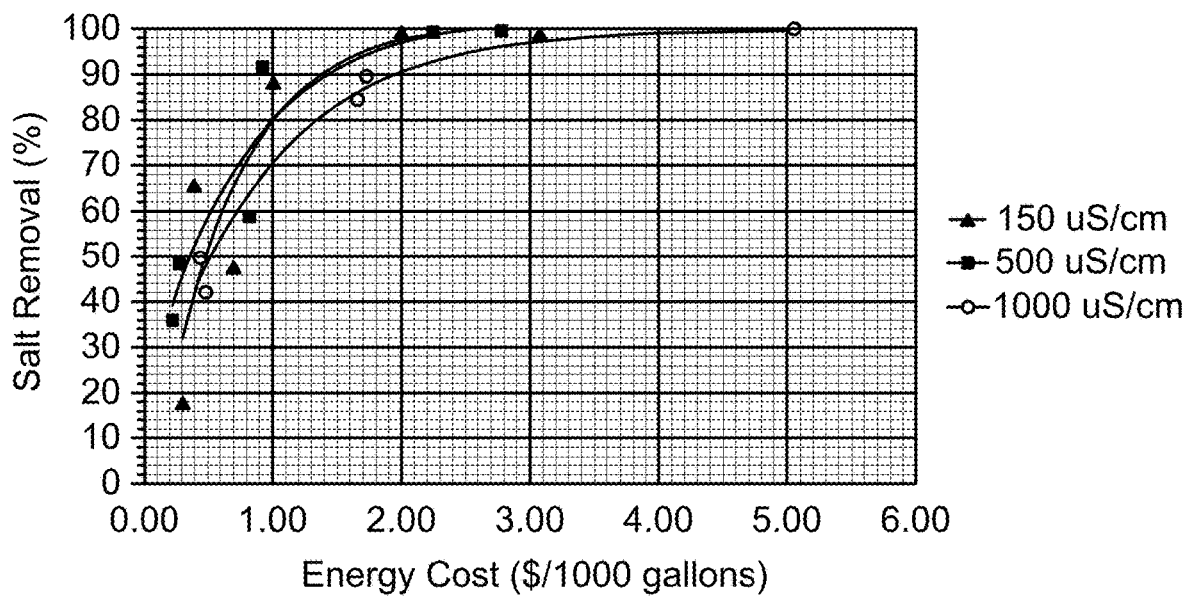
FIG. 34 shows salt removal rate as a function of energy cost.

The voltage potential applied at the AEC electrodes tends to dissipate across the AEC cell in accordance with Ohms Law. At the AEM, the voltage potential has dissipated significantly across the cell. The voltage potential across the AEM increases with applied electrode voltage. Of significance, electrolysis of water will occur around a potential difference of 1.23 volts. Other less significant electrochemically induced chemical reactions can also occur at lower voltages. The electrolysis of water at or near the AEM surface will generate chemical reactions producing products that can degrade the anode membrane material (i.e., free radicals, high and low areas of pH, etc.). As shown in FIG. 34, the electrical potential measured across the anode in a lab scale AEC unit creates conditions conducive to water electrolysis at around 20 VDC of applied voltage across a typical AEC cell. It is believed that this electrolysis at or near the membrane surface is responsible for some of the membrane damage. Evidence of such electrolysis occurring at the AEM has been identified in literature (Ref. 1, https://www.jstage.jst.go.jp/article/membrane1976/19/6/19_6_411/_pdf/-char/ja). Reducing the voltage potential at or near the membrane surface has been found in this invention to reduce the extent of or eliminate electrolysis that can damage the membrane. As the underlying electrochemical process and environment with PFAS used in the present invention is novel, the significant impact of grounding on improving the process and the useful life of the semipermeable membrane such as the AEM was not expected in advance of actual long-term performance of the system under actual working conditions in the field.

The term "semipermeable membrane" is well understood in the chemical and chemical engineering arts as a microporous film or sheet or panel that is freely permeable to water (or other solvent, especially ethyl alcohol) but is relatively impermeable to solutes, especially solutes of particular dimensions and affinities. Depending on the context, it has been used to imply impermeability to all solutes except very small uncharged molecules (for example, a cell membrane), or merely impermeability to very large molecules such as proteins (for example, a capillary membrane). In terms of the practice of the present invention, a semipermeable membrane is defined as allowing penetration and passage of water and restricting at least 95% by number of perfluoroethylacrylate molecules in a concentration of 1 part per million in water. Unless further restricted by a limitation of allowing penetration and passage of water and restricting at least 99% by number of perfluorooctylacrylate molecules from a concentration of 1 part per million in water.

Additionally, after removal of at least 1000 such molecules (which can be determined by weight measurements of concentrations in and concentrations out) and preferably at least 10,000 molecules are not only retained by the semipermeable membrane, but a reverse flow (opposite the original direction of water flow through the semipermeable membrane) of deionized water at 20 C and 20 mm Hg pressure will not remove at least 10 number percent of the PFAS molecules removed in 10 seconds. This determination can be done by recovering the reverse water flow and measuring PFAS concentration by standard analytical techniques.

Additional considerations in the process and method include wherein the semipermeable membrane has a thickness of between 40 μm and 300 μm, preferably between 50 μm and 250 μm, and more preferably between 60 μm and 200 μm. The anodic electrode and the cathodic electrode comprise a solid plate having a metal surface facing the feed chamber is structurally sound, as with silicone adhesives applied to achieve a water-tight chamber seal. The metal surface may be a solid plate of a single metal, a surface coating of the more desirable electrode metals such as tungsten, titanium, platinum and the like, or even a non-metallic carrier base (ceramic, polymeric, natural materials) having a laminated or adhered electrode layer on its surface. This thinner layer (e.g., from 3-200 microns) may be carried as an applicable layer on a substrate with an adhesive layer, or with the adhesive layer directly on the electrode layer. The adhesive may be thermal, or pressure sensitive or reactive (thermally initiated, sonically initiated, UV initiated, acid initiated, aqueous initiated or the like), but should be structurally sound as with polysiloxanes, silicone adhesives, acrylic adhesives, polyurethane adhesives and the like.

The technology may be used to address contamination issues in free flowing water, contaminated ground water, captured liquids from stacks and ventilators, and even from relatively dry ground. With dry ground, the ground may be soaked and/or washed in water, with or without additives to more efficiently pick up PFAS from the dry ground or soil. The wash water, carrying the PFAS can then be treated as any other contaminated aqueous liquid. The input or feed water in most events should be filtered to remove particulates before being put into the AEC. The filtration may be done under pressure, under settling or gravity filtration and the like.

The method may use a wide range of current, depending on fluid flow rate through the system, concentration of PFAS in the fluid to be remediated, and preservation of the metallic surfaces of the electrodes. A generic range of the current may approximately be from 0.1-300 milliamps per square centimeter, 4-250 milliamps per square centimeter, 5-200 milliamps per square centimeter, 5-100 milliamps per square centimeter and even as low as 5-25 milliamps per square centimeter across the electrodes in the system.

Electrostatic Charge Dissipation

In the AEC cell, the AEM is made of or includes a dielectric material. This will induce the accumulation of an electrical charge at the membrane surface when subject to an electric field. The excess charge, measured as capacitance, is proportional to the surface area of the membrane, the thickness of the membrane, and the permittivity of the membrane. When an electric field is applied, dielectric polarization will occur.

In addition to the above two AEM damage-causing mechanisms, it is hypothesized that electrostatic charge accumulation at the membrane surface can also cause occasional discharge, analogous to an electrical capacitor that reaches saturation and then discharges rapidly. An additional capacitive layer may also accumulate at a boundary layer consisting of semi-static, ion depleted liquid possibly mixed with entrained gases and water vapor, that forms between the bulk feed liquid and the AEM surface. A likely mechanism for discharge across this boundary is through non-homogeneities in the boundary layer that exist at the feed chamber-AEM interface. This interface is very thin, with one source documenting the thickness at 0.7 to 1.6 microns (Ref. 1). This boundary layer is caused by a phenomenon referred to as concentration polarization.

When the AEC is in operation, the AEM will develop an ion depleted boundary zone (boundary) at the membrane interface. This is the result of the selective transfer of some ionic species through the membrane (permselectivity) under the effect of the transmembrane driving forces.

In application, this depleted boundary zone drives up the electrical resistance at the interface of the membrane. For example, the conductivity in the depleted zone may be 0.6 uS/cm, whereas the bulk feed conductivity is frequently in the range of 250-700 uS/cm. Note that conductivity measurement is done according to standard units of 1 micromho ($\mu$mho)=1 microSiemens ($\mu$S) 1 millimho (mmho)=1 milliSiemens (mS)=1,000 microSiemens ($\mu$S) per unit length.

When the concentration in the interface becomes significantly smaller than the bulk concentration, the bulk fluid-membrane interface resistance becomes quite elevated. This state is often referred to in literature as the limiting current density. As this limiting current density is approached, excess charge can accumulate at the interface. This excess electric charge is not useful in further driving the ionic species across the membrane since the area is already depleted of ionic species. Therefore, some of the excess charge can be removed by an electrical circuit (e.g., resistor) without adversely impacting performance of the AEC system.

In summary, the AEM can act as a dielectric material, collecting opposite charges on each side of the membrane. The charge may also accumulate at the membrane-depleted zone interface as well as at the bulk liquid-depleted boundary interface (i.e., internal capacitance). Because the depleted boundary is liquid, it can be easily disturbed by turbulence. These transient changes in the resistance of the depleted interface boundary and AEM could result in localized high current flows that could damage (thermal degradation) the membrane. A high transient current can be generated because the charge will drain with time in an exponential decay. Therefore, high initial transient electrical current flows can occur when the resistance is reduced across the membrane (i.e., boundary layer replaced by bulk liquid).

In a DC circuit, the time constant for a capacitor (tau) =R×C. In the exponential decay of charge in a capacitor, the time for 99 percent discharge (or charging) is 5×tau.

Reducing the voltage will reduce the accumulated charge (Q), which is the Capacitance (C)×voltage (V).

Advantages of High Applied Voltage in the AEC

In the AEC design a high voltage (a minimum of 0.5 Volts Direct Current (VDC) and a maximum of 600 VDC) may be applied across the AEC cell (typically 60-200 VDC. As the applied voltage increases, the migration rate of negatively charged ions proportionally increases toward the anion exchange membrane. The resistance of water across the feed chamber is typically very high (300 to 500 uS/cm conductivity), and normally most of the electrical potential will dissipate across the CEM (cathode exchange membrane) chamber, the CEM, and AEC feed chamber.

The AEC takes advantage of higher applied voltage potential to facilitate the transport of the ions across the AEC feed chamber to the AEM. The migration of these ions is normally a relatively slow process, with typical rates at 1 volt/cm electric field of roughly $1 \times 10^{-4}$ millimeters per second (mm/sec). Therefore, the increased voltage facilitates ion transport. In practice, as noted previously, a reduced concentration boundary occurs at the membrane surface because transport through the membrane proceeds faster than in the bulk fluid. The excess voltage potential that is created at the AEM is not necessary for the proper operation of the AEC other than to expedite ionic velocity through the feed stream toward the AEM. This allows some of the voltage potential and capacitance to be drained off, as with a ground, without adversely impacting the degree of PFAS removal in the practice of the present invention.

Interaction of Steps to Create the Whole Invention:

A spent and damaged membrane will typically show delamination of the active surface from the underlayer or support polymer, which in this example is a gel polystyrene cross linked with divinyl benzene, layer, which renders the membrane unstable and less effective. Commercial success of the technology depends on a membrane service life of at least six months to make the approach economically viable. Otherwise, the cost of membrane replacement drives the operating/maintenance costs well above competing technologies.

As previously mentioned, early experiments yielded membrane life of sometimes less than 350 hours. Based on subsequent conversations with membrane vendors, a different membrane was selected, an AMI 7000 Series Ion Exchange type, designed to be more robust. Experimentation and vendor discussions indicate that numerous membranes will have at least some effectiveness in PFAS removal. Physical separation between the anode and cathode was also reduced to the fullest extent possible. These modifications improved the service life of the membrane. However, after 400 to 600 hours of service, the membranes showed significant degradation. Although the design changes provided substantial improvement in service life, with no reduction in performance, the membrane life was at least a factor of six less than required for a commercially viable unit.

Theoretically, controlling the voltage at the membrane provides a means to drain the excess electrons in a safe, low energy density manner.

Improved instrumentation was implemented concurrently with the grounding concept that allows for continuous tracking of performance and related parameters. To test the influence of grounding on the performance of the AEC, a lab scale AEC unit was instrumented with continuous monitors for applied voltage, AEM membrane voltage differential, temperature, current, and conductivity of the effluent. The conductivity of the effluent water is a measure of how well the AEC is performing and a direct measure of the removal of sodium chloride, a surrogate for PFAS, from the water being treated. For these purposes, conductivity is a reasonable approximation of concentration.

During normal operation, calcium and other inorganic dissolved constituents pass through either the anodic or cathodic membrane. However, a small fraction of the minerals falls out of solution at or near the membrane surface, fouling the membrane with mineralization over time.

Damage to the membrane itself (i.e., delamination, recalcitrant mineral fouling, micro-penetrations) would prevent the AEC performance from returning to baseline after cleaning. The current experimental run has operated continuously for over 1,175 hours without degradation of baseline performance. This validates the concept that electrical discharge, which is effectively eliminated by dissipation of voltage at the membranes, was a principal cause of premature membrane failure.

Note that in commercial operation, the membrane will undergo automated cleaning every 4 to 12 hours to keep the AEC performance at the maximum level. However, to generate data on how the performance degrades as a function of operational duration, it was important to allow the system to build significant mineralization before each cleaning procedure.

Application of Invention

The purpose of the invention is to reduce the voltage potential and capacitance (energy accumulation) at or near the AEM. This can be accomplished by either:

Grounding through a resistor—Providing a resistive circuit that drains the current across the AEM. Since the AEM is designed to endure some voltage difference between the faces, only the charge over an acceptable magnitude needs to be drained from the system. Therefore, it is possible to place a resistor in-line to allow a small voltage to exist between the faces of the membrane dielectric.

Direct Grounding—a conductive grounding wire can be placed in direct contact with the discharge face of the membrane to continuously transfer excess charge to electrical ground.

Grounding with time delay—The electrical charge that builds up on the membrane surface requires active flow of liquids through the unit and time. A grounding system can be configured to activate the grounding connection at a predetermined interval and stay active for a prescribed period. The excess charge would dissipate through the ground, effectively "re-zeroing" the static charge. In practice, the timing of the activation versus deactivation periods would need to be established based on experimental data. The timing may be to impact mechanical movement of elements to create a ground or the electronic opening and closing of circuits to create a ground.

Grounding based on capacitance—Previous work with the AEC demonstrated that the unit builds a charge across the membranes which dissipates gradually over time once the system is shut down. It is possible to measure the voltage at the membranes and install a grounding system that activates when the voltage reaches some predetermined value. This would operate similarly to a rheostat on intermittent windshield washers.

Use of Multiple Approaches—Providing a resistive circuit that splits the current across the AEM and to ground, and other combinations of the above.

A circuit other than a purely resistive circuit may be utilized to accomplish the same reduction in capacitance and voltage potential at the AEM.

Research is ongoing to establish the proper layout to maximize the effectiveness of the circuit used to reduce the voltage potential and capacitance. During initial testing, a thin (0.26 micron) platinum-ruthenium wire was placed at three locations across both sides of the AEM. Leads on each side of the membrane were connected electrically, intercepted by a variable resistor. In testing at an applied voltage of 60 VDC (Volts of direct current), the resistance required to reduce the membrane differential voltage to 1 VDC was 200 ohms.

Other methods to optimize the circuit may include:
Placing or depositing a conductive material or grid surface on the AEM surface.
Placing a conductive grid just above the AEM surface.
Placing a series of conductive wires across the membrane The selection of the type of grounding system depends on multiple factors, but primarily on how the grounding of the anodic membrane impacts the unit performance in terms of PFAS removal or desalination. A second factor is how the grounding impacts energy consumption of the system. However, based on preliminary experimentation, grounding the unit does not significantly impact either energy consumption or unit performance. During initial testing at 1 VDC interface voltage, the current drainage was 10 mA.

The semipermeable membrane between the feed chamber and the cathodic electrode chamber allows passage of anions but restricts passage of cations through the semipermeable membrane, and the semipermeable membrane between the feed chamber and the anodic electrode chamber allows passage of cations but restricts passage of anions through the semipermeable membrane. The semipermeable membranes are described in greater detail herein. The aqueous feed liquid has a direction of movement from the liquid inlet port to the liquid outlet port and the current is applied approximately perpendicular (+45 degrees) to that direction of movement. In one format, the contaminated aqueous feed liquid comprises anywhere from at least 0.03 parts per billion and even at least 50 parts per billion of the at least highly fluorinated alkyl materials per liter of water. The liquid from the anodic electrode chamber is withdrawn separately from removal of the mediated feed liquid. The liquid from the anodic electrode chamber is withdrawn separately from removal of the mediated feed liquid and the withdrawn liquid from the anodic electrode chamber comprises less than 10 parts per billion of the at least highly fluorinated alkyl materials per liter of water.

This result is a unique property of the system that has been evidenced and observed, but its causation is not fully understood. The total measured output of PFAS from the three streams (the feed chamber, the anodic electrode chamber and the cathodic electrode chamber) is less than the total PFAS input. It has been repeatedly evidenced that a chemical change occurs in the process which alters the chemistry of the PFAS so that the effluent from the anodic chamber contains a lower, much lower or near zero concentration of PFAS. Without being constrained by theory, there is either a catalytic breakdown of the PFAS in contact or adjacent to the anodic electrode under the current, or the PFAS is reduced, eliminating F and/or Cl from the molecule, alone or in addition to further breakdown of the PFAS molecule into less harmful, smaller molecular weight or molecular size compounds. This is further evidenced by a slight, persistent and increasing oxidation of the anode (probably by released F or Cl) and the fact that there is little to no residual PFAS in removed semipermeable membrane and on any scale in the anodic electrode chamber walls (e.g., on the anode itself or any supporting element). Even with contaminated feed liquid input with 200 ppb (parts per billion) PFAS, the output from the feed chamber can be less than 1 ppb and even less than 0.03 parts per billion and the output from the anodic electrode chamber can also be below 10, below 5, below 1 and even below 0.5 ppb PFAS to the water in the output. When feed contains between 2 to 10 ppb PFOA and PFOS the anodic electrode chamber is consistently below 0.030 ppb (30 ppt) total PFOA and PFOS. This can be accomplished in a description of a method according to the present invention of moderating concentration of at least highly fluorinated alkyl materials from a contaminated aqueous feed liquid containing less than 20 parts per billion of the at least highly fluorinated materials per liter of water into an aqueous electronic separator, wherein the aqueous electronic separator comprises at least three chambers, wherein the at least three chambers single pass through the system. A more focused single description of a method according to the present invention of moderating concentration of at least highly fluorinated alkyl materials from a contaminated aqueous feed liquid containing less than 20 parts per billion of the at least highly fluorinated materials per liter of water into an aqueous electronic separator, wherein the aqueous electronic separator comprises at least three chambers, wherein the at least three chambers include:
  a) a feed chamber having a liquid exit port from which a mediated aqueous contaminated feed liquid exits and a liquid input port into which the contaminated aqueous feed liquid enters the feed chamber;
  b) an anodic electrode chamber filled with an aqueous anodic liquid; and
  c) a cathodic electrode chamber filled with an aqueous cathodic liquid;
wherein the feed chamber is between and adjacent to the anodic electrode chamber and the cathodic electrode chamber and the feed chamber is separated from each of the anodic electrode chamber and the cathodic electrode chamber by at least one semipermeable membrane; and wherein the process comprises:
  i) feeding the contaminated aqueous feed liquid into the feed chamber through the liquid input port;
  ii) feeding a second aqueous liquid into and through the anodic electrode chamber in contact with an anodic electrode;
  i) feeding a third aqueous liquid into and through the cathodic electrode chamber in contact with a cathodic electrode;
  ii) applying a current between the anodic electrode chamber and the cathodic electrode chamber and across the feed chamber from a first electrode in the anodic electrode chamber to a second electrode in the cathodic electrode chamber;
  iii) the current driving at least highly fluorinated alkyl materials from the feed liquid into and through the semipermeable membrane between the feed chamber and the anodic electrode chamber and into the second aqueous liquid thereby forming the mediated feed solution within the feed chamber; and
  iv) removing the mediated feed liquid through the liquid exit port with the mediated feed liquid having less than 9 parts per billion of the at least highly fluorinated materials per liter of water;
wherein the anodic electrode and the cathodic electrode are solid plates having a metal surface thereon, the semipermeable membrane has a thickness of between 50 μm and 250 μm, and the current comprises from 5-250 milliamps per square centimeter, and wherein the contaminated aqueous feed liquid comprises the mediated feed liquid of a previous mediation effort. This repeated, or cycling of previous feed chamber mediated effluent will further reduce the PFAS emission needed to be resolved after treatment. Although one expected intent of the process was to be concentration of PFAS into an aqueous solution that could be high temperature (e.g., greater than 500 C or greater than 1000 C or event greater than 1500 C) decomposed, that has proven to be unnecessary because of the degree of conversion of the PFAS into non-PFAS compounds.

In the operation of the steps of moving PFAS contaminated water through the system and attracting PFAS to the semipermeable membrane, as for example during any operative steps such as ii) and iii) (by way of non-limiting examples, as there may be many steps during which current is being applied across the chambers) wherein the semipermeable membrane is electrically grounded for at least some time during these or any other steps.

The technical feasibility of the present invention is based in-part on the electrical properties of the PFAS, and is related in principle to electrostatic precipitation and electro-separation technologies. Once sufficiently concentrated, the PFAS and residuals in the AEM Chamber can be treated with complementary unit operations (e.g., Granular Activated Carbon or GAC beds) to destroy or capture these compounds for recycling or ultimate destruction. The AEC technology is expected to be quickly adopted for tertiary treatment of industrial wastewater such as is produced in textile, coating formulation, and industrial facilities undergoing remediation for PFAS. The market size is expected to be 1,315 facilities. Competing technologies are primary activated carbon, and to a lesser extent, ion exchange, advanced oxidation processes (AOP), and reverse osmosis (RO). AEC can be used in conjunction with these technologies, particularly GAC and AOP to provide treatment synergies.

The AEC (Aqueous Electronic Concentrator) of the present invention uses electrical charge potential of the PFAS to exploit electrochemical principles, primarily the tendency of matter with opposite charges to migrate in fluids towards an attracting charge. Previous art has shown that PFAS as a chemical class, act to a certain extent as ions in solution. The AEC was tested over 6 months to demonstrate that this phenomenon could be exploited to affect the separation and concentration of PFAS in solution, thereby enabling effective and cost-efficient removal of PFAS from industrial effluents and contaminated groundwater. Depending on the degree of concentration required, multiple AEC stages of concentration may be employed, as each stage is expected to provide "step-wise" PFAS concentration. The AEC system is innovative because it uses the ionic character of slightly or non-ionic organic chemicals to achieve their collection and concentration in an aqueous stream.

A past focus of electrochemical separation technologies has been achieving bulk ionic separation (i.e., desalination) to purify water. Electrical charge separation processes are currently used to desalinate high total dissolved solids (TDS) brines, in the case of electrophoresis to separate specific compounds from a solution for analytical purposes, and in electrodialysis which is commonly used in both medical and desalination. Other related technologies include electrochemical activation (water disinfection). and electrodeionization (which incorporates ion exchange resin) to effect separation of ionic species. In the target market (industries discharging wastewater or treating contaminated groundwater containing PFAS), total dissolved solids (TDS)

are relatively low, typically less than 500 mg/L. In this market the focus will specifically be removing PFAS from low TDS concentration industrial wastewater or industrial product wash streams (e.g., textile rinses).

The following features of the AEC of the present invention are thought to include at least the following:

- It utilizes electrostatic separation for removal of PFAS chemical species that are not purely ionic in character, or that may be only slightly ionic.
- Separation can be accomplished in a liquid with a relatively low total ionic strength (generally less than 500 mg/L TDS).
- The low ionic strength of the initial feed liquid allows greater concentration in subsequent treatment stages as bulk ionic species are removed and concentrated along with the PFAS.
- The concentrated PFAS are then more amenable to treatment using granular activated carbon (GAC) and advanced oxidation processes (AOP).
- The AEC uses a combination of anion and cation exchange membranes to facilitate collection of the PFAS to minimize interaction of ionic species.
- Collection/concentration focuses on anions (i.e., PFAS), and only chamber is used for initial collection of PFAS, although multiple chambers could be used.

The AEC, in an explanation of its simplest form of use involves subjecting a water stream containing PFAS to opposing positive and negative electrically charged surfaces within a batch or flow-through module that includes ion exchange membranes to facilitate ion transfer and collection. The electrical charges are bisected by thin (50 micron typically) thick sheets of anion/cation exchange membrane, and a suitable open volume on both the anode and cathode sides of the membranes to allow the water to pass. FIG. 1 shows a basic 3-chamber AEC. Water flow occurs through the center section (feed chamber) of the device, while the anode/cathode sides of the membrane have no or reduced induced water flow, to allow concentration of removed materials. The electrically charged PFAS molecules in the water are attracted toward and are transferred across the anion exchange membrane depending on their charge affinity.

The three chambers in the basic module include:

- Feed Chamber—This is the center chamber of a 3-chamber AEC. In a batch system, PFAS contaminated water is placed in the feed chamber, and at the end of treatment is removed. In a flow-through system, the feed enters one side of the Feed Chamber and treated water exits the other side.
- AEM Chamber (anodic electrode chamber)—This is the chamber that is between the AEM chamber and the Anode electrode. In a batch system, this chamber is initially filled with water. At the end of the treatment cycle this stream contains any concentrated PFAS and salt transferred from the Feed Chamber. Upon removal from the AEC this stream is either further treated to remove PFAS or is further concentrated by passing it through another AEC module.
- CEM Chamber (cathodic electrode chamber)—This is the chamber that is between the CEM and the Cathode electrode. In a batch system, this chamber is initially filled with water. At the end of the treatment cycle this stream, is normally stored and after the AEM stream is further treated/concentrated it is recombined with the CEM Chamber liquid (that has been further treated) to provide neutralization prior to recombination of this water with the treated water from the Feed Chamber.

The electrodes may require periodic cleaning by removing and/or reversing the polarity, while purging the contents that have accumulated within the collection area of the cell. In application, during this purge sequence, inlet flow may be diverted using automatic valving to a parallel AEC module or bank of modules.

- Another embodiment of the system involves use of multiple individual AEM and CEM chambers operated in parallel. This allows, as with standard desalination technologies, the installation of multiple AEM/CEM cells within a single electrode bank.
- Operation of two or more AEC modules in series allows the control of the operating voltage and thus limit the maximum current flux through an individual module. For example, an initial AEC module may operate at 60 VDC, while the second in series is operated at 200 VDC. In this example the first module would function to remove the bulk of PFAS, where the $2^{nd}$ in series would operate at a higher voltage to remove that last fractions of PFAS from the feed water stream.
- It is envisioned that a full-scale unit would be controlled using a programmable logic controller (PLC) and human machine interface (HMI). Voltage control with electrical current limiting circuitry is envisioned to control the voltage supplied to each stage.
- It is contemplated that this proprietary AEC technology will benefit target customers by producing a concentrated PFAS steam that can either be recycled or destroyed using other technologies such as AOP, or in conjunction with subsequent activated carbon (e.g. GAC) treatment of the concentrate. It has also been identified, as later disclosed, that PFAS may actually be chemically modified or decomposed by this process into harmless or less harmful non-PFAS species. It is believed that when AEC concentrate is treated using GAC, the pre-concentration can reduce both GAC bed size and bed replacement frequency. Specifically, the higher PFAS concentration from AEC combined with lower treatment volume allows higher PFAS loadings on the GAC, as compared to a GAC system that treats the whole effluent. A GAC system is typically sized such that when the $1^{st}$ bed outlet reaches half the treatment standard, that bed is replaced. At the 70 parts per trillion (ppt) EPA advisory level for total PFOA and PFOS, very little of the carbon's total capacity is used before it must be disposed or thermally regenerated at an offsite location. Treating concentrated PFAS using GAC has the potential to provide lower overall treatment cost, and a smaller overall physical footprint of the GAC treatment train because fewer or smaller GAC beds would be needed.
- AEC may also produce a low volume concentrate stream containing the concentrated PFAS that could be treated directly using other technologies such as AOP. Recovery and recycling is also a potential option with the AEC. Similar synergies of treatment effectiveness occur with AOP, as AOP treatment is more cost effective at higher concentrations. These factors combined will enable affordable treatment of water for PFAS in applications and locales where PFAS treatment would otherwise be cost-prohibitive, thereby reducing the overall risk associated with PFAS exposure across the United States. Another benefit of the AEC use in industrial settings is that the treated feed stream will have a low conductivity, making it suitable for boiler feed makeup water.

Overall AEC Dimensions and Configuration

The AEC assembly (module), as tested measured 3×8 inches [7.6×20.3 cm]. The unit consisted of an outer polycarbonate support (5 mm), anode and cathode electrodes (Titanium), anode/cathode/feed chambers (5 mm) polycarbonate, and butyl rubber gasketing. Each chamber included three 2-inch×2-inch (5×5 cm) chambers that were interconnected by flow channels. The AEM and CEM were each "sandwiched" between two sheets of gasket material, and the semipermeable membranes were cut to fill the entire inner surface of the respective chambers.

For the Activity I (batch) testing, the AEC module was oriented horizontally, with vent holes in each chamber to allow the escape of gases. Between each chamber were 3 channels to connect the three chambers. For Activity II (flow-through) testing, the unit was oriented vertically, with a vent hole on the anode chamber. Entry and exit ports for liquid (and some gas) were located at the bottom and top sides of each chamber. Silicon tubing was used in Activity II testing.

AEC Ion Exchange Membranes

The ion exchange membranes used in the testing included polymeric membranes such as Fumatech's Fumasep® FAS-50 (anion exchange membrane), Fumasep® FKS-50 (cation exchange membrane), and Chemour's Nafion® 117 (cation exchange membrane. Key specifications for these membranes are presented in Table 2-1. Fumasep® membranes are typically available in 20×20 cm (7.9×7.9 in), 52×52 cm (20.5×20.5 in), and 52×105 cm (20.5×41.3 in) with a maximum roll width of 165 cm (65 in). Nafion® membrane products are available in 12 in (4.7 cm) and 24 in (9.4 cm) widths, with a 50 meter (m), or 164 ft standard roll length.

TABLE 2-1

Ion Exchange Membrane Specifications

| Parameter | Units | FAS-50 | FKS-50 | Nafion-117 |
|---|---|---|---|---|
| Color | Specify | Amber | Clear | |
| Material | Specify | | | PFSA |
| Form delivered | Specify | Bromide | | H+ |
| Thickness | Um | 45-50 | 45-55 | 183 typ. |
| Reinforcement | Specify | None | None | |
| pH Range | Std. Units | 1-14 | 1-14 | |
| Storage | wt. % NaCl | 0.5-1.5 | 0.5 to 1.5 | |
| Exchange Capacity | meq/g | 1.6-1.8 | 1.3-1.4 | 0.95-1 |
| Proton Transfer Rate | umol/min-cm$^2$ | 1000-3000 | NA | |
| Selectivity | % | 92-97 | 98-99 | |
| Specific Resistance | Ohm/cm$^2$ | 0.4-0.8 | 0.9-1.9 | |
| Typical current flux | mA/cm$^2$ | 10-20 | 10-20 | NA |

PFSA - copolymer of tetrafluoroethylene and perfluorinated monomers containing sulfonic acid groups.

Introduction to AEC Testing

Testing of the AEC was conducted in two operational modes that included batch testing (Activity I), and flow-through testing (Activity II). Parametric and other specific testing was conducted during each of these activities.

AEC Configuration Modifications During Test Program

The primary testing variation during AEC testing was the addition of spacers in the center channel of the AEC. This modification was implemented during flow-through testing as a result of membrane damage caused by the elasticity of the membrane. The modification involved placing polypropylene mesh weave within the feed chamber to prevent the AEM and CEM from deforming into the feed chamber. During testing activities, the AEM showed the greatest potential for deformation.

As an alternative to the mesh, extruded lines of polymer (resistant to the chemical activity in the various liquids) can be placed over the membrane to stiffen the membrane against distortion or deformation. Silicone polymers, fluorinated polymers, and polyethylene or polypropylene polymers are non-limiting examples of useful class of polymers not likely to rapidly degrade in the harsh environment of the AEC liquids.

Batch Testing Results (Activity I)

The first testing activity involved evaluation of AEC performance in batch mode. This test series is referred to as Activity I. Later flow-through testing is referenced as Activity II. Test run numbering convention is as follows: Activity-Test-Run. Using this convention 1-1-1 would be Activity I (Batch), Test 1, Run 1.

The Activity I batch testing apparatus was configured as described above.

Batch Testing Protocol

Batch testing involved operating the AEC at a range of treatment times and voltages. Initial runs (10-01 through 1-0-25) were conducted to gain familiarity with the performance on the test feed solution, which consisted of sodium chloride mixed in deionized (DI) water at concentrations of 25, 250, and 500 mg/L. During testing the conductivity was measured using a conductivity meter as micro-Siemens per centimeter (uS/cm). Conductivity readings can be converted to mg/L NaCl by multiplying by a factor of 0.5.

Testing under the test matrix was conducted at three voltages, 10, 30 and 50 volts direct current (VDC), with test run durations of 5, 10, and 20 minutes. During one test of the Activity 1 suite a different CEM, Nafion® 117 membrane, was used in lieu of the Fumasep® FKS membrane that was used for all other tests.

Modifications to Original Activity I Protocol

Key change from the original test protocol and key modifications are as follows:

Test 1-1-7 through 1-1-9 were not conducted. These runs were to be conducted without the CEM. When the first test run was conducted at this condition, the AEC failed to reduce feed chamber conductivity, and the membranes were damaged. Subsequent tests in this series were abandoned.

A test [test 1-10-(1-3)] was added to evaluate the impact of adding exfoliated graphite to the side chambers to assess the impact on salt removal and AEC overall resistance.

A test [Test 1-11-(1-3)] was added to evaluate the impact of side chamber conductivity on performance relative to salt removal.

Batch Testing Results

Results from the initial batch testing are presented for both PFAS removal and salt removal are provided in the text below.

PFAS Removal Results

PFAS operational and analytical results from the Activity 1 AEC batch testing are presented in Table 3-1. This table does not include testing where PFAS were not sampled and analyzed. Other tests as described further below were conducted to evaluate specific operating aspects on performance characteristics. A table presenting all test results is provided below. Tests 1-1-1 through 1-3-9 were all conducted with the same electrode spacing and using the same membranes (FumaSep® membrane).

Figure 2:
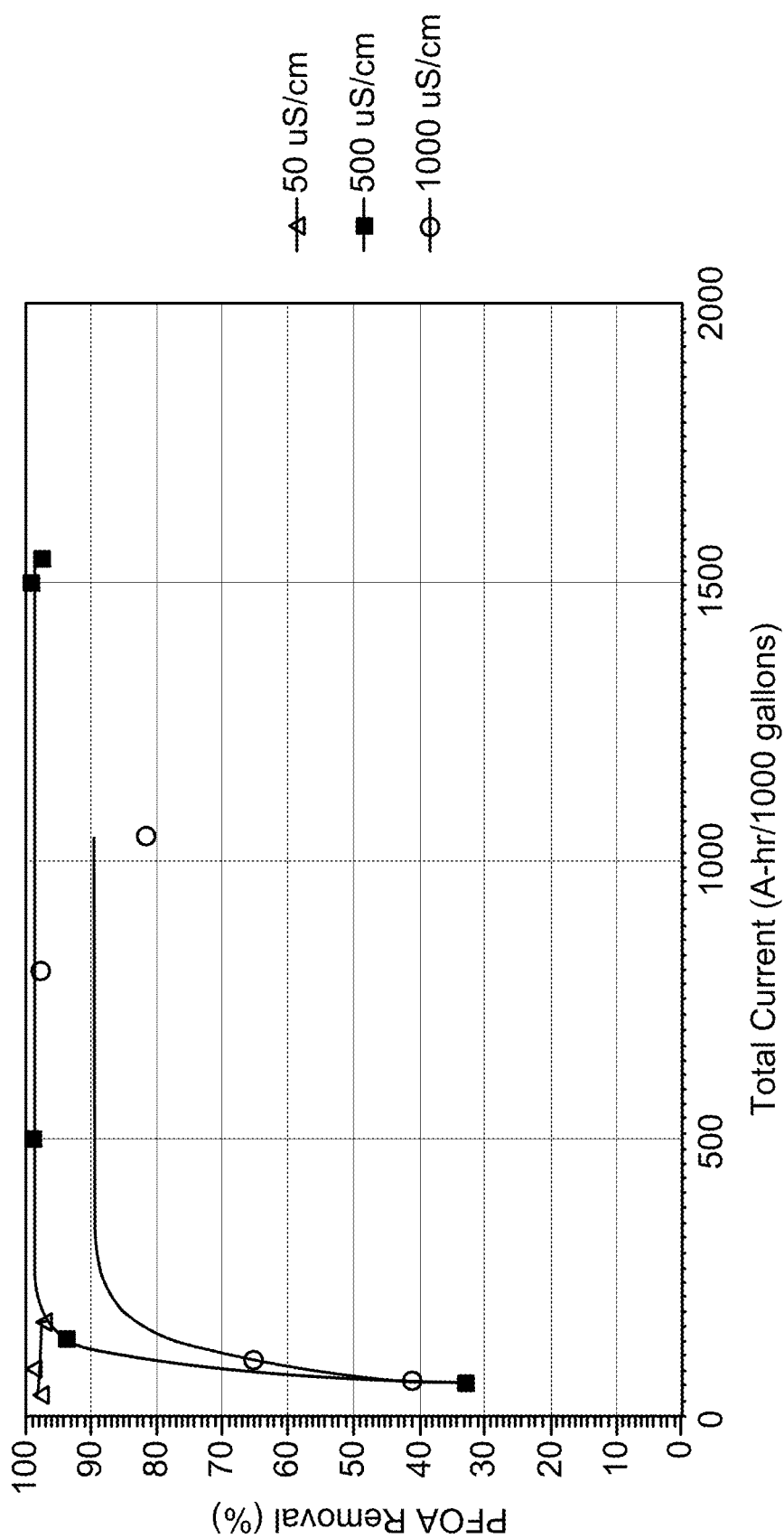
FIG. 2 is a graphic representation of Total Current Required for PFOA Removal—Activity I.
Figure 3:
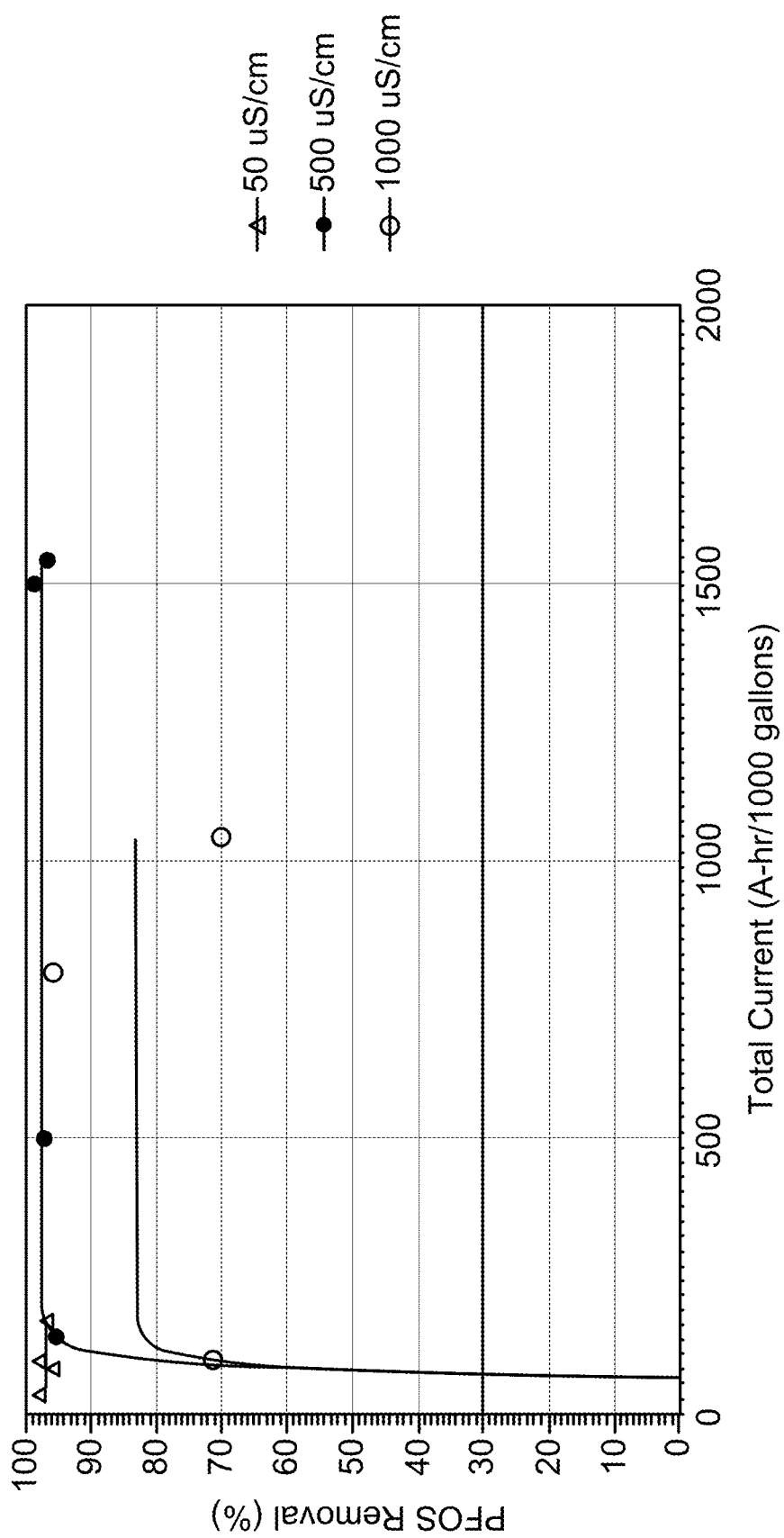
FIG. 3 is a graphic representation of Total Current Required for PFOA Removal Activity I.

Test results showed effective removal of both PFOA and PFOS at total applied current above about 200 A-hr·1000 gallons treated, with feed concentrations being reduced from 100 ppb each PFOA/PFOS to less than 2 ppb. FIG. 2 provides a plot of percent PFOA removal as a function of applied current, and FIG. 3 provides the same plot for PFOS. Both plots show a consistent linear relationship between applied current and PFAS removal up to around 200 milliamps (mA), where the percent removal abruptly flattens with additional total current application. Additionally, percent removal for both PFOA and PFOS are similar for the same total current input. The results also show that at lower salt concentrations, lower total current was required for the same percent PFAS reduction. Of importance, high PFOA/PFOS removal efficiencies were achieved over the range of salt concentrations tested (i.e., 100 to 1000 uS/cm).

Batch Testing Program Operating Parameters Impacting Performance

The primary operating conditions monitored included conductivity, pH, voltage, current, and treatment time. The operating conditions were evaluated using multiple linear regression to identify key parameters affecting PFAS removal. The effects of temperature were not evaluated in this test although temperature was monitored as later discussed herein. In assessing the primary data set, the most significant operational parameters were determined to be current, treatment time, and initial feed conductivity. The current and time parameters were combined and are reported as mA minutes (mA-min) per 1000 gallons treated in this report. This value can be converted to Coulombs by multiplying mA-min by 0.06.

The primary data set evaluated in this section includes data from Runs 1-0-26, 1-0-27, 1-1-(1-9), 1-2-(1-9), and 1-3-(1-9), which represents the main test series (MTS).

Other evaluations outside the MTS included the following:
  Test 1-4-(1-9)—conducted by substituting Nafion® 117 membrane for the Fumasep® FKS-50 membrane (included in MTS).
  Test 1-5-(1-3)—conducted at 3.2 centimeter (cm) electrode spacing
  Test 1-6-(1-3)—conducted at 4.0 cm electrode spacing
  Test 1-10-(1-3)—conducted using expanded graphite inside the AEM and CEM chambers
  Test 1-11-(1-3)—conducted to evaluate the effect of higher AEM and CEM chamber conductivities on performance Test 1-4 was conducted using Nafion® 117 membrane in the CEM, and Test 1-5 and 1-6 were conducted at different electrode separation by increasing the volume (thickness) of the feed chamber. The results and findings from each of the above tests are discussed below.

An important consideration in the practice of the present invention is that rather than standard "electrical grounding" is the appreciation of the terminology of electrical voltage control or electrical voltage control system. This terminology is defined as implementing a soft or controlled bleed of voltage to maintain voltage on a surface (herein the surface of the semipermeable membrane in contact with the aqueous liquid contaminated with PFAS) at a required level. In the practice of the present invention, this electrical voltage control is implemented to maintain the surface of the AEM or semipermeable membrane below 2 volts, preferably below 1.5 volts or at or below 1 volt (±0.2 volts) and at least at about 0.05-1.0 volts. Thus the "grounding" described herein is practiced in the present invention as at least periodically lowering or maintaining the surface voltage of the semipermeable membrane in an electrically voltage controlled manner.

TABLE 3-1

PFAS and Salt Removal Results-Activity I

| Test/Run | Outlet PFOA Conc. (ppb) | Outlet PFOS Conc. (ppb) | Total Current Applied (A-hr)/1000 gal.) | Voltage (VDC) | PFOA Removal (%) | PFOS Removal (%) | Total PFOA and PFOS Removal (%) | Initial Cond. (µS/cm) | Final Cond. (µS/cm) | Salt Removal (%) | Electrode Spacing (cm) | AEM/CEM |
|---|---|---|---|---|---|---|---|---|---|---|---|---|
| 1-0-26 | 0.94 | 0.94 | 499.1 | 30 | 98.9 | 97.3 | 98.4 | 500 | 11.2 | 97.76 | 2.5 | FAS/FKS |
| 1-0-27 | 5.06 | 1.51 | 139.2 | 59 | 93.8 | 95.6 | 94.4 | 507 | 2.7 | 99.47 | 2.5 | FAS/FKS |
| 1-1-1 | 0.48 | 1.67 | 36.0 | 10 | 7.59 | 98.3 | 34.6 | 54.6 | 26.7 | 51.1 | 2.5 | FAS/FKS |
| 1-1-6 | 1.79 | 1.35 | 81.5 | 30 | 97.8 | 96.1 | 97.3 | 54.7 | 0.5 | 99.1 | 2.5 | FAS/FKS |
| 1-1-8 | 1.00 | 1.07 | 167.8 | 50 | 98.8 | 96.69 | 98.2 | 53.5 | 0.8 | 98.5 | 2.5 | FAS/FKS |
| 1-1-9 | 0.59 | 0.66 | 97.7 | 50 | 99.3 | 98.1 | 98.9 | 51.7 | 0.7 | 98.7 | 2.5 | FAS/FKS |
| 1-2-2 | 54.63 | 53.51 | 57.8 | 10 | 33.0 | −54.6 | 6.94 | 479 | 380 | 20.7 | 2.5 | FAS/FKS |
| 1-2-3 | 81.59 | 76.27 | 372.7 | 10 | 6.5 | 17.48 | 9.8 | 494 | 108.5 | 78.0 | 2.5 | FAS/FKS |
| 1-2-6 | 1.90 | 1.10 | 1542.2 | 30 | 97.7 | 96.8 | 97.4 | 442 | 3.7 | 99.2 | 2.5 | FAS/FKS |
| 1-2-9 | 0.51 | 0.40 | 1498.8 | 50 | 99.4 | 98.8 | 99.2 | 509 | 3.7 | 99.3 | 2.5 | FAS/FKS |
| 1-3-1 | 47.94 | 41.44 | 62.2 | 10 | 41.2 | 19.7 | 23.1 | 960 | 800 | 16.7 | 2.5 | FAS/FKS |
| 1-3-3 | 28.31 | 9.90 | 98.7 | 10 | 65.3 | 71.4 | 67.1 | 936 | 20.6 | 97.8 | 2.5 | FAS/FKS |
| 1-3-5 | 14.99 | 10.28 | 1042.6 | 30 | 81.6 | 70.3 | 78.3 | 967 | 22.2 | 97.7 | 2.5 | FAS/FKS |
| 1-3-9 | 1.76 | 1.37 | 797.8 | 50 | 97.8 | 96.0 | 97.3 | 951 | 5.7 | 99.4 | 2.5 | FAS/FKS |
| 1-4-9 | 3.93 | 1.19 | 515.4 | 50 | 95.2 | 96.6 | 95.6 | 501 | 1.7 | 99.7 | 2.5 | FAS/Nafion |
| 1-5-3 | 13.17 | 4.53 | 889.6 | 50 | 83.9 | 86.9 | 84.8 | 512 | 7.1 | 98.6 | 3.2 | FAS/FKS |
| 1-6-3 | 33.28 | 11.72 | 1129.5 | 50 | 59.2 | 66.1 | 61.3 | 518 | 29.9 | 94.2 | 4.0 | FAS/FKS |

Salt Removal Results

Salt removal results are summarized in Table 3-2 for all of the Activity I testing, whereas Table 3-1 only addresses results in runs where PFAS were analyzed.

The correlation between total current and salt removal followed a pattern very similar to that of the tested PFAS. Table 3-3 summarizes salt removal versus total current.

Figure 4:
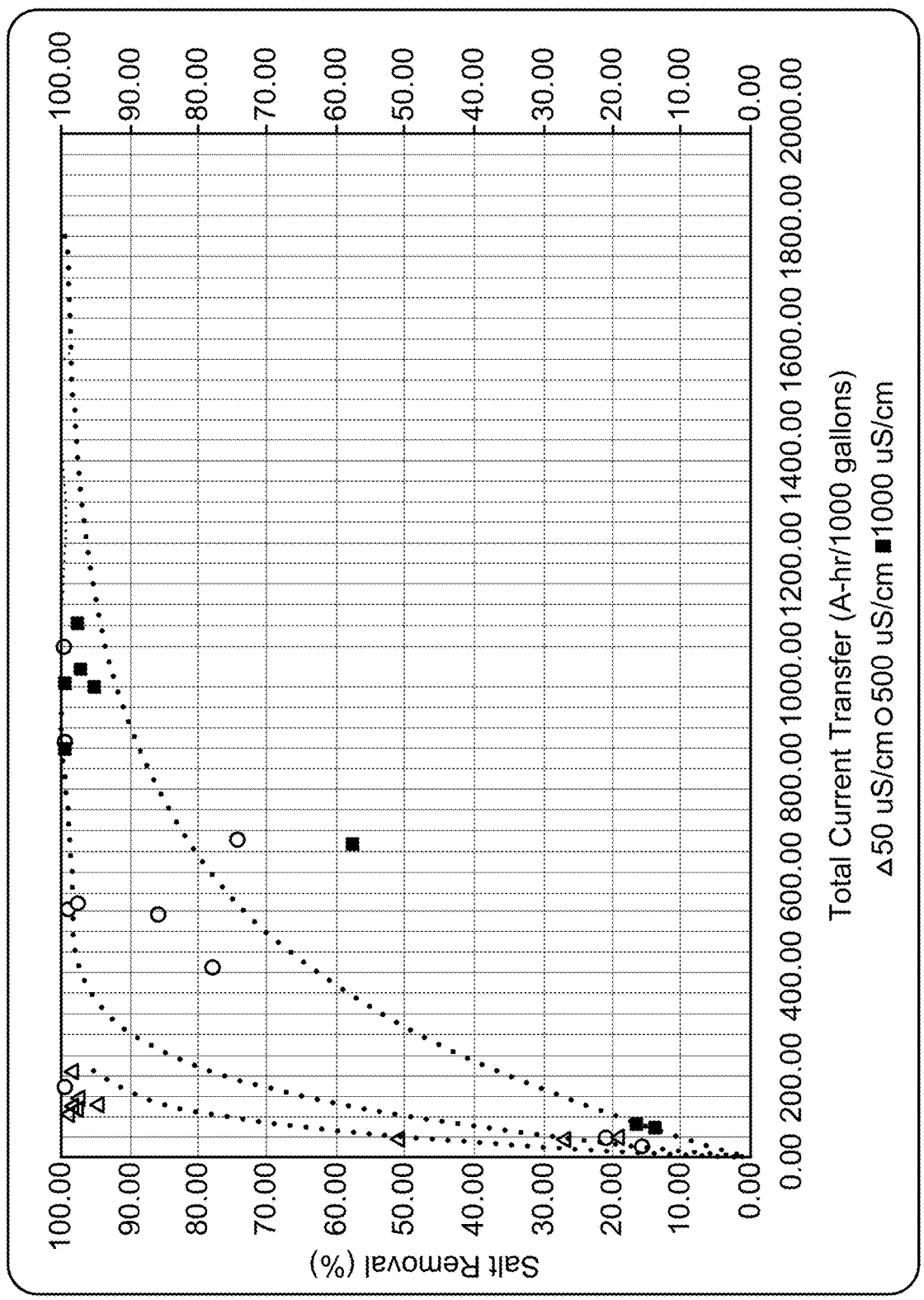
FIG. 4 is a graphic representation of Total Current Transfer Required to Achieve Fractional Salt Removal—Activity I.

The same correlation is shown on a mass removal basis in FIG. 4. The mass removal in milligrams of NaCl, is based on a module volume of 63.9 milliliters (mL).

TABLE 3-2

Salt Removal Results-Activity I

| Test/Run | Treated PFOA Conc. (ppb) | Treater PFOS Conc. (ppb) | Total Current (A-hr)/1000 gal) | Volts (V) | PFOA Removal (%) | PFOS Removal (%) | Initial Cond. (uS/cm) | Final Cond. (uS/cm) | Salt Removal (%) | Electrode Spacing (cm) | AEM/CEM |
|---|---|---|---|---|---|---|---|---|---|---|---|
| 1-0-26 | 0.94 | 0.94 | 499.1 | 30 | 99.1 | 99.1 | 500 | 11.2 | 97.76 | 2.5 | FAS/FKS |
| 1-0-27 | 5.06 | 1.51 | 139.2 | 59 | 94.9 | 98.5 | 507 | 2.7 | 99.47 | 2.5 | FAS/FKS |
| 1-1-1 | 0.48 | 1.67 | 36.0 | 10 | 99.5 | 98.3 | 54.6 | 26.7 | 51.10 | 2.5 | FAS/FKS |
| 1-1-2 | NT | NT | 40.5 | 10 | NT | NT | 49.4 | 39.8 | 19.43 | 2.5 | FAS/FKS |
| 1-1-3 | NT | NT | 50.4 | 10 | NT | NT | 50.7 | 36.9 | 27.22 | 2.5 | FAS/FKS |
| 1-1-4 | NT | NT | 104.2 | 30 | NT | NT | 50.6 | 2.6 | 94.86 | 2.5 | FAS/FKS |
| 1-1-5 | NT | NT | 117.5 | 30 | NT | NT | 50.6 | 1.3 | 97.43 | 2.5 | FAS/FKS |
| 1-1-6 | 1.79 | 1.35 | 81.5 | 30 | 98.2 | 98.7 | 54.7 | 0.5 | 99.09 | 2.5 | FAS/FKS |
| 1-1-7 | NT | NT | 89.8 | 50 | NT | NT | 52.6 | 1.2 | 97.72 | 2.5 | FAS/FKS |
| 1-1-8 | 1.00 | 1.07 | 167.8 | 50 | 99.0 | 98.9 | 53.5 | 0.8 | 98.50 | 2.5 | FAS/FKS |
| 1-1-9 | 0.59 | 0.66 | 97.7 | 50 | 99.4 | 99.3 | 51.7 | 0.7 | 98.65 | 2.5 | FAS/FKS |
| 1-2-1 | NT | NT | 24.7 | 10 | NT | NT | 496 | 419.0 | 15.52 | 2.5 | FAS/FKS |
| 1-2-2 | 54.63 | 53.51 | 57.8 | 10 | 45.4 | 46.5 | 479 | 380.0 | 20.67 | 2.5 | FAS/FKS |
| 1-2-3 | NT | NT | 372.7 | 10 | NT | NT | 494 | 108.5 | 78.04 | 2.5 | FAS/FKS |
| 1-2-4 | NT | NT | 471.9 | 30 | NT | NT | 498 | 71.6 | 85.62 | 2.5 | FAS/FKS |
| 1-2-5 | NT | NT | 623.0 | 30 | NT | NT | 493 | 127.0 | 74.24 | 2.5 | FAS/FKS |
| 1-2-6 | 1.90 | 1.10 | 1542.2 | 30 | 98.1 | 98.9 | 442 | 3.7 | 99.16 | 2.5 | FAS/FKS |
| 1-2-7 | NT | NT | 485.3 | 50 | NT | NT | 489 | 3.9 | 99.20 | 2.5 | FAS/FKS |
| 1-2-8 | NT | NT | 809.6 | 50 | NT | NT | 500 | 1.1 | 99.78 | 2.5 | FAS/FKS |
| 1-2-9 | 0.51 | 0.40 | 1498.8 | 50 | 99.5 | 99.6 | 509 | 3.7 | 99.27 | 2.5 | FAS/FKS |
| 1-3-1 | 47.94 | 41.44 | 62.2 | 10 | 52.1 | 58.6 | 960 | 800.0 | 16.67 | 2.5 | FAS/FKS |
| 1-3-2 | NT | NT | 56.3 | 10 | NT | NT | 990 | 852.0 | 13.94 | 2.5 | FAS/FKS |
| 1-3-3 | 28.31 | 9.90 | 98.7 | 10 | 71.69 | 90.1 | 936 | 20.6 | 97.80 | 2.5 | FAS/FKS |
| 1-3-4 | NT | NT | 610.7 | 30 | NT | NT | 967 | 407.0 | 57.91 | 2.5 | FAS/FKS |
| 1-3-5 | 14.99 | 10.28 | 1042.6 | 30 | 85.0 | 89.7 | 967 | 22.2 | 97.70 | 2.5 | FAS/FKS |
| 1-3-5R | NT | NT | 1016.9 | 30 | NT | NT | 933 | 90.8 | 90.27 | 2.5 | FAS/FKS |
| 1-3-6 | NT | NT | 951.8 | 30 | NT | NT | 945 | 26.3 | 97.22 | 2.5 | FAS/FKS |
| 1-3-7 | NT | NT | 918.7 | 50 | NT | NT | 934 | 44.6 | 95.22 | 2.5 | FAS/FKS |
| 1-3-8 | NT | NT | 924.1 | 50 | NT | NT | 945 | 5.3 | 99.44 | 2.5 | FAS/FKS |
| 1-3-9 | 1.76 | 1.37 | 797.8 | 50 | 98.2 | 98.6 | 951 | 5.7 | 99.40 | 2.5 | FAS/FKS |
| 1-4-1 | NT | NT | 202.4 | 15 | NT | NT | 491 | 353.0 | 28.11 | 2.5 | FAS/Nafion |
| 1-4-1A | NT | NT | 86.9 | 5 | NT | NT | 486 | 450.0 | 7.41 | 2.5 | FAS/Nafion |
| 1-4-2 | NT | NT | 129.3 | 10 | NT | NT | 486 | 396.0 | 18.52 | 2.5 | FAS/Nafion |
| 1-4-3 | NT | NT | 224.6 | 10 | NT | NT | 486 | 261.0 | 46.30 | 2.5 | FAS/Nafion |
| 1-4-4 | NT | NT | 705.9 | 30 | NT | NT | 484 | 24.3 | 94.98 | 2.5 | FAS/Nafion |
| 1-4-5 | NT | NT | 606.2 | 30 | NT | NT | 490 | 24.3 | 95.04 | 2.5 | FAS/Nafion |
| 1-4-5A | NT | NT | 740.6 | 30 | NT | NT | 484 | 1.8 | 99.63 | 2.5 | FAS/Nafion |
| 1-4-6 | NT | NT | 750.4 | 30 | NT | NT | 484 | 0.9 | 99.81 | 2.5 | FAS/Nafion |
| 1-4-9 | 3.93 | 1.19 | 515.4 | 50 | 96.1 | 98.8 | 501 | 1.7 | 99.66 | 2.5 | FAS/Nafion |
| 1-5-1 | NT | NT | 64.2 | 10 | NT | NT | 493 | 474.0 | 3.85 | 3.2 | FAS/FKS |
| 1-5-2 | NT | NT | 861.9 | 30 | NT | NT | 497 | 181.2 | 63.54 | 3.2 | FAS/FKS |
| 1-5-3 | 13.17 | 4.53 | 889.6 | 50 | 86.8 | 95.5 | 512 | 7.1 | 98.61 | 2.3 | FAS/FKS |
| 1-6-1 | NT | NT | 105.6 | 10 | NT | NT | 488 | 467.0 | 4.30 | 4.0 | FAS/FKS |
| 1-6-2 | NT | NT | 752.3 | 30 | NT | NT | 510 | 500.0 | 1.96 | 4.0 | FAS/FKS |
| 1-6-3 | 33.28 | 11.72 | 1129.5 | 50 | 66.7 | 88.3 | 518 | 29.9 | 94.23 | 4.0 | FAS/FKS |
| 1-10-1 | NT | NT | 709.7 | 30 | NT | NT | 380 | 3.1 | 99.18 | 2.5 | FAS/FKS |
| 1-10-2 | NT | NT | 672.6 | 10 | NT | NT | 380 | 27.6 | 92.74 | 2.5 | FAS/FKS |
| 1-10-3 | NT | NT | 554.8 | 20 | NT | NT | 380 | 6.7 | 98.24 | 2.5 | FAS/FKS |
| 1-11-1 | NT | NT | 1074.8 | 30 | NT | NT | 387 | 32.8 | 91.52 | 2.5 | FAS/FKS |
| 1-11-2 | NT | NT | 913.8 | 30 | NT | NT | 387 | 3.7 | 99.04 | 2.5 | FAS/FKS |
| 1-11-3 | NT | NT | 662.2 | 30 | NT | NT | 387 | 1.9 | 99.51 | 2.5 | FAS/FKS |

NT = Not Tested

Correlation of Salt and PFAS Removal

Figure 6:
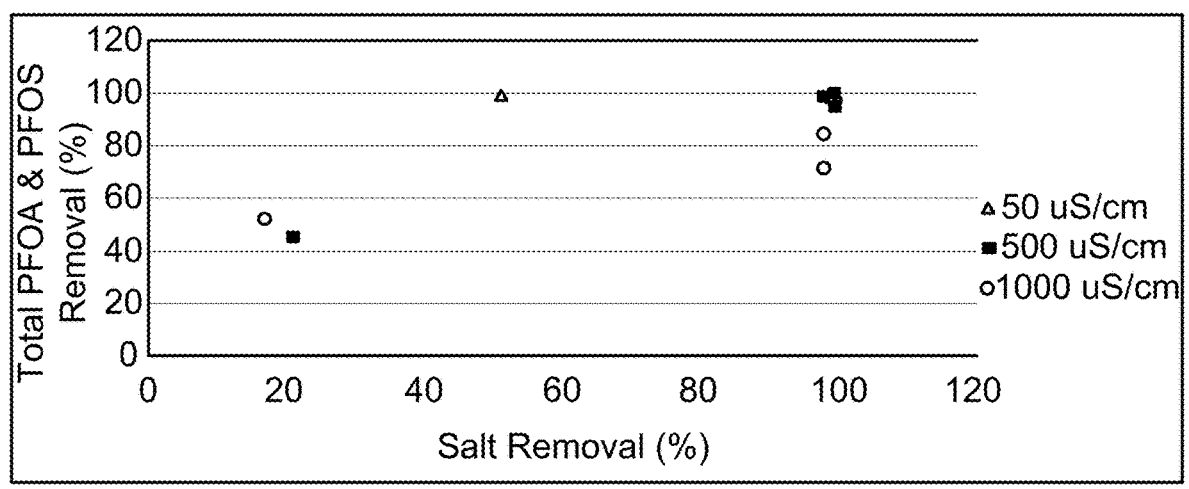
FIG. 6 is a graphic representation of Total PFOA and PFOS Removal as a Function of Salt Removal—Activity I.

A key evaluation of this test involved valuating possible relationships between salt removal and PFOA and PFOS removal. FIG. 6 shows that there is a correlation between salt removal and PFOA/PFOS removal. Due to the focus on demonstrating removal, most of the removal results are greater than 95% for both PFOA/PFOS. Therefore, it is difficult to establish a clear correlation across the range of removals. The correlation is also impacted by analytical uncertainty. At salt removals above 95% and for conductivities between 50 and 500 uS/cm, total PFOA and PFOS removal is greater than 90 percent. For the 1000 uS/cm initial feed conductivity case and at salt removal above 95 percent, total PFOA and PFOS removal ranged from 70 to 99.5 percent.

Operating Parameter Observations

Operating parameters impacting scale-up will include current density across the membrane and electrode surface area, and parameters related to module resistance that will impact energy costs. Resistance parameters primarily include operating voltage, total module thickness, Feed Chamber conductivity, and AEM/CEM Chamber conductivity. Voltage was found to directly impact cell resistance in that higher voltages increase electrolysis of water, increasing the ionic concentration with a corresponding increase in ion flux and a nonlinear reduction in solution resistance Current Density The effective exposed surface (membrane and electrodes) of the tested AEC module was 74 $cm^2$. The average current over the MTS was 48 mA (average of run averages), with the highest test run value of 186.1 mA (Test 1-3-7 average current). The average current density was 6.49 Amps per square meter (A/m$^2$), and the highest run average current density was 25.14 A/m$^2$.

During batch testing, initial currents were high, and as time progressed the current decreased in an exponential decay relationship over time. Due to a quickly dropping current it was difficult to read the initial instantaneous value. Initial recorded current averaged 194 mA (26.2 A/m$^2$), with a single run maximum reading value of 667 mA (90.1 A/m$^2$).

Correlation of Salt and PFAS Removal

A key evaluation of this test involved valuating possible relationships between salt removal and PFOA and PFOS removal. FIG. 6 shows that there is a correlation between salt removal and PFOA/PFOS removal. Due to the focus on demonstrating removal, most of the removal results are greater than 95% for both PFOA/PFOS. Therefore, it is difficult to establish a clear correlation across the range of removals. The correlation is also impacted by analytical uncertainty. At salt removals above 95% and for conductivities between 50 and 500 uS/cm, total PFOA and PFOS removal is greater than 90 percent. For the 1000 uS/cm initial feed conductivity case and at salt removal above 95 percent, total PFOA and PFOS removal ranged from 70 to 99.5 percent.

Operating Parameter Observations

Operating parameters impacting scale-up will include current density across the membrane and electrode surface area, and parameters related to module resistance that will impact energy costs. Resistance parameters primarily include operating voltage, total module thickness, Feed Chamber conductivity, and AEM/CEM Chamber conductivity. Voltage was found to directly impact cell resistance in that higher voltages increase electrolysis of water, increasing the ionic concentration with a corresponding increase in ion flux and a nonlinear reduction in solution resistance Current Density The effective exposed surface (membrane and electrodes) of the tested AEC module was 74 cm$^2$. The average current over the MTS was 48 mA (average of run averages), with the highest test run value of 186.1 mA (Test 1-3-7 average current). The average current density was 6.49 Amps per square meter (A/m$^2$), and the highest run average current density was 25.14 A/m$^2$.

During batch testing, initial currents were high, and as time progressed the current decreased in an exponential decay relationship over time. Due to a quickly dropping current it was difficult to read the initial instantaneous value. Initial recorded current averaged 194 mA (26.2 A/m$^2$), with a single run maximum reading value of 667 mA (90.1 A/m$^2$).

During testing, a run was attempted at 5 amps (676 A/m$^2$); however, the AEM was destroyed at this current load.

Electrode Separation Distance

Tests 1-5 and 1-6 were conducted to evaluate the effect of electrode separation distance on AEC performance. The effect is discussed further below. During the MTS electrode separation was constant at 2.5 cm.

Module Electrical Resistance

Electrical resistance across the module averaged 1,987 ohms over the MTS, with a maximum of 7,576 ohm (Run 1-1-9). Overall module resistance was highest for the low salt content runs. Over the 50, 500, and 1000 uS/cm tests, overall module resistance averaged 3,389, 958, and 934 ohms, respectively. Additional discussion is provided herein.

Total Current

Total current across the module averaged 480.1 mA-min over the MTS, with a maximum run average of 1,562 mA-min (Run 1-2-6). Total current was highest during the lowest salt content tests. Over the 50, 500, and 1000 uS/cm tests, total module current averaged 88.5, 662, and 700 mA-min, respectively.

On a per 1,000-gallon treated basis, the above translates to an average of 474 A-hr/1000 gallons over the MTS, with a maximum single run average of 1,542 A-hr/1000 gallons (Run 1-2-6). Total current was highest during the high salt content test. Over the 50, 500, and 1000 uS/cm tests, overall module resistance averaged 87.4, 663.6, and 691 A-hr/1000 gallons, respectively.

Energy Consumption

Energy consumption during the testing was measured during testing using an ammeter installed in-line with the power supply and AEC module.

Total energy requirements averaged 17.52 KW-hr over the MTS, with a maximum of 75.91 KW-hr (Run 1-2-9). The overall energy requirement was highest during the high salt content run. Over the 50, 500, and 1000 uS/cm tests, AEC module energy requirements were 3.19, 25.14, and 24.6 KW-hr, respectively.

On a per 1,000-gallon treated basis, the above translates to an average of 17 KW-hr/1000 gallons over the MTS, with a maximum run average of 1,542 KW-hr/1000 gallons (Run 1-2-6). Overall current was highest over the high salt content test. Over the 50 500, and 1000 uS/cm tests, power requirements averaged 3.11, 24.51, and 23.98 KW-hr/1000 gallons, respectively.

Activity I Analytical Quality Assurance

A number of QC (quality control) measures were implemented during testing to evaluate the quality of the test results. Sampling-specific measures included feed spike checks, reagent blanks, and equipment feed stock spikes.

An initial QC check suite of samples was submitted prior to the main Activity 1 sample submittal. Results are presented in Table 3-3.

TABLE 3-3

Activity I Analytical QC Results

| Run #/ Sample ID | UTK Label | PFOA Conc. (ppb) | PFOS Conc. (ppb) | $^{13}$C PFOA | $^{13}$C PFOS | % $^{13}$C PFOA Recovery | % $^{13}$C PFOS Recovery |
|---|---|---|---|---|---|---|---|
| 1-0-EB1 | BL2 | 112.24 | 40.94 | 1.49 | 1.14 | 149.23 | 113.57 |
| 1-0-TS1 | BL7 | 83.48 | 39.90 | 0.98 | DN | 97.91 | NA |
| 1-2-TS1 | BL24 | 79.69 | 29.33 | 0.65 | DNQ | 64.76 | NA |
| 1-3-9AEM | BL25 | 0.38 | 0.47 | 2.01 | 1.24 | 201.36 | 127.12 |

DNQ = laboratory did not quantify

Feed stock sample (1-0-EB1) was collected and analyzed to determine whether the concentration of PFOA/PFOS placed in the feed cell of the AEC would be impacted when allowed to remain in the AEC feed chamber for 20 minutes with no power. The results showed results reasonably consistent with 1-0-TS1 and 1-0-TS2, which were both spiked with 100 ppb of each PFOA and PFOS. This testing is significant because it showed that there was effectively no sorption onto the AEM over the 20-minute period of the test where there was no current flow through the cell.

A review of the Activity I analytical results showed PFAS $^{13}$C surrogate recoveries varied widely, with most outside the target recovery range. PFOA $^{13}$C recoveries ranged from 33.9 to 307 percent, and PFOS $^{13}$C recoveries ranged from 56.2 to 229 percent recovery.

Subsequently, four additional samples were prepared to evaluate this issue. They included two 100 ppb feed solutions (1-0-28 and 1-0-29), one 10 ppb feed solution (1-0-29), and Sample 1-0-30, a re-run of Sample 1-3-8AEM (AEM chamber concentrate). Results showed that a majority of the $^{13}$C spike recovery variability issue experienced with the Activity 1 samples appeared to have been due to the low spiking volume of 1 uL, which was increased to between 2 to 10 uL for supplemental samples. Supplemental sample analytical results are summarized in Table 3-4. The AEM sample was submitted to evaluate the fate of the PFAS, and showed a very low PFAS concentration.

TABLE 3-4

Supplemental Activity I Analytical QC Results-Activity I

| Sample | De-scription | Actual (each ppb) | PFOA (ppb) | PFOS (ppb) | 13C PFOA Recovery (%) | 13C PFOS Recovery (%) |
|---|---|---|---|---|---|---|
| 1-0-28 | Feed | 100 | 51.97 | 46.79 | 43.64 | 34.18 |
| 1-0-29 | Feed | 100 | 51.76 | 48.59 | 45.99 | 35.23 |
| 1-0-31 | Feed | 10 | 12.13 | 10.02 | 80.39 | 72.82 |
| 1-0-30 | AEM | App. 100 | 1.67 | 0.9 | 108.1 | 90.58 |

Results from Table 3-4 show the following:

The 100 ppb feed stock supplemental samples (1-0-28 and 1-0-29) were analyzed at 47-52 ppb for both PFOA and PFOS. If corrected for recoveries, the results are close to the actual 100 ppb spiked.

The 10 ppb feed stock was analyzed to be 12.13/10.02 ppb PFOA/PFOS. Results show good agreement with the actual feed stock.

Overall, the higher $^{13}$C spiking levels resulted in lower percent recovery variability than shown in Table 3-3.

The last sample (1-0-30) was the concentrate contained within the AEM-electrode chamber. This should have held the PFOA/PFOS mass transferred from the center feed chamber, and should have been at a PFOS concentration about the same as the test stock (TS) samples, between 40 to 50 ppb PFOA and PFOS (100 ppb each in actual feed). This analytical result was consistent with the previous anode chamber sample (Sample 1-3-8AEM), which was an identical run. It was believed that the PFOA/PFOS was either collecting on the electrode and/or the membrane, and not in the liquid. It was also thought that the PFOA/PFOS could be modified or degraded within the anode chamber. Because $^{13}$C recovery was good on this AEM liquid sample, there did not appear to be issues with the analytical process.

Equipment Checks and Calibration.

The primary test monitoring activities consisted of pH, conductivity, voltage, current, pH, mass, and conductivity measurement. The pH meter was calibration checked periodically using pH 4.01, 7.00, and 10.01 standards. The conductivity meter was initially calibrated and calibration checked using 23, 447, and 12,880 standards by Oakton and Atlas Scientific. Volt and current meters were checked by comparing results from multiple instruments. The current and voltage meters on the power supplies were found to be inaccurate, and test instruments were wired into the power supply circuit to obtain the correct current and voltage readings.

PFAS Removal Findings

During Activity I both PFOA and PFOS were spiked into a sodium chloride and DI water solution each at 100 ppb, for a total of 200 ppb. Findings associated with the MTS performance are as follows:

The AEC is capable of removing a high percentage of the PFOA and PFOS from the Feed Chamber in a batch operating mode.

High feed PFOA/PFOS removal efficiencies are achievable over the range of salt concentrations tested (i.e., 50 to 1000 uS/cm).

Total and individual PFOA and PFOS removal can be approximated based on salt removal.

Module electrical resistance increases with reduced Feed Chamber concentration

Removal efficiencies for both PFOA and PFOS are equivalent under the range of operating conditions tested.

The removal efficiency is dependent on total current transferred across the AEC, with higher removal experienced at higher total current (i.e., A-hr).

More current and total energy is required for the same total PFOA and PFOS removal at higher salt concentrations/conductivities.

Operation at high current density will destroy the AEM membrane.

Other Findings

Other findings related to operation as follows:

AEM easily deformed during operation. The were no significant deformation issues with the CEM.

Removing the CEM (operating without CEM) caused destruction of the AEM. Therefore, for an effective AEC the use of both an AEM and CEM appear to be necessary.

During testing using a gold-plated anode, the gold eventually dissolved in the AEM Chamber during operation. A more durable anode will be required for subsequent testing and commercial operation. A platinum coating is frequently used in such applications.

Sediment accumulations were found after each test run inside the AEM Chamber. The CEM Chamber and CEM electrode appeared unaffected by the Activity I testing.

It was discovered that a planned methanol rinse of the membrane could not be used because the methanol dissolved the membrane. In lieu of a methanol rinse, a HPLC grade water rinse was used.

AEC can be used to produce water of DI water standards, which may also have commercial applications.

Activity I (Batch Testing) Conclusions and Areas for Future Study

The results from Activity I demonstrated that the AEC can remove a high percentage of PFOA and PFOS from aqueous streams initially at 100 ppb (each). The power required to achieve the removal depends on the initial feed conductivity. At the lowest conductivity tested (50 uS/cm), less than 200 A-hr/1000 gallons were required to achieve PFOA/PFOS average removal greater than 98 percent. During testing where conductivity was 20 times higher, less than 800 A-hr/1000 gallons was required to achieve a PFOA/PFOS average of greater than 98 percent removal (about 4 times higher current).

Flow-Through AEC Testing Results—Activity II

Activity II (flow through testing) was conducted subsequent to Activity I (batch testing). During Activity II, two PFAS feed concentrations were used for each PFOA and PFOS. These included 10 ppb and 2 ppb. These levels were considerably lower than the feed concentration of 100 ppb used in Activity I testing. The range of 2 to 100 ppb spans typical levels of industrial PFAS contamination.

Description of AEC Module

In Activity II, the AEC module was configured the same size as in Activity I, but modified to allow flow-through operation. Key AEC modifications included adding flow connections between the three cells in each chamber, additional between-chamber flow paths, and gas vents.

Flow-Through Testing Protocol

Flow-through testing involved operating the AEC over a range of feed salt concentrations, flow rates, voltages, and currents. Because the same AEC volume was used on all tests, the flow rate was proportional to the residence time. Electrical current was controlled by adjusting voltage to achieve a given feed outlet conductivity target value. Initial runs Test 2-0, Runs 1-11 were conducted to gain familiarity with the performance on the test solution, which consisted of sodium chloride mixed into DI water at concentrations of 75, 250, and 500 mg/L. During testing the conductivity was measured using a conductivity meter as uS/cm. Conductivity can be adjusted to mg/L NaCl by multiplying by a factor of 0.5.

Testing under the test matrix was conducted to obtain target salt removal of 40, 80, and greater than 98 percent in the outflow from the feed chamber.

Modifications to Original Activity I Protocol

Modifications from the original test described earlier protocol are as follows:

It had originally been anticipated that two AEC modules would be required in series for the flow-through testing. It was found that project objectives could be met with a single AEC module.

One additional test was added (2-8, Runs 1-3) to allow performance evaluation at different residence times while operating at the same total current.

One additional test was added (2-9, Runs 1-3) to allow performance evaluation at a high AEM chamber concentration factor.

It had originally been anticipated that only three feed samples would be analyzed. It was decided to analyze each test's feed samples for use in removal calculations.

Feed concentrations were originally planned at 1 and 10 ppb. However, the low concentration was increased to 2 ppb to provide more definitive quantification at the analytical laboratory.

The original temperature range was expected to be 20 to 25° C. This was increased to 25 to 30° C. The low temperature test condition temperature was reduced from 15° C. to 4° C. to better show potential impact of temperature.

Results

Results from the flow-through testing are presented for both PFAS removal and salt removal in the following text PFAS Removal Results PFOA and PFOS results from the Activity II AEC testing are presented in Table 4-1. All Activity II tests were conducted at the same electrode spacing and using the same ion exchange membranes (FumaSep® membrane) as were used during Activity I.

Test results show effective removal of both PFOA and PFOS. The electrical current setting for each test was adjusted to achieve target removals of 40, 80, and greater than 98 percent salt removal. As noted in Activity I testing, above about 95% removal the removal curve flattens considerably with only small incremental gains in removal achieved with additional power input. Total PFOA and PFOS removal ranged from 95.6 to 98.7 percent when the AEC was operated to achieve better than 98% salt removal.

Figure 7:
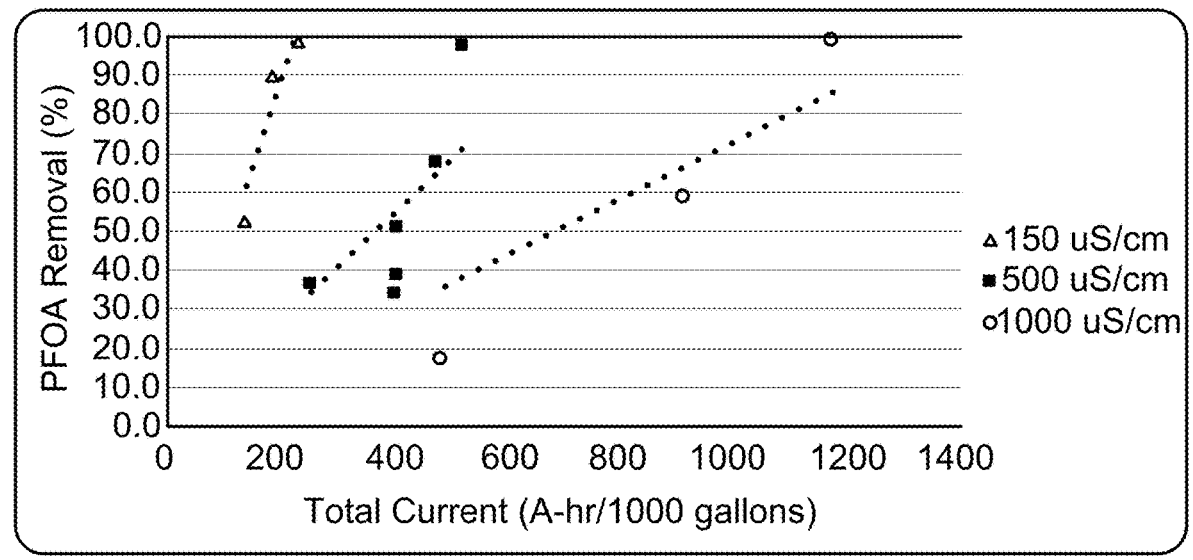
FIG. 7 is a graphic representation of Total Current Required for PFOA Removal at 10 ppb Feed.
Figure 8:
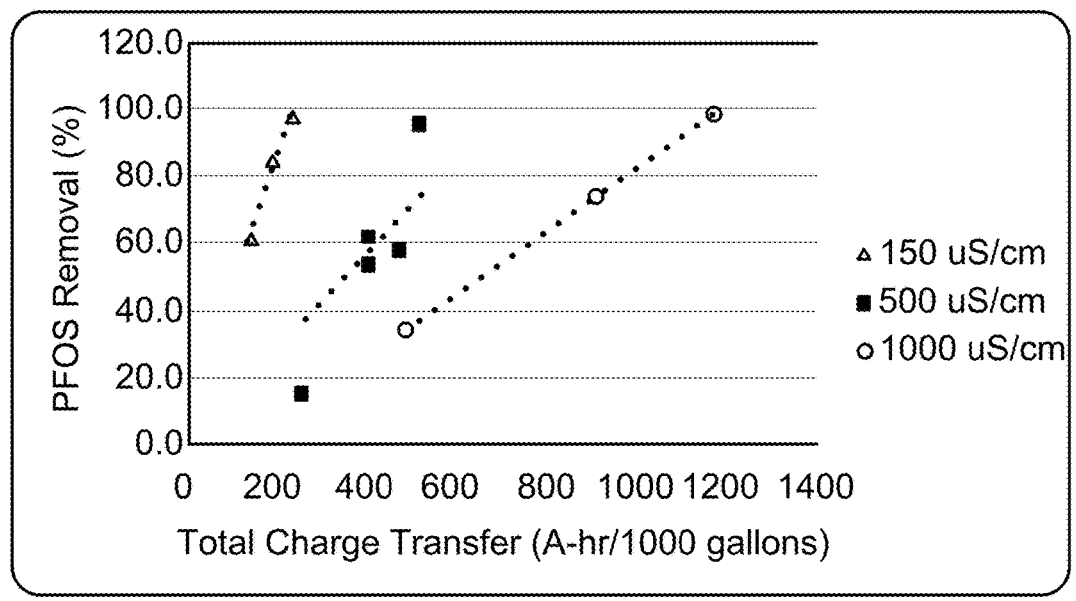
FIG. 8 is a graphic representation of Total Current Required for PFOA Removal at 10 ppb Feed.
Figure 9:
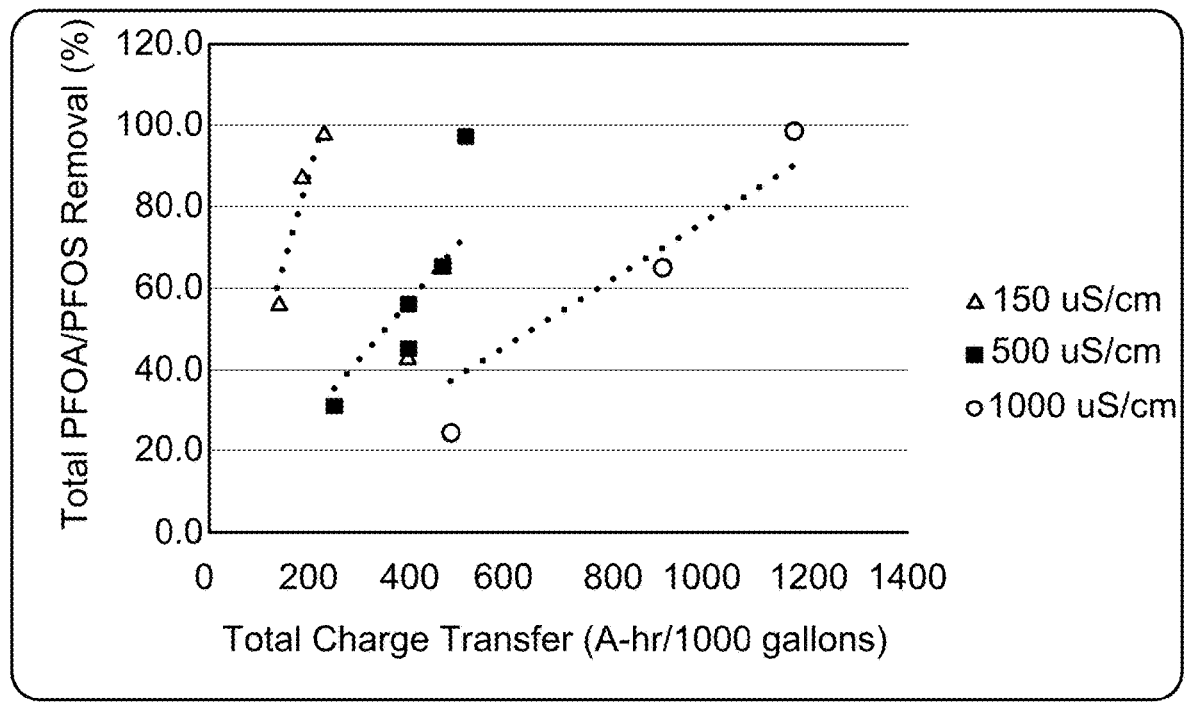
FIG. 9 is a graphic representation of Total Current Required for PFOA and PFOS Removal at 10 ppb Feed.

FIG. 7 shows how PFOA removal varied with total current (electrical charge transfer through AEC) at 10 ppb of PFOA initially in the feed. FIG. 8 is the same chart for PFOS at a feed concentration of 10 ppb of each PFAS initially in the feed. The charts show nearly identical performance for PFOA and PFOS removal. FIG. 9 presents total PFOA and PFOS removed. The trend lines in these graphs is plotted through zero to simplify interpretation of trends.

TABLE 4-1

PFAS and Salt Removal Results-Activity II

| Test/Run | Treated PFOA Conc. (ppb) | Treated PFOS Conc. (ppb) | Total Current (A-hr/1000 gal) | Feed Residence Time (seconds) | Volts (V) | PFOA Removal (%) | PFOS Removal (%) | Total PFAS Removal (%) | Initial Feed Cond. (uS/cm) | Final Treated Cond. (uS/cm) | Salt Removal (%) | Electrode Spacing (cm) | AEM/CEM |
|---|---|---|---|---|---|---|---|---|---|---|---|---|---|
| 2-1-TS | 14.11 | 10.26 | — | — | — | — | — | — | — | — | — | — | — |
| 2-2-TS | 2.038 | 1.166 | — | — | — | — | — | — | — | — | — | — | — |
| 2-3-TS | 14.07 | 7.74 | — | — | — | — | — | — | — | — | — | — | — |
| 2-4-TS | 1.905 | 0.745 | — | — | — | — | — | — | — | — | — | — | — |
| 2-5-TS | 14.97 | 7.9 | — | — | — | — | — | — | — | — | — | — | — |
| 2-6-TS | 1.954 | 1.208 | — | — | — | — | — | — | — | — | — | — | — |
| 2-7-TS | 7.995 | 5.04 | — | — | — | — | — | — | — | — | — | — | — |
| 2-8-TS | 14.76 | 10.43 | — | — | — | — | — | — | — | — | — | — | — |
| 2-9-TS | 14.76 | 10.43 | — | — | — | — | — | — | — | — | — | — | — |
| 2-0-EB | 0.01 | 0.05 | — | — | — | — | — | — | — | — | — | — | — |
| 2-1-1 | 11.67 | 6.73 | 467.3 | 12.09 | 13.2 | 17.29 | 34.41 | 24.5 | 963 | 484 | 49.74 | 2.5 | FAS/FKS |
| 2-1-2 | 5.82 | 2.64 | 876.3 | 12.09 | 26.4 | 58.75 | 74.27 | 65.3 | 963 | 150 | 84.42 | 2.5 | FAS/FKS |
| 2-1-3 | 0.12 | 0.13 | 1133.3 | 12.09 | 62.2 | 99.15 | 98.73 | 99.0 | 963 | 0.9 | 99.91 | 2.5 | FAS/FKS |
| 2-2-1 | 0.687 | 0.622 | 515.0 | 13.33 | 13 | 66.29 | 46.66 | 59.1 | 947 | 548 | 42.13 | 2.5 | FAS/Nafion |
| 2-2-2 | 0.488 | 0.255 | 965.7 | 13.33 | 25 | 76.05 | 78.13 | 76.8 | 947 | 99 | 89.55 | 2.5 | FAS/FKS |
| 2-2-3 | 0.009 | 0.025 | 1287.6 | 13.33 | 113.3 | 99.56 | 97.86 | 98.9 | 947 | 6 | 99.37 | 2.5 | FAS/FKS |
| 2-3-1 | 10.78 | 6.66 | 225.3 | 5.83 | 40 | 23.38 | 13.95 | 20.0 | 490 | 313.5 | 36.02 | 2.5 | FAS/FKS |
| 2-3-2 | 7.8 | 3.79 | 422.5 | 5.83 | 75 | 44.56 | 51.03 | 46.9 | 490 | 202 | 58.78 | 2.5 | FAS/FKS |
| 2-3-3 | 0.59 | 0.38 | 622.5 | 5.83 | 110.5 | 95.81 | 95.09 | 95.6 | 490 | 1.65 | 99.66 | 2.5 | FAS/FKS |
| 2-4-1 | 1.203 | 0.628 | 243.8 | 6.31 | 15.8 | 36.85 | 15.70 | 30.9 | 490 | 253 | 48.37 | 2.5 | FAS/FKS |
| 2-4-2 | 0.608 | 0.315 | 455.7 | 6.31 | 28.1 | 68.08 | 57.72 | 65.2 | 490 | 40.7 | 91.69 | 2.5 | FAS/FKS |
| 2-4-3 | 0.035 | 0.033 | 500.8 | 6.31 | 62.43 | 98.16 | 95.57 | 97.4 | 490 | 3.4 | 99.31 | 2.5 | FAS/FKS |
| 2-5-1 | 10.94 | 5.44 | 137.0 | 1.87 | 76 | 26.92 | 31.14 | 28.4 | 157 | 128.9 | 17.90 | 2.5 | FAS/FKS |

TABLE 4-1-continued

PFAS and Salt Removal Results-Activity II

| Test/Run | Treated PFOA Conc. (ppb) | Treated PFOS Conc. (ppb) | Total Current (A-hr/1000 gal) | Feed Residence Time (seconds) | Volts (V) | PFOA Removal (%) | PFOS Removal (%) | Total PFAS Removal (%) | Initial Feed Cond. (uS/cm) | Final Treated Cond. (uS/cm) | Salt Removal (%) | Electrode Spacing (cm) | AEM/CEM |
|---|---|---|---|---|---|---|---|---|---|---|---|---|---|
| 2-5-2 | 8.73 | 5.43 | 207.3 | 1.87 | 115 | 41.68 | 31.27 | 38.1 | 157 | 82.35 | 47.55 | 2.5 | FAS/FKS |
| 2-5-3 | 0.31 | 0.15 | 162.7 | 1.87 | 90 | 97.93 | 98.10 | 98.0 | 151 | 0.7 | 99.54 | 2.5 | FAS/FKS |
| 2-6-1 | 0.921 | 0.465 | 134.0 | 1.85 | 75 | 52.87 | 61.51 | 56.2 | 150 | 51.4 | 65.73 | 2.5 | FAS/FKS |
| 2-6-2 | 0.181 | 0.200 | 178.7 | 1.85 | 100 | 89.76 | 85.02 | 88.0 | 150 | 17.6 | 88.27 | 2.5 | FAS/FKS |
| 2-6-3 | 0.024 | 0.028 | 223.4 | 1.85 | 125 | 98.77 | 97.68 | 98.4 | 150 | 1.6 | 98.93 | 2.5 | FAS/FKS |
| 2-7-1 | 5.709 | 3.249 | 487.8 | 6.73 | 75 | 28.59 | 35.48 | 31.3 | 489 | 254.5 | 47.96 | 2.5 | FAS/FKS |
| 2-7-2 | 3.487 | 1.829 | 650.4 | 6.73 | 100 | 56.39 | 63.68 | 59.2 | 489 | 95.55 | 80.46 | 2.5 | FAS/FKS |
| 2-7-3 | 0.289 | 0.191 | 813.0 | 6.73 | 125 | 96.39 | 96.21 | 96.3 | 489 | 3.65 | 99.25 | 2.5 | FAS/FKS |
| 2-8-1 | 8.96 | 4.84 | 388.6 | 13.06 | 30.8 | 39.30 | 53.60 | 45.2 | 491 | 144 | 70.67 | 2.5 | FAS/FKS |
| 2-8-2 | 9.65 | 4.78 | 386.7 | 6.53 | 61.3 | 34.62 | 54.17 | 42.7 | 491 | 154 | 68.64 | 2.5 | FAS/FKS |
| 2-8-3 | 7.18 | 3.97 | 199.4 | 1.87 | 215.7 | 51.36 | 61.94 | 55.7 | 491 | 117 | 76.17 | 2.5 | FAS/FKS |

Figure 10:
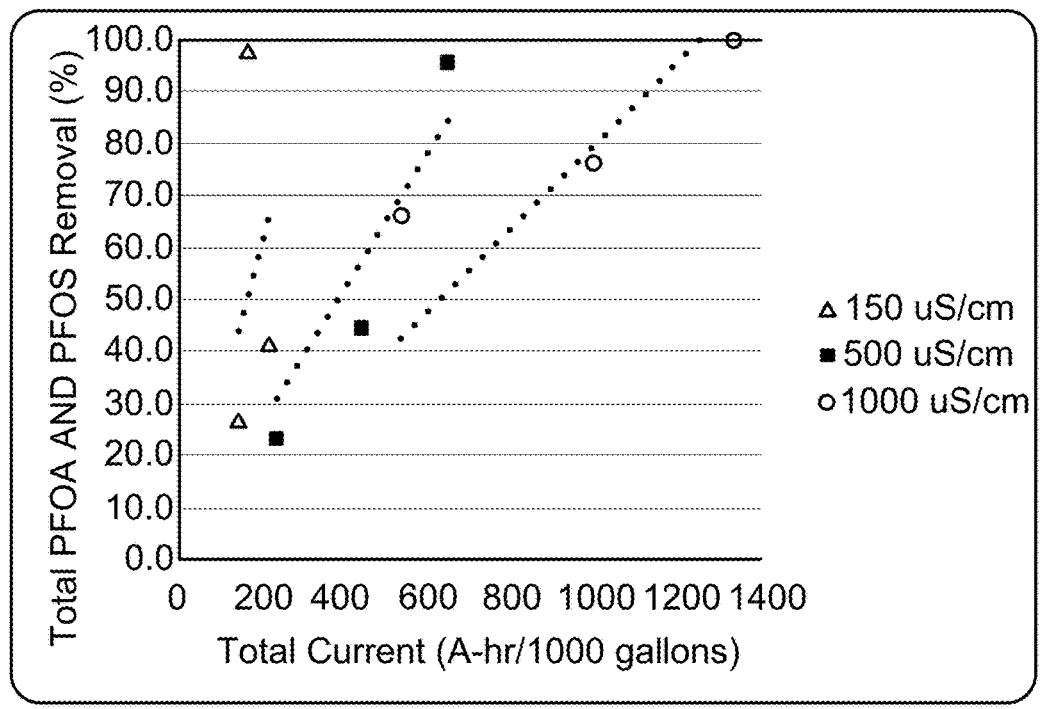
FIG. 10 is a graphic representation of Total Current Required for PFOA Removal at 2 ppb Feed.
Figure 11:
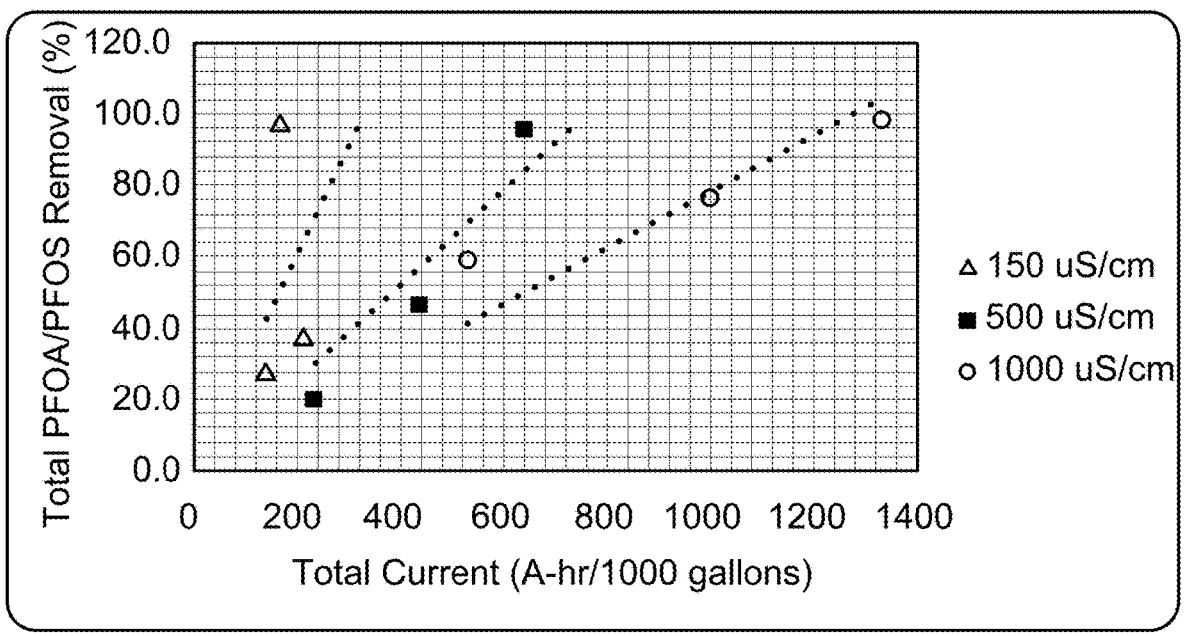
FIG. 11 is a graphic representation of Total Current Required for PFOS Removal at 2 ppb Feed.
Figure 12:
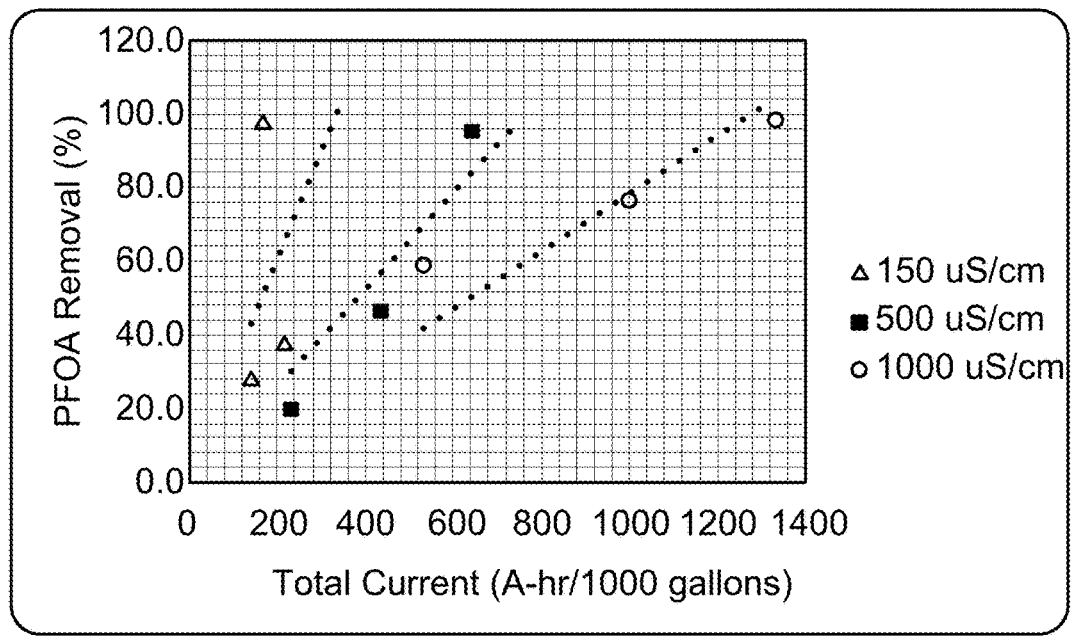
FIG. 12 is a graphic representation of Total PFOA and PFOS Removal Versus Total Current at 2 and 10 ppb Feed.

FIG. 10 shows how PFOA removal varied with total current at 2 ppb of each PFAS in the feed. FIG. 11 present the same information but for PFOS at a feed concentration of 2 ppb. The charts show nearly identical removal for PFOA and PFOS. FIG. 12 is the same chart for both PFOA and PFOS combined.

The results from FIGS. 7-12 were compared with regard to achieving a target value of 0.070 ppb total PFOA and PFOS in the treated water. At 10 ppb feed, the required removal is 99.3 percent, and at 2 ppb the required removal is 96.5 percent. Table 4-1 provides an estimate of expected total current required to achieve the target final concentration value. The results suggest that between 4 to 40 percent more total current is required to achieve the same removal result at 2 ppb as opposed to 10 ppb feed concentration.

TABLE 4-2

Total Current to Achieve 70 ppt Target

| Feed Conductivity (uS/cm) | Feed Concentration 10 ppb (A-hr/1000 gal) | Feed Concentration 2 ppb (A-hr/1000 gal) | Ratio |
|---|---|---|---|
| 150 | 240 | 320 | 1.33 |
| 500 | 520 | 730 | 1.40 |
| 1000 | 1,190 | 1,240 | 1.04 |

Figure 13:
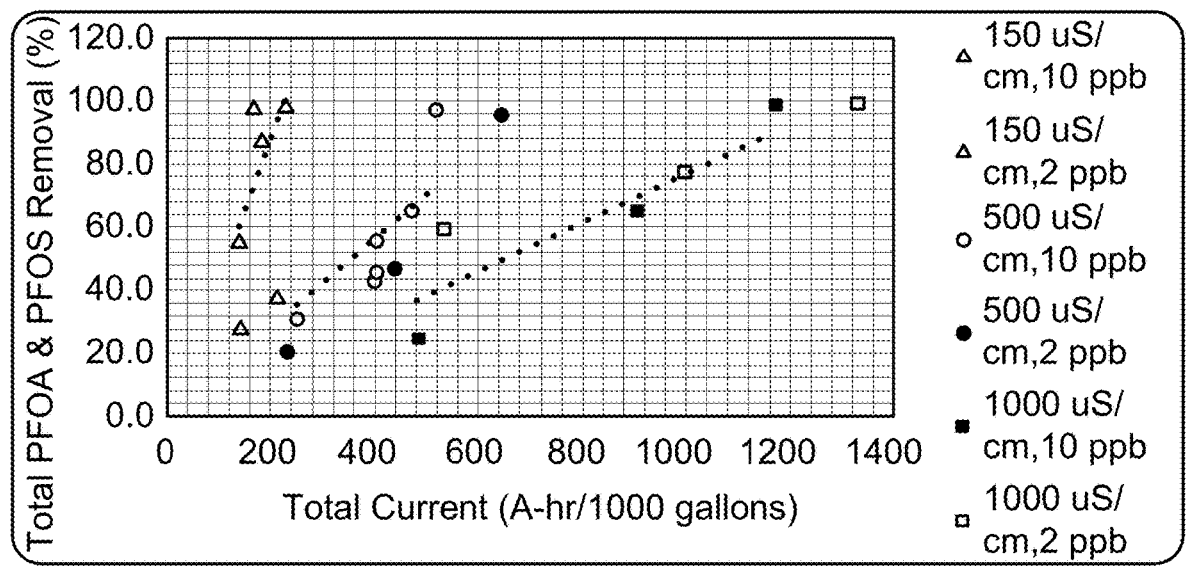
FIG. 13 is a graphic representation of Total Current Required Total PFOS and PFOS Removal at 2 ppb Feed.

Total PFOA and PFOS removal at 2 ppb and 10 ppb is plotted against total current in FIG. 13.

Salt Removal Results

Figure 14:
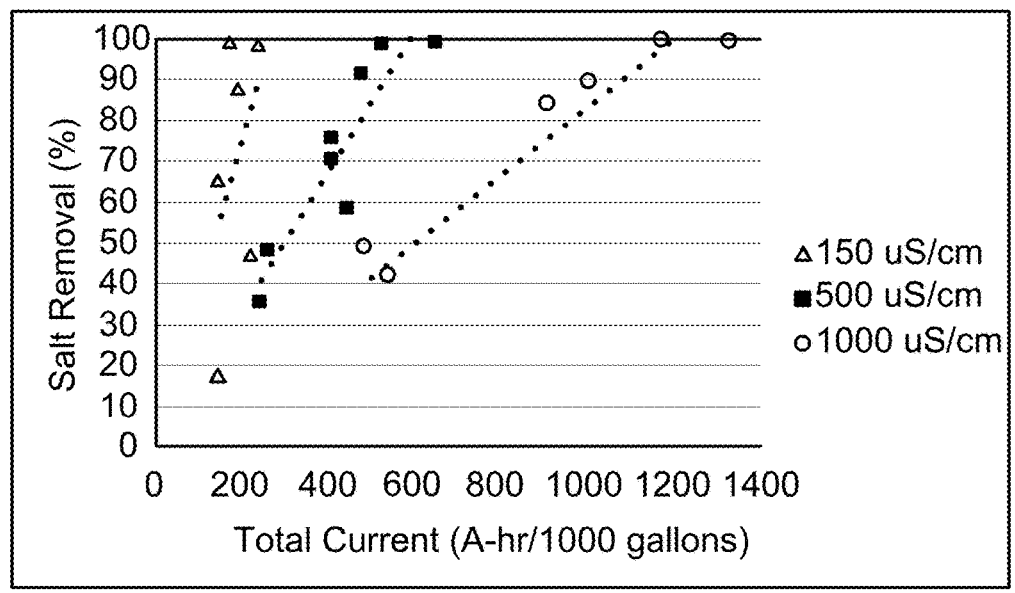
FIG. 14 is a graphic representation of Total Current Required to Achieve Salt Removal.

Salt removal results are summarized in Table 4-1 for all of the Activity II testing. The correlation between total current and salt removal follows a pattern very similar to that of the tested PFAS as shown in FIG. 14.

Figure 15:
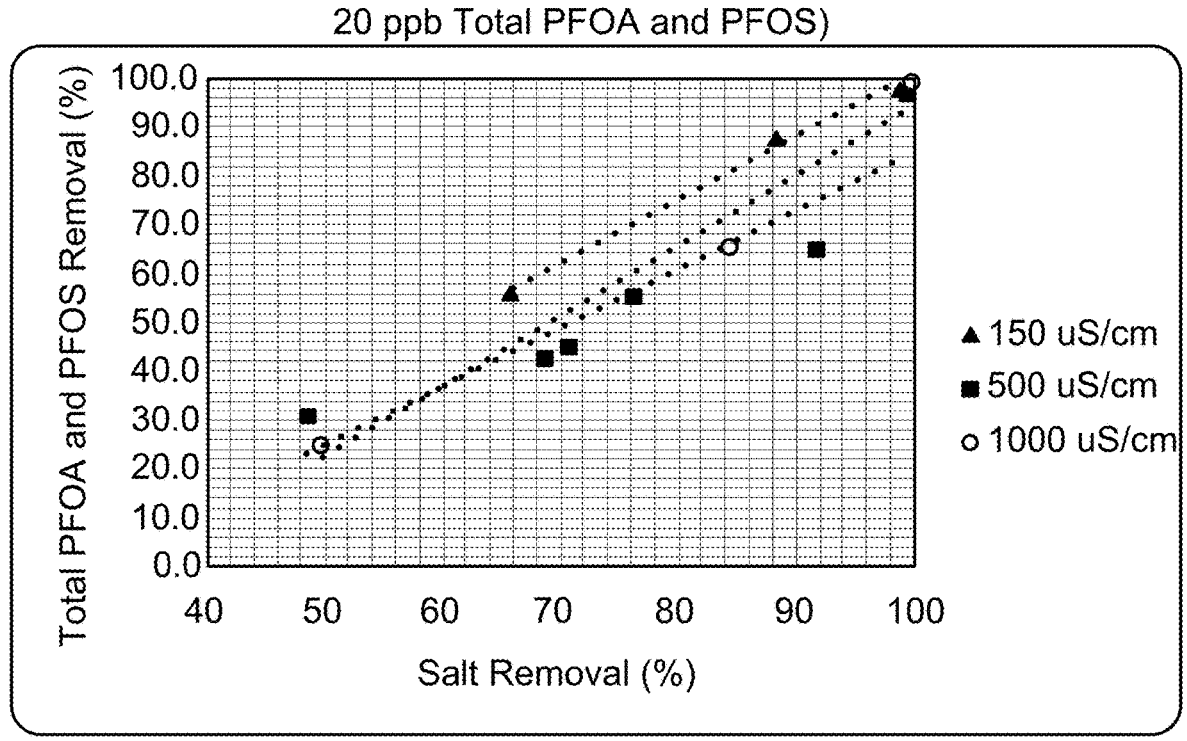
FIG. 15 is a graphic representation of Total PFOA and PFOS Removal Versus Salt Removal (20 ppb Total PFOA and PFOS).
Figure 16:
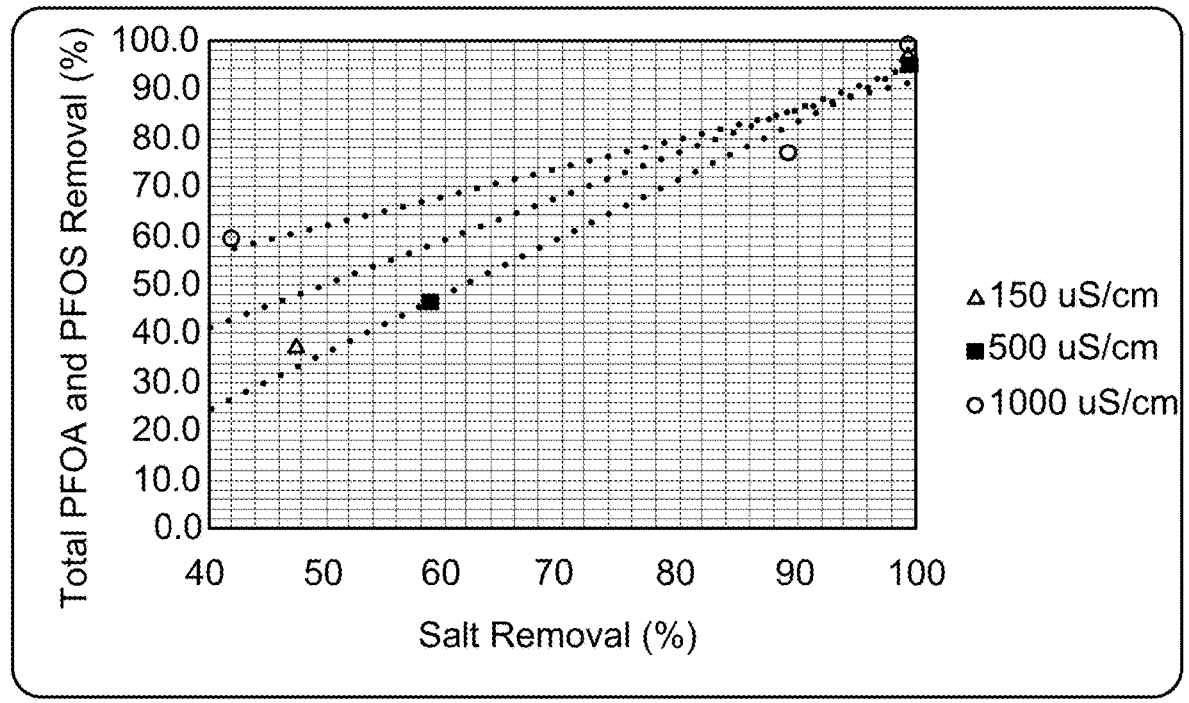
FIG. 16 is a graphic representation of Total PFOA and PFOS Removal Versus Salt Removal (4 ppb Total PFOA and PFOS).

FIGS. 15 and 16 show PFOA and PFOS removal as a function of salt removal. The correlation is strong enough to make approximate estimates of PFAS removal at a given percentage salt removal.

Figure 17:
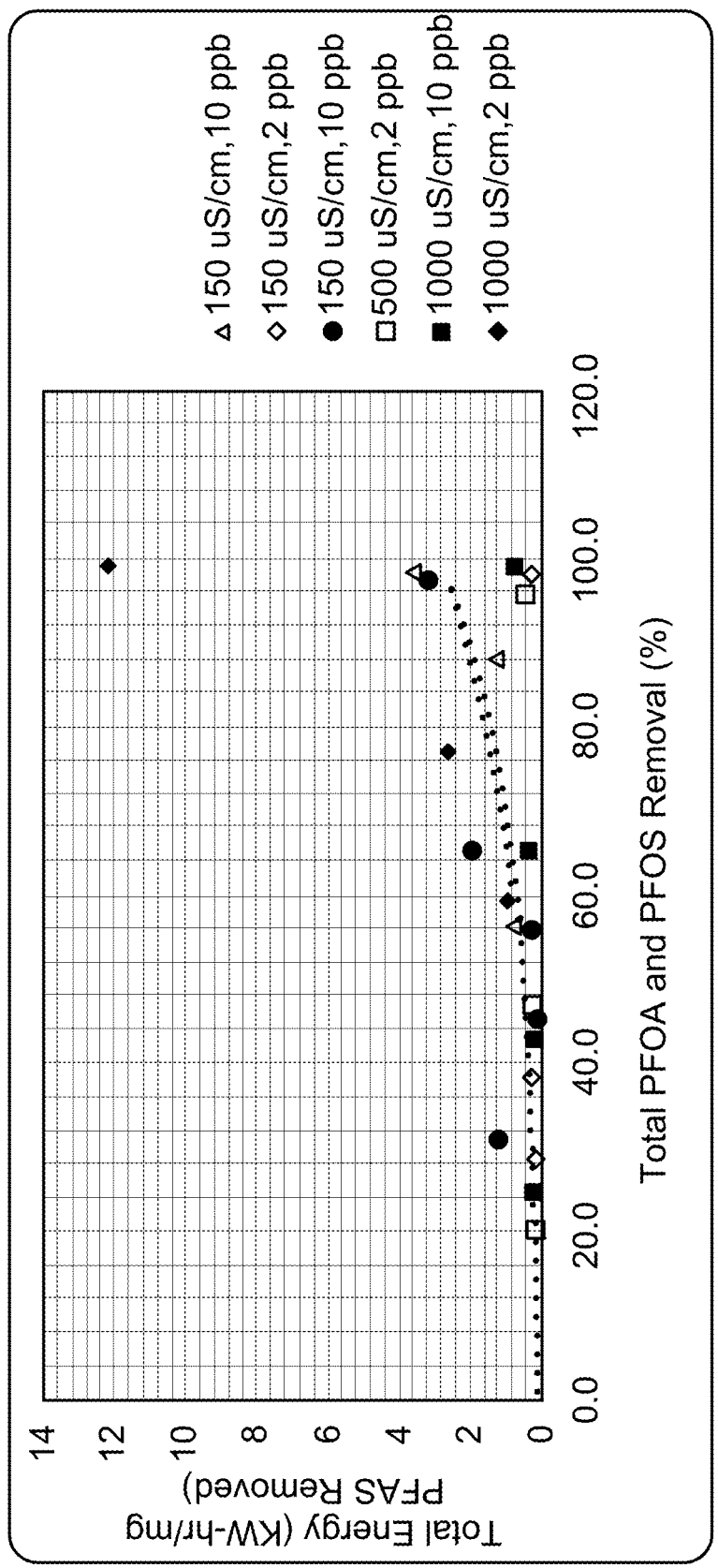
FIG. 17 is a graphic representation of Total Required Energy Per Mass PFAS Removal as a Function of Total PFAS Removal.

FIG. 17 is a plot of total energy requirements per unit mass (PFOA and PFOS) removed, as related to percentage total PFOA and PFOS removal.

Relationship Between Total Current and Required Energy

Figure 18:
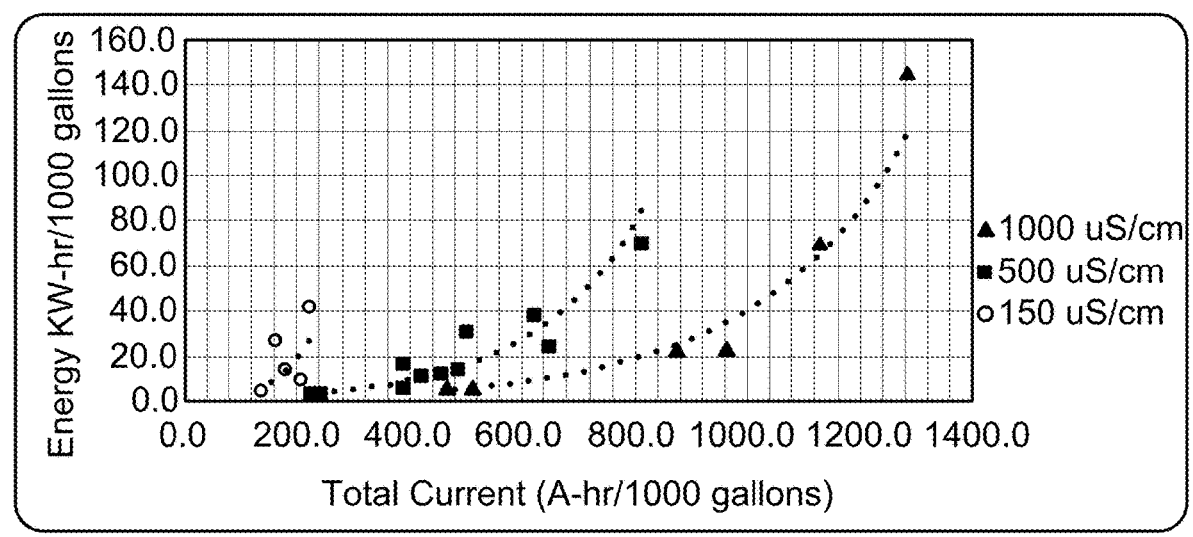
FIG. 18 is a graphic representation of AEC Operating Energy as a Function of Total Current.

Within the AEC there are a number of operating parameters interacting both independently and between parameters that govern the total energy requirement for a given total current. The primary factor influencing required energy is the inlet feed conductivity, which is shown in FIG. 18. As shown in the chart significantly more energy is required at lower concentrations at the same total current requirement.

Other Testing

In addition to the MTS, other operating conditions were evaluated to gain additional insight with respect to a specific operating parameter.

The primary data set evaluated included Runs 2-1 through 2-6 which represent the MTS for Activity II testing. Other evaluations outside the main data set and are discussed further in later discussion. These tests included the following:

Test 2-7 Evaluated the effect of lower temperature on performance

Test 2-8 Evaluated the effect of feed chamber flow rate (i.e., velocity) on performance Test 2-9 Evaluated the effect of higher AEM and CEM chamber conductivities on performance Test 2-0-16 Evaluated fate of tested PFAS in the AEM and CEM chambers Test 2-7 was conducted with a feed temperature of around 4° C. and at conditions that allowed comparison to Test 2-4. Test 2.8 was conducted by holding the total current at near 400 A-hr/1000 gallons, while operating at different feed rates. Test 2-9 was conducted by increasing the ratio between the feed rate and AEM/CEM flow rates, to produce a higher concentration factor. Test 2-0-16 was conducted to evaluate the fate of PFAS in the AEM chamber. This test was conducted by duplicating earlier tests, and starting with a feed concentration of 1,000 ppb of each PFOA and PFOS. The resulting samples were analyzed for potential degradation products. Additionally, a fluorine analysis was conducted.

MTS Operating Parameters and Observations

The primary operating conditions monitored during the test program included conductivity, temperature, pH, voltage, current, and the flow rate in each chamber.

Current Density

The effective exposed surface (individual membrane and electrode-single exposed surface) of the tested AEC module was 74 $cm^2$, the same as in Activity I testing. The average current over the MTS was 79.5 mA (average of run averages), with the highest run value of 125 mA (Test 2-6-3). The average current density was 1.07 $mA/cm^2$, with a maximum current density of 1.69 $mA/cm^2$. The highest current and current density of all of the test runs was 215.7 mA, and 2.91 $mA/cm^2$, respectively.

Module Electrical Resistance

Electrical resistance across the module averaged 590 ohms over the MTS, with a minimum test run average of 330 ohm (Run 2-1-1), and a maximum single run average of 1,133 ohm (Run 2-2-3). Additional discussion of electrical resistance is provided elsewhere.

Total Current

The total current passed through the AEC module averaged 512.1 A-hr/1000 gal., with a minimum test run average of 138.7 A-hr/1000 gal. and a maximum test run average of 1,332.7 A-hr/1000 gal.

Total Energy Consumption

Energy consumption averaged 25.9 KW-hr per 1000 gallons (KW-hr/1000 gal.) over the MTS. The highest single run energy consumption was 145.9 KW-hr/1000 gal (Run 2-2-3) and the lowest was 3 KW-hr/1000 gal (Run 2-3-1). Over the 150, 500, and 1000 uS/cm conductivity tests, the required energy averaged 17.5, 16.8, and 46.1 KW-hr/1000 gallons.

AEC Flow Rates Feed Flow Rate

Feed flow through the AEC system was conducted at 5, 10, and 35 mL/min over the Activity II testing program. Actual AEC and CEM chamber flows ranged from 4.9 to 35.3 mL/min. AEM and CEM chamber flow rates were maintained close to the same flow rates. Over the MTS the AEM and CEM flows averaged 4.1 mL/min and 4.2 mL/min, respectively.

During testing a vent port was placed in the AEM chamber to handle gas generation. An extra port was not required on the CEM chamber. There was no quantification of gas generation rate from the AEC. Gas generation will be a consideration in scale up and can be calculated based on the rate of water hydrolysis and cell efficiency using Faraday's Law.

AEM and CEM Chamber Conditions

During the MTS the anode pH ranged from 2 to 2.8, and the cathode 10.9 to 12. Conductivity in the AEM ranged from 1,431 to 3530 uS/cm, and 937 to 3257 in the CEM. The Activity II MTS conductivity averages for the AEM and CEM were 2,412 and 1,819 uS/cm, respectively.

Activity II Quality Assurance

A number of QC measures were implemented during Activity II testing to evaluate the quality of the results. Sample-specific measures included use of an equipment blank, and the analysis of more feed solution samples than originally planned. The additional feed samples were collected due to the low surrogate recoveries experienced in Activity I to provide a more consistent comparison between inlet and outlet concentrations.

The primary quality measure used to evaluate analytical results was $^{13}C$ surrogate recoveries. These isotopically labeled surrogates were added after the samples were received at the testing facility, but before concentration and analysis. Prior to sample submittal to the laboratory samples were stored in a refrigerator at 6° C., preserved with Trizma®, and transferred to the testing facility in coolers on ice.

The surrogate recoveries for Activity II testing are summarized in Table 4-3. Depending on the test feed stock either 10 uL or 2 uL of $^{13}C$ labeled compound was added.

TABLE 4-3

Surrogate Recoveries-Activity II PFAS Analyses

| Run #/ Sample ID | UTK Label | PFOA Conc. (ppb) | PFOS Conc. (ppb) | $^{13}C$ PFOA Recovered (ppb) | $^{13}C$ PFOS Recovered (ppb) | % $^{13}C$ PFOA Recovery | % $^{13}C$ PFOS Recovery |
|---|---|---|---|---|---|---|---|
| 2-1-TS | BL 49 | 14.11 | 10.26 | 8.62 | 5.58 | 86.3 | 55.8 |
| 2-2-TS | BL 69 | 2.038 | 1.166 | 5.89 | 4.6 | 58.89 | 45.96 |
| 2-3-TS | BL 50 | 14.07 | 7.74 | 9.13 | 5.58 | 91.3 | 55.8 |
| 2-4-TS | BL 70 | 1.905 | 0.745 | 6.04 | 4.72 | 60.41 | 47.20 |
| 2-5-TS | BL 51 | 14.97 | 7.90 | 8.64 | 5.48 | 86.38 | 54.8 |
| 2-6-TS | BL 71 | 1.954 | 1.208 | 6.19 | 4.61 | 61.91 | 46.10 |
| 2-7-TS | BL 72 | 7.995 | 5.036 | 4.96 | 3.85 | 49.64 | 38.52 |
| 2-8-TS | BL 52 | 14.76 | 10.43 | 8.48 | 5.54 | 84.84 | 55.4 |
| 2-9-TS | BL 73 | 7.272 | 4.734 | 4.66 | 3.87 | 46.58 | 38.66 |
| 2-1-1 | BL-53 | 11.67 | 6.73 | 10.14 | 6.46 | 101.41 | 64.59 |
| 2-1-2 | BL-54 | 5.82 | 2.64 | 10.55 | 6.67 | 105.54 | 66.69 |
| 2-1-3 | BL 55 | 0.12 | 0.13 | 12.03 | 7.44 | 120.33 | 74.42 |
| 2-2-1 | BL 74 | 0.687 | 0.622 | 6.45 | 4.74 | 64.53 | 47.39 |
| 2-2-2 | BL 75 | 0.488 | 0.255 | 6.53 | 4.90 | 65.25 | 48.99 |
| 2-2-3 | BL 76 | 0.009 | 0.025 | 6.83 | 5.00 | 68.31 | 49.97 |
| 2-2-AEM | BL 89 | 0.006 | 0.018 | 6.56 | 4.77 | 65.56 | 47.74 |
| 2-2-AEM1 | BL 94 | 0.003 | 0.012 | 5.60 | 3.76 | 56.05 | 37.55 |
| 2-2-AEM2 | BL 90 | 0.002 | 0.017 | 6.42 | 4.73 | 64.20 | 47.26 |
| 2-3-1 | BL 56 | 10.78 | 6.66 | 9.14 | 5.90 | 91.37 | 58.98 |
| 2-3-2 | BL 57 | 7.8 | 3.79 | 10.15 | 6.45 | 101.55 | 64.50 |
| 2-3-3 | BL 58 | 0.59 | 0.38 | 12.07 | 7.18 | 120.66 | 71.84 |
| 2-4-1 | BL 77 | 1.203 | 0.628 | 6.11 | 4.32 | 61.12 | 43.18 |
| 2-4-2 | BL 78 | 0.608 | 0.315 | 7.01 | 5.05 | 70.11 | 50.50 |
| 2-4-3 | BL 79 | 0.035 | 0.033 | 6.12 | 5.16 | 61.22 | 51.59 |
| 2-5-1 | BL 59 | 10.94 | 5.44 | 9.60 | 6.12 | 95.96 | 61.24 |
| 2-5-2 | BL 60 | 8.73 | 5.43 | 9.72 | 6.08 | 97.18 | 60.76 |
| 2-5-3 | BL 61 | 0.31 | 0.15 | 12.15 | 7.41 | 121.53 | 74.14 |
| 2-6-1 | BL 80 | 0.921 | 0.465 | 6.07 | 4.54 | 60.67 | 45.39 |
| 2-6-2 | BL 81 | 1.181 | 0.200 | 8.03 | 5.15 | 80.31 | 51.55 |
| 2-6-3 | BL 82 | 0.024 | 0.028 | 8.04 | 4.70 | 80.40 | 47.01 |
| 2-7-1 | BL 83 | 5.709 | 3.249 | 5.29 | 3.76 | 52.89 | 37.56 |
| 2-7-2 | BL 84 | 3.487 | 1.829 | 5.51 | 4.19 | 55.06 | 41.89 |
| 2-7-3 | BL 85 | 0.289 | 0.191 | 6.78 | 5.02 | 67.84 | 50.21 |

TABLE 4-3-continued

Surrogate Recoveries-Activity II PFAS Analyses

| Run #/ Sample ID | UTK Label | PFOA Conc. (ppb) | PFOS Conc. (ppb) | $^{13}$C PFOA Recovered (ppb) | $^{13}$C PFOS Recovered (ppb) | % $^{13}$C PFOA Recovery | % $^{13}$C PFOS Recovery |
|---|---|---|---|---|---|---|---|
| 2-8-1 | BL 62 | 8.96 | 4.84 | 10.03 | 6.39 | 100.25 | 63.90 |
| 2-8-2 | BL 63 | 9.65 | 4.78 | 10.03 | 6.34 | 100.30 | 63.42 |
| 2-8-3 | BL 64 | 7.18 | 3.97 | 10.54 | 6.42 | 105.45 | 64.18 |
| 2-8AEM1 | BL 65 | 0.01 | 0.03 | 10.45 | 6.91 | 104.46 | 69.11 |
| 2-8-CEM2 | BL 96 | 0.009 | 0.02 | 5.03 | 3.59 | 50.27 | 35.89 |
| 2-8AEM3 | BL 67 | 0.01 | 0.03 | 11.98 | 7.31 | 119.82 | 73.10 |
| 2-0-EB | BL 68 | 0.01 | 0.05 | 12.37 | 7.50 | 123.72 | 74.97 |
| 2-9-1 | BL 86 | 5.831 | 3.506 | 5.21 | 3.71 | 52.09 | 37.09 |
| 2-9-2 | BL 87 | 2.817 | 1.642 | 5.82 | 4.16 | 58.20 | 41.59 |
| 2-9-3 | BL 88 | 0.650 | 0.376 | 6.39 | 4.54 | 63.86 | 45.41 |
| 2-9-AEM | BL 91 | 0.002 | 0.018 | 6.3 | 4.63 | 62.99 | 46.27 |
| 2-9-AEM2 | BL 92 | 0.007 | 0.019 | 6.54 | 4.68 | 65.36 | 46.83 |
| 2-9-CEM | BL 93 | 0.005 | 0.019 | 6.69 | 4.62 | 66.90 | 46.15 |

Recoveries for PFOA were much higher than those of PFOS. The average recovery for PFOA was 80.07 percent with a range of 46.58 to 123.72 percent. The average recovery for PFOS was 53.69 percent with a range of 35.89 to 35.89. The testing facility laboratory indicated that PFOS has more interaction with surfaces than PFOA and is more prone to losses in the analytical process.

An equipment blank was prepared by placing DI water in the feed cell and removing it as a sample. The results were 0.01 ppb PFOA and 0.05 PFOS. These values are low relative to the objectives of the test.

As previously noted, feed samples from each test were analyzed. Feed surrogate recoveries for PFOA averaged 72.5 percent and 82.3 percent for treated samples. The difference in recoveries suggest that PFOA removal percentages are biased slightly lower than actual. PFOS surrogate recoveries averaged 48.7 percent and 54.7 percent. This would suggest an overall slightly higher bias to removal results. This also suggests that PFOS removals are biased slightly lower than actual. Overall, the results suggest that on a total mass basis 82.3% of the actual PFOA and 54.7 percent of the actual PFOS in treated samples is being reported, presenting an overall low concentration bias.

In the practice of the present invention, certain protocols and testing procedures evidence the benefits and practices of the present invention.

Protocols and Procedures

To investigate the fate of PFAS in the AEC system the basic approach will be to treat water spiked with a known concentration of PFOA and PFOS for several days to load the membrane with PFAS, hypothesizing that the fate of the PFAS is to "stick" to the membrane. After the membrane is loaded to the extent possible, with PFAS from a high concentration stock solution, which takes several days of continuous operation, the membrane will be removed for sample recovery. The membrane will be initially dried and then sonicated for 24 hours using HPLC grade methanol. After sonication, the methanol will be evaporated at ambient conditions in a lab hood to reduce the volume and concentrate the PFAS. The methanol will then undergo routine sample preparation as prescribed in EPA Method 537.1. The resulting samples have been analyzed.

A Test procedure is as follows:

6.1 Activity 1—Preparation of Feed Material

Prepare 30 liters of stock solution spiked to a concentration of 100 ppb of PFOA and 100 ppb of PFOS.

6.2 Activity 2—Preparation of the AEC and Instruments

Assemble a lab scale AEC unit with new anionic and cathodic membranes. Arrange the AEC to facilitate continuous measurement of conductivity across the unit and position the system so that the effluent can be collected for proper disposal. Conduct leak checks of the system and calibrate the system components using distilled water. Check the calibration of the conductivity meter using the standard solution provided by the manufacturer. Check the power output voltage using a multimeter.

6.3 Activity 3—Conduct Experiment

Conduct experiment by pumping the stock solution through the AEC at 10 cc/min, at 20 volts DC, allowing the amperage to float. Once per day, conduct an on-line cleaning of the membrane using the standard acid solution. Collect the acid effluent for analysis. Collect and document all volumes. Note that the goal is to load the membrane quickly and not necessarily to maximize the removal efficiency of the PFAS through the system. Relatively high PFAS concentrations may require less operating voltage to migrate toward the AEM chamber. Monitor desalination to gauge effectiveness of the system during treatment.

Continue treatment until at least 25 liters of 200 ppb total PFAS have been treated. Record voltage, amperage, time, temperature, pH of effluent and flow rate periodically during the experiment.

Sample Preparation for Analysis

After treatment of the PFAS laden water is completed, shut down and drain the system. Remove the AEM membrane from the apparatus. Place membrane into a PFAS compatible sample container and fill with 100 ml of HPLC grade methanol. Sonicate the membrane for 24 hours. After sonication, place the sample container(s) in the lab hood an allow the methanol to evaporate to 50 ml.

Prepare sample cartridge for analysis by transferring the sample through the sorbent media following EPA Method 537.1 procedures.

Samples of the membrane extract, the AEM chamber contents and effluent, the daily acid rinse and methanol from sonication of an equal area of unused membrane should be collected and prepared for analysis.

The results of the experiment are shown in Table A, below. The tests clearly demonstrated that almost all the PFAS collected by the AEC is deposited on the membrane. During routine operation, an AEC will undergo periodic cleaning cycles using acid and base. This cleaning routine is typical for all membrane-based technologies. The effluent from the cleaning cycle will be collected for disposal as a PFAS laden waste or reprocessed through a smaller AEC configured for high concentration, after pH adjustment. It may also be concentrated by evaporation at ambient temperatures to reduce volume. Further experimentation will be required to address the best methods of disposal of the acid cleaning solution.

Of the PFAS compounds attracted by the AEM chamber, (i.e. moving to the membrane), over 99.99% of the total was captured on the membrane. At the measured membrane retention of 99.995%, less than one molecule out of 50,000 PFAS molecules was able to penetrate the membrane to be collected in the AEM chamber. This result implies that in most applications, the AEM chamber can be recombined with the CEM chamber effluent and returned to the treated stream. In some highly critical applications, the AEM chamber can be collected as PFAS contaminated material to be further treated or disposed.

The acid cleaning of the membrane during on-line cleaning cycles was able to remove approximately 35% of the PFOA and 18.5% of the PFOS. This activity would then extend the useful life of the membranes, affording more capacity and service life. Additional experiments are required to bracket the effectiveness of acid as well as the addition of cleaning with a caustic solution.

It should be noted that higher concentrations of PFAS, both PFOA and PFOS, were found in the extract of the new unused membrane than was found in the AEM chamber sample. However, since any PFAS that may be on the new membrane would be retained on the membrane during operation, and the total mass would be inconsequential over the life of the membrane in service, the results should reflect that anticipated use.

It should be noted that the methanol sonication method of extracting PFAS from the membrane has never been tried and is not a fully developed analytical method. In fact, no fully approved method has yet been developed for solid matrices. The low analytical recovery of the labeled PFAS compounds suggests that the methanol extraction method can be improved through the addition of a polar solvent (water and salt). The values in Table 1 have been corrected for analytical recovery.

TABLE 1

Summary of Results, PFAS Fate
Proof of Concept Test, Lab Scale AEC

|  | PFOA (ug/L) ppb | PFOS (ug/L) ppb | Total PFOA (ug/L) | Total PFOS (ug/L) |
| --- | --- | --- | --- | --- |
| Acid rinse | 133.95 | 15.35 | 66.974 | 7.6732 |
| AEM extract | 1,240.68 | 336.78 | 124.07 | 33.678 |
| AEM discharge | 0.02691 | 0.00957 | 0.00673 | 0.00239 |
| Blank Membrane | 0.83 | 0.04 | 0.08273 | 0.00354 |
| Removed During Acid Cleaning |  |  | 35.06% | 18.56% |
| Retained on membrane after acid cleaning |  |  | 99.997% | 99.994% |

Equipment Checks and Calibration

The primary test monitoring parameters included pH, conductivity, voltage, current, pH, conductivity, and mass. Calibration was checked as described herein.

PFAS Removal Findings

Findings from Activity II of the MTS are summarized below. Additional findings for other specific tests outside the MTS are described in Section 5.0.

The AEC is capable of removing a high percentage of the PFOA and PFOS from the Feed Chamber in the flow-through operating mode.

Total and individual PFOA and PFOS removal can be reasonably predicted based on salt removal in the flow-through operating mode.

Module electrical resistance increases with reduced feed chamber concentration in the flow through operating mode. This same correlation was observed in the batch testing.

There is a correlation of salt removal and PFOA and PFOS removal, as a linear function, with higher PFOA and PFOS removal achieved at a lower feed salt content.

Removal efficiencies for both PFOA and PFOS were equivalent under the range of operating conditions tested.

The removal efficiency is dependent on total current transferred across the AEC, with higher removal experienced at higher total current (i.e., A-hr).

More current and total energy is required for the same total PFOA and PFOS removal at higher salt concentrations/conductivities.

Between 4 and 30 percent more energy is required to remove total PFOA and PFOS when the initial feed concentration is 2 ppb as opposed to 10 ppb.

In comparing batch and flow-through testing results, batch operation requires lower current and energy than the flow-through mode for a given percentage PFOA and PFOS removal.

Other Observations and Findings

Other findings related to the MTS are as follows:

When the AEC was operated without spacers inside the chamber, the AEM membrane deformed significantly to the point of causing membrane damage.

Anode vent off-gassing was significant, and approximately equal in volume to the side chamber feed rate. Off gassing was not quantified.

A white sediment was formed in the AEM chamber during all runs, and was found through analysis to consist primarily of titanium. The next generation of AEC will require use of a more durable anode electrode.

During testing it was observed that the AEM and CEM chamber pH steadily became more extreme to a point, at which time the pH stabilized, typically around 2 pH (AEM chamber), and 11.5 (CEM chamber). The same stabilization effect was also observed with conductivity.

Activity II Conclusions

The results from Activity II demonstrated that the AEC, when operated in flow-through mode can remove a high percentage of PFOA and PFOS from aqueous streams initially at 2 and 10 ppb. The total current transfer required to achieve the removal depends on the initial feed conductivity, with higher current transfer requirements for higher initial salt concentration feeds. Additionally, PFOA and PFOS removal can be predicted by salt removal.

Activity I AEC Resistance as Related to Feed Conductivity—Conductivity Impact

Figure 19:
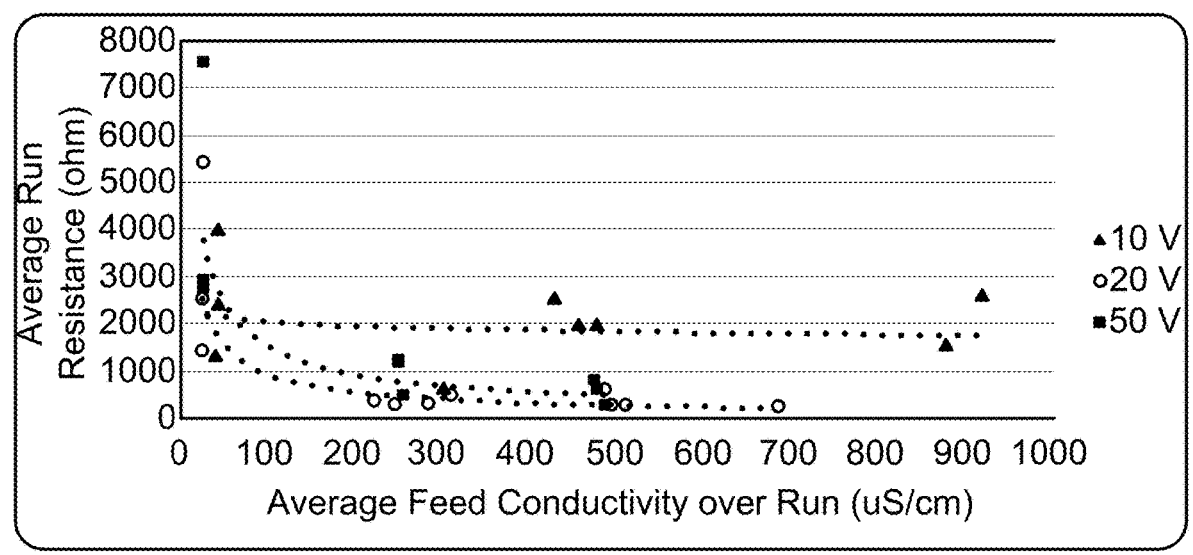
FIG. 19 is a graphic representation of Activity I Average Run Cell Resistance as a Function of Average Feed Conductivity.

The effective AEC cell electrical resistance was calculated from measured current and voltage over each test run of the MTS. Average test cell resistance for the Activity I batch runs is presented in FIG. 19 as a function of average feed water conductivity, and at different treatment voltages. Specifically, the average run resistance is plotted against the average of the initial feed concentration and final concentration after treatment. The results show a trend of lower average resistance with an increase in average feed conductivity; although the effect is diminished at a conductivity above 50 µS/cm. Also shown is lower resistance with higher treatment voltage.

Figure 5:
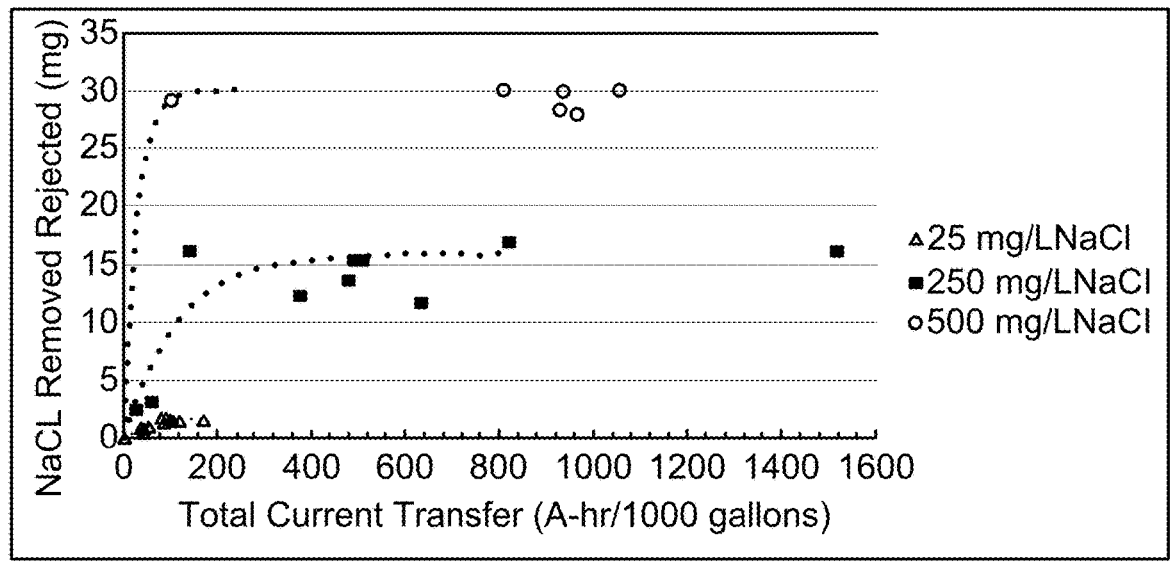
FIG. 5 is a graphic representation of Total Current Transfer Required to Achieve Salt Mass Removal—Activity.
Figure 20:
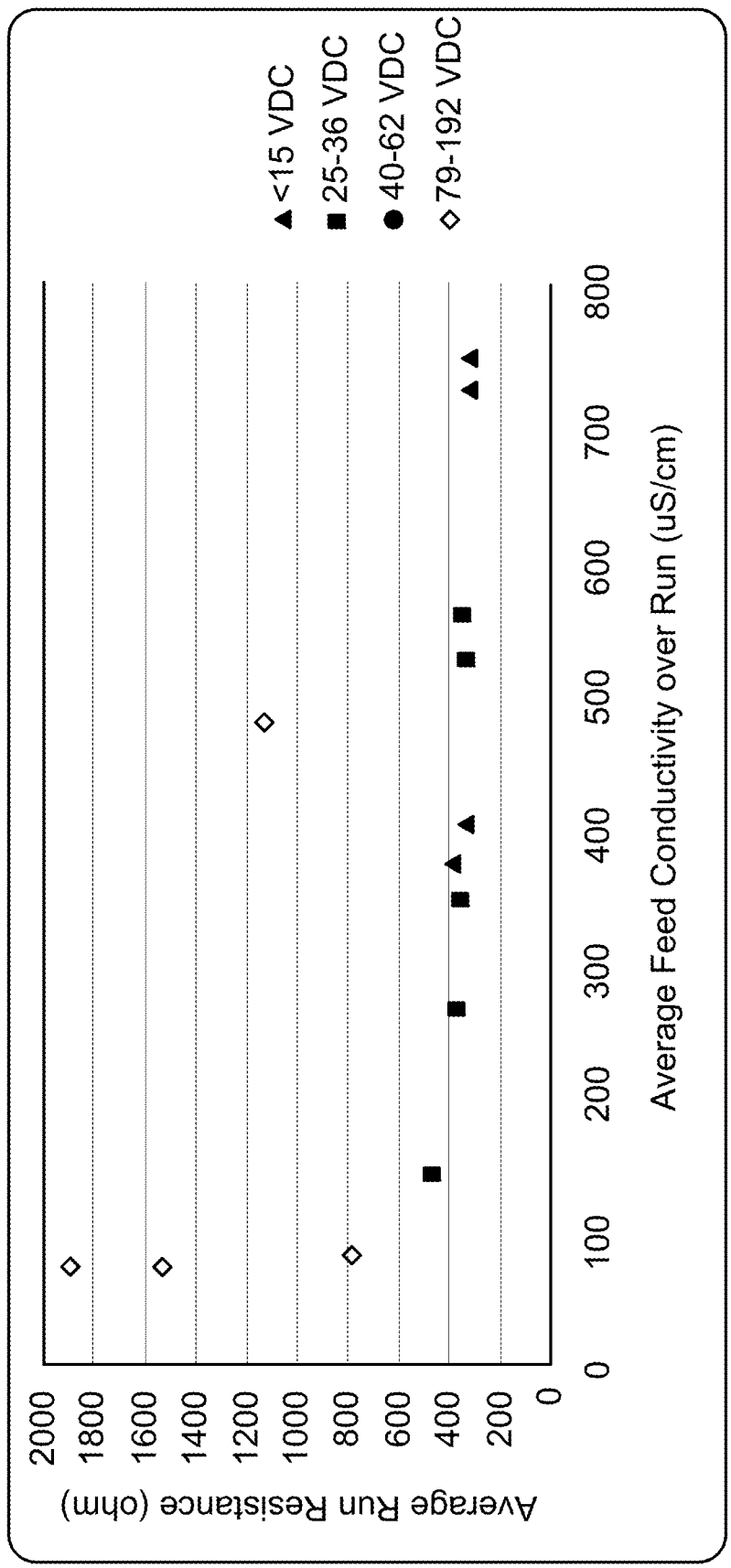
FIG. 20 is a graphic representation of Activity I Average Run Cell Resistance as a Function of Average Feed Conductivity.

The same graph was prepared for Activity II results and is presented in FIG. 20. Activity II results show the same general trend of lower average resistance with an increase in average feed conductivity; however, the results suggest an inverted voltage effect as compared to Activity I resistance results. The trend shows a diminished impact of average feed conductivity above 100 uS/cm, similar to that observed in Activity I (FIG. 5-1). The correlation of resistance with treatment voltage does not appear as strong with the flow-through runs as compared to the batch results, although as previously noted both graphs show a sharp spike in resistance at low feed conductivities.

Overall resistance was considerably lower over the flow-through test, as compared to the batch test. This difference is likely due to the longer overall residence times in Activity I that resulted in more time operating during the low feed conductivity period later in the test runs.

Electrode Resistance and Surface Area

Figure 22:
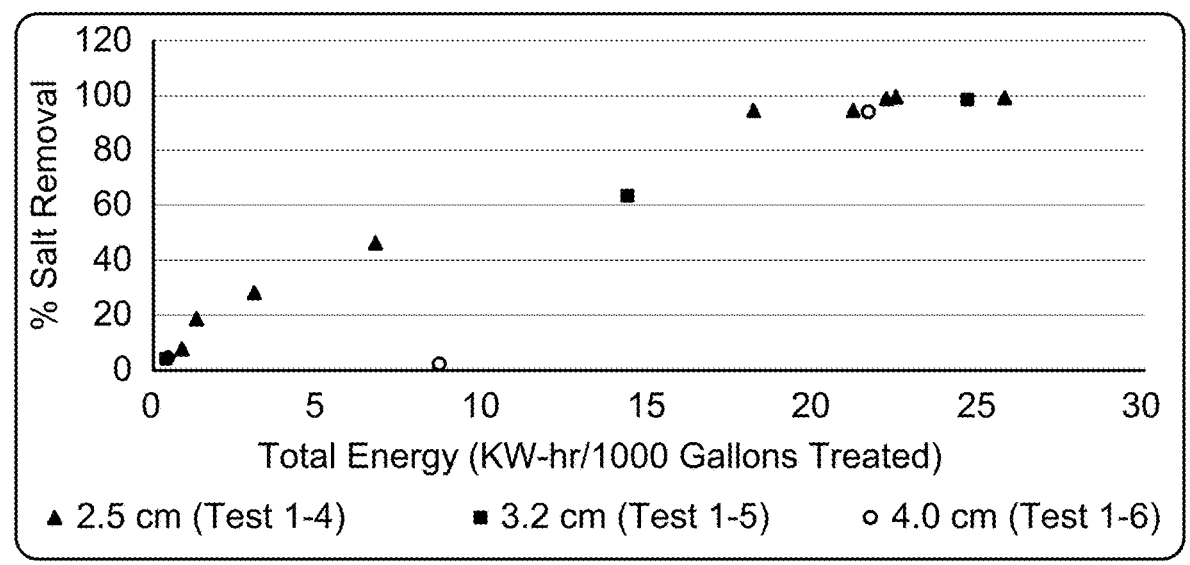
FIG. 22 is a graphic representation of Salt Removal Versus Total Power—Activity I.

A test, not specifically related to AEC testing was conducted to evaluate the effect of exposed electrode surface area on cell electrical resistance. In the test, a 3-inch wide Grade 2 titanium plate was immersed in a 1,530 uS/cm sodium chloride solution at a 1.2-inch plate separation. There was no mixing of the liquid contents. Results, presented in FIG. 22 show a non-linear reduction in cell resistance as the exposed surface area increases. As observed in FIG. 19, resistance is lower at higher operating voltage, likely due to localized increased ionic strength between the plates caused by ions generated through hydrolysis, which would increase at the higher voltages.

The AEC module used during testing had an effective area of 11.32 in$^2$. The plot in FIG. 22 shows that at a larger commercial system's surface area, resistance would be reduced by a factor of about 2 times, due solely to the increased surface area.

Electrical Resistance and Electrode Spacing

Figure 23:
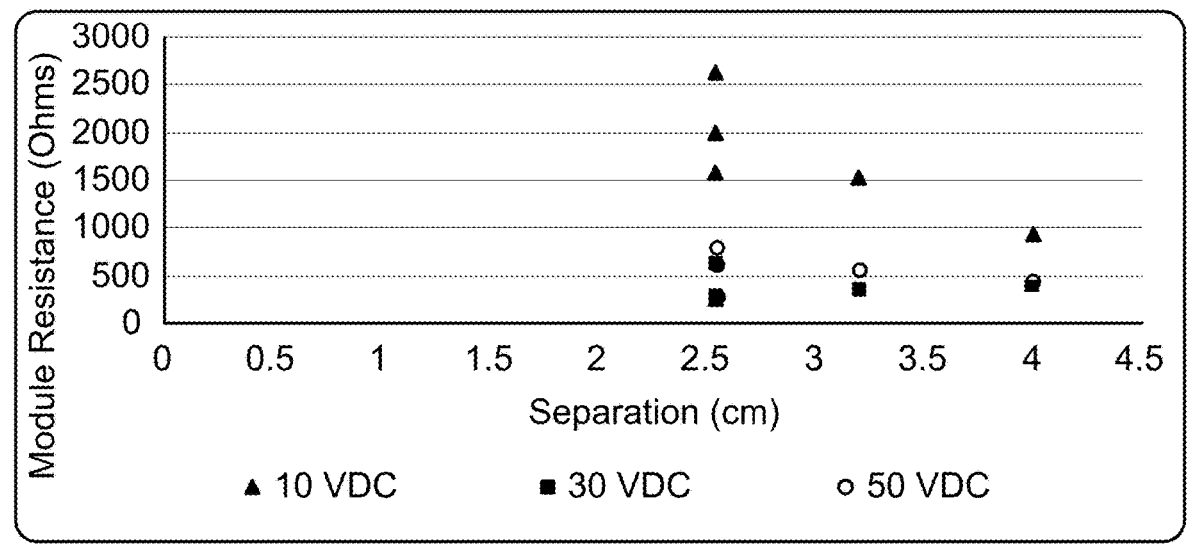
FIG. 23 is a graphic representation of Effect of Electrode Spacing on AEC Module Resistance.

In Activity I, Tests 5 and 6, the feed chamber thickness was increased. This had the effect of changing the separation distance from 2.5 cm (MTS) to 3.2 cm (Test 5), and 4.0 cm (Test 6). These increased spacing tests were conducted at 250 mg/L NaCl, and results are shown in FIG. 23. The chart shows the same general trend of higher resistance at lower voltage as observed in FIG. 19. The chart also suggests decreasing resistance with increased electrode separation distance. There was not a similar test associated with Activity II. The next generation of AEC in the scale-up process will need to include a flow-through evaluation of electrode separation distance and Feed Chamber thickness to provide a conclusive finding relative to the impact of electrode spacing on electrical resistance.

Membrane Chamber Ion Accumulation

Figure 24:
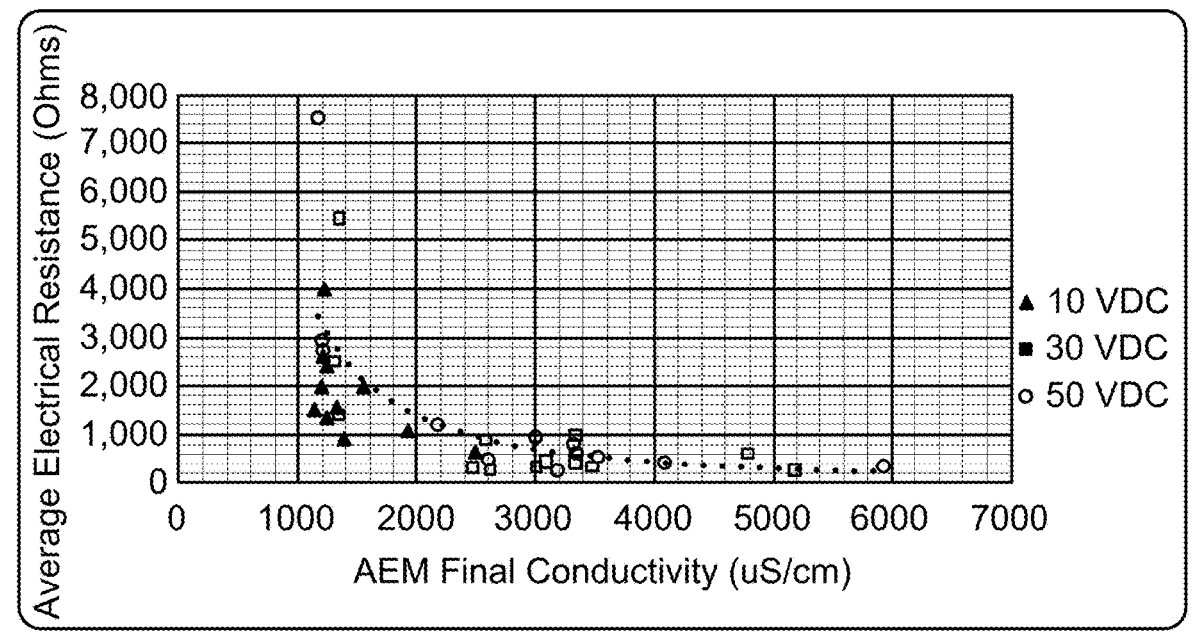
FIG. 24 is a graphic representation of Impact of AEM Final Conductivity on AEC Module Average Electrical Resistance-Activity I.

Several tests were conducted during Activity I to evaluate the impact of conductivity in the side chambers on overall AEC electrical resistance. As shown in FIG. 24, the AEC electrical resistance is correlated with the final conductivity in the AEM chamber. The same relationship would hold for the CEM chamber conductivity, which correlates proportionally with AEM chamber conductivity. FIG. 24 shows that below about 1,500 uS/cm AEM conductivity, AEC cell resistance can become quite high. Above 1,500 uS/cm the electrical resistance of the cell slowly falls with increasing AEM chamber final conductivity. In the test series the side chamber stream to the middle was initially at 200 uS/cm.

Figure 25:
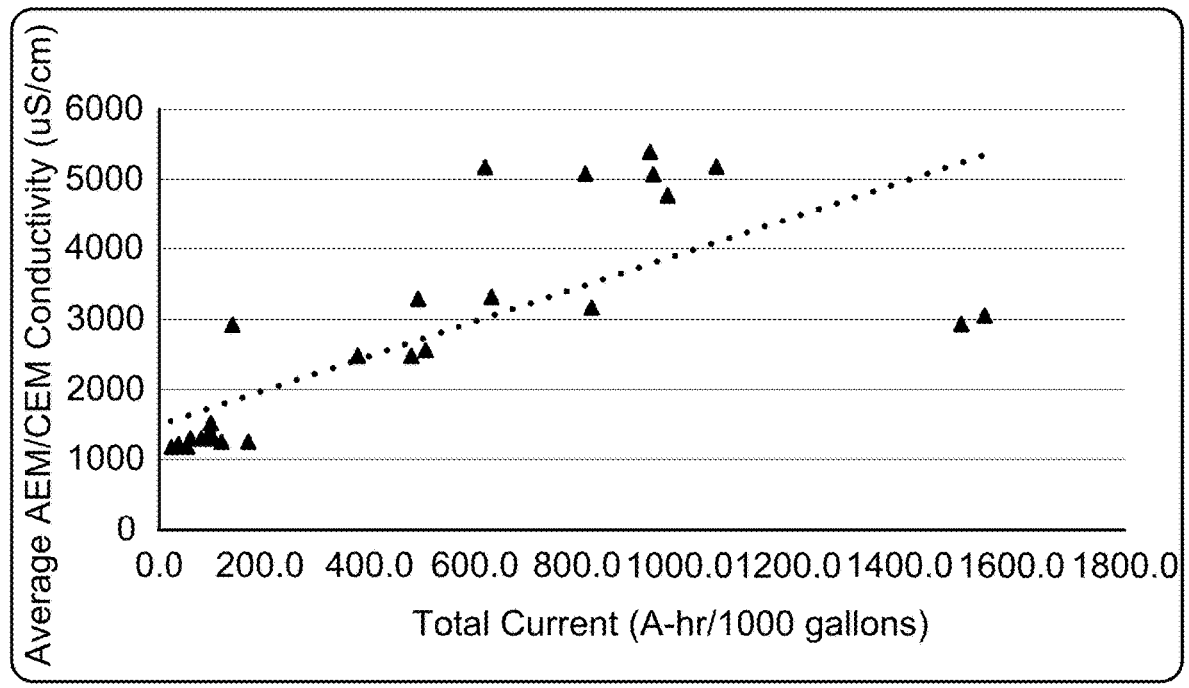
FIG. 25 is a graphic representation of Impact of Total Current on AEM and CEM Chamber Conductivity.
Figure 26:
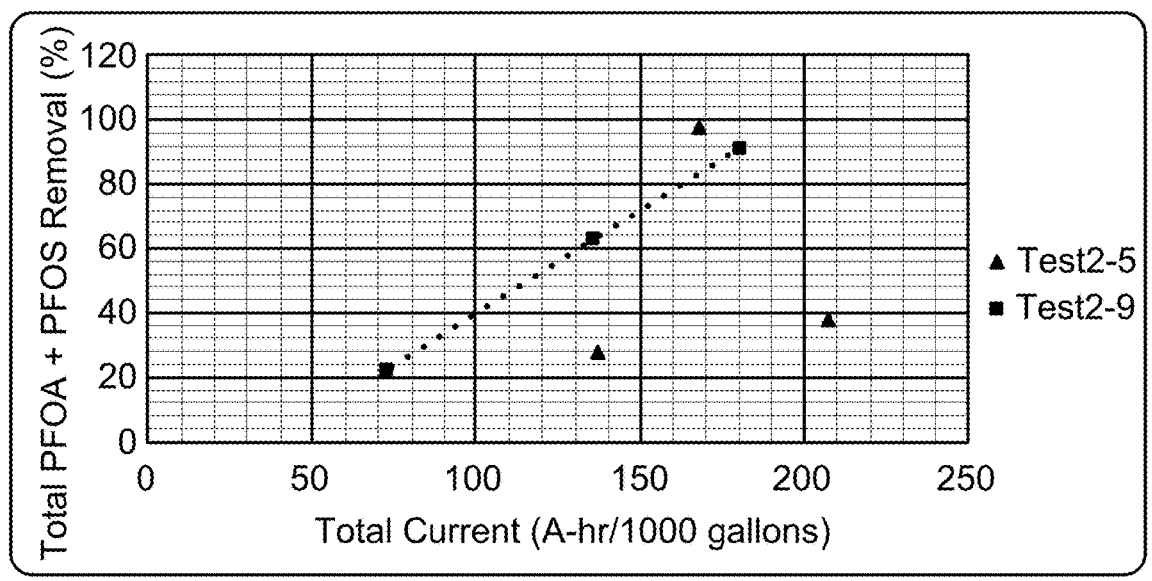
FIG. 26 is a graphic representation of Comparison of Total Current Requirement of Test 2-5 and 2-9.

FIG. 25 shows that average AEM/CEM conductivity increases with total electrical current transferred across the AEC.

Estimation of AEC Cell Average Resistance

The key operating parameters for the Activity I MTS were evaluated using multiple linear regression. As previously shown, there is a correlation between a number of operating parameters and AEC resistance. However, the overall correlation coefficient for parameters of statistical significance is low, at 0.45. The resulting equation is:

$$\text{Resistance (ohm)} = 51.889 \times (\text{Volts}) - 0.8918 \, (\text{AEM Cond. uS/cm}) + 2477.1$$

This equation will provide a reasonable approximation of the AEC cell resistance for the Batch testing in Activity I.

The same evaluation was performed for Activity II MTS results. The adjusted correlation coefficient is 0.93, and the p-value for voltage and AEM conductivity are 0.00 and 0.26, respectively. The resulting equation is:

$$\text{Resistance (ohm)} = 8.5365 \times (\text{Volts}) - 0.054 \times (\text{AEM Cond. uS/cm}) + 283.9$$

In both Activity I and II, voltage is the controlling parameter with AEM conductivity affecting resistance to a lesser extent.

Impact of Electrode Separation on Salt Removal

In two of the tests of Activity I, different electrode separations distances were tested. FIG. 22 is a plot of salt removal as a function of energy per 1000 gallons of treated water. The separation distances of 2.5 cm, 3.2 cm, and 4 cm are represented as different colored data points on the chart. The feed chamber sizes were 63.9 mL (Test 1-4), 115.3 mL (Test 1-5), and 166.6 mL (Test 1-6), and all of the tests were conducted at an initial salt concentration of 250 mg/L, NaCl.

The results are compared to Test 1-3. The results suggest slightly lower salt removal for 3.2 cm spacing and even lower removal at 4.0 cm spacing. Interestingly, the effect of reduced salt removal is not as pronounced at higher energy input levels.

Effect of Exfoliated Graphite on Membrane Chamber Conductivity

In Activity I, Test 1-10 (1-3), the effect of exfoliated graphite on AEC module electrical resistance was evaluated. This was not a part of the original test suite. In this test, both AEM and CEM chambers were packed with exfoliated graphite (EG). PFAS were not analyzed in this test. Performance with regard to salt removal appeared to be similar to testing conducted in Test 1-1-4. Due to the limited data close comparison to the other run was not possible. However, the addition of the EG did not appear to produce a significant change in the AEC overall electrical resistance.

Operation of AEC on Local Tap Water

A test was conducted where the AEC was operated for seven (7) hours on tap water from Oak Ridge, Tennessee. AEC operating conditions ranged from 17 to 100 VDC, and 50 to 197 mA. The initial feed conductivity was 274 uS/cm. Over the first 5 hours, voltage was maintained at around 44

VDC, with current around 75 mA. Final conductivity held at around 20 uS/cm for about 3.5 hours, after which time it increased to 66 uS/cm. At 3.5 hrs the power was turned off for 5 minutes. No significant reduction in outlet conductivity was observed once power was switched on. At around 4 hours into the test the polarity was reversed for 10 minutes. Immediately upon restoring normal polarity the current increased to 250 mA and then quickly stabilized around 70 mA. There was no significant impact on salt removal performance from polarity reversal, with subsequent outlet conductivity ranging from 55 to 69.3 uS/cm.

Toward the end of the test the voltage was increased to 100 VDC, and the outlet conductivity quickly dropped to 8.5 uS/cm and stabilized near this value.

Upon concluding the test, the AEC module was opened and inspected. The electrodes appeared to be in good condition. A white precipitate was observed at the bottom of the AEC module anode chamber, with a weight of 160 milligrams (mg). The material was pasty and white in color, and did not readily dissolve in acid or base. It was subsequently tested using SEM and found to be titanium dioxide (Refer to Section 5.9). In addition to the residue, it was also found that both the AEM and CEM membranes had migrated into the feed chamber and were resting against the center spacer. It is believed that the increase in outlet conductivity observed over the test was due to the shorter feed chamber residence time caused by the deforming membranes. The membranes both assumed their original form after soaking in salt water. It has been determined that the use of raised areas on the membranes, as discussed above is effective in preventing contact between the layers due to the distortion. Raised areas such as extruded or adhered lines or spaced dots, preferably covering less than 10%, and preferably less than 8% of the surface area are preferred to address this issue.

This testing shows the likely need for a more durable electrode in the AEM chamber, and the need for reinforcement/support of the membranes. During scale-up care will need to be taken to minimize the potential for membrane deformation. This will include placement of spacers in the flow space or backing material integrated with the membrane.

One run was conducted at a high current of 5 amps (67.6 mA/cm$^2$), which destroyed both membranes.

AEC Side Chamber Concentration Effects

Over the course of testing some Activity II runs allowed the evaluation of the extent concentration that could be accomplished in a single 3-chamber AEC module.

During operation of the AEC the concurrent hydrolysis of water resulted in the accumulation of hydrogen ion (H+) and chloride (Cl−) ions in the AEM chamber. This resulted in an increase in AEM chamber conductivity proportional to total current input. The pH in the AEM chamber decreased corresponding to the increase in hydrogen ion (H+). In most of the tests the AEM chamber pH dropped to around 2.

As the feed stream is treated, PFAS and salt is transferred out of the feed stream and into the AEM and CEM chambers potentially resulting in a concentration effect. However, the definition of concentration requires further discussion. In dealing with PFAS, a certain fraction will be transferred from the Feed chamber into the AEM chamber. For example, in an AEC operated in the batch mode if 100 ppm PFAS was initially in the feed and 100 percent removed, the entire mass would then be in the AEM chamber. If the AEM chamber was the same size there would be no concentration. However, if the AEM chamber was ½ the volume the PFAS would be concentrated by a factor of 2 times.

In a flow-through system the concentration factor (CF) is calculated as follows:

$$CF = \frac{F_f}{F_{AEM}}$$

Where,

CF=Concentration factor $F_f$=Flow Rate of Feed stream $F_{AEM}$=Flow rate of AEM stream In application, if subsequent treatment of the AEM stream is used to remove the PFAS then the concentration factor applies as noted above. However, if the AEM and CEM streams are combined prior to further treatment then the AEM volume or volumetric rate must be added to that corresponding to the AEM chamber, which will reduce the extent of concentration.

During Activity I the AEM and CEM chamber sizes were the same volume so there was no concentration occurring, just transfer of the salt and PFAS from the Feed to the AEM chamber. During Activity II the concentration factor was adjusted by AEM flow rate adjustment.

During Activity II, Test 2-9 was conducted specifically to evaluate performance at a higher side chamber concentration factor. In a pre-test (2-0-13) used to set the conditions for 2-9, the Feed chamber flow was 25 mL/min and the side chambers were both at 0.52 mL/min, for an AEM chamber concentration factor of 48. This test involved operation at 250 mg/L NaCl in the feed, and at an initial 203 uS/cm side chamber conductivity. Throughout the test, electrical current was steadily increased to a final current value of 310 mA, at which point the AEM chamber measured 12,890 uS/cm and the CEM chamber measured 13,790 uS/cm. The highest salt removal was 77.6 percent at 310 mA, and 50 VDC, and at a cell residence time of less than 10 minutes. The extreme pH values were 1.8 (AEM) and 12.6 (CEM). At 95 minutes into the test, at the point of highest salt removal, the current suddenly fell from 310 to 25 mA and stabilized at near that value. The test was halted and the apparatus disassembled and weighed. The anode rinse contained a milky sediment, but the AEM appeared to be in good condition other than slight discoloration in a few locations.

Test 2-9 was conducted at the same operating conditions but at a higher side chamber flow rate of 1 mL/min, for a maximum concentration factor of 35. Table 5-2 presents a comparison of Test 2-8 with Test 2-3 of the MTS. Both were conducted at 35 mL/min feed rate, at 250 mg/L feed salt, and 10 ppb feed PFOA and PFOS. FIG. 5-9 shows removal and associated total current. Test 2-9 showed better overall performance as compared to Test 2-3. Therefore, a CF of between 35 and 48 times appears to be achievable in the AEM chamber.

TABLE 5-2

Comparison of High AEM Total Ion Concentration Run With a Similar MTS Run

| Run | Salt Removal (%) | Total PFOA + PFOS Removal (%) | Total Current (A-hr/ 1000 gal.) | Total Energy (KW-hr/1000 gal.) | AEM Chamber Flow (mL/ min) | AEM Chamber Conductivty ($\mu$S/cm) | Voltage (VDC) | CF |
|---|---|---|---|---|---|---|---|---|
| 2-3-2 | 58.78 | 44.6 | 422.5 | 11.41 | 4 | 2,270 | 27 | 2.8 |
| 2-3-3 | 99.60 | 95.6 | 622.6 | 38.72 | 4 | 2,625 | 62 | 2.8 |
| 2-9-1 | 40.8 | 22.2 | 72.1 | 1.87 | 1 | 2,190 | 26 | 35 |
| 2-9-2 | 83.2 | 62.9 | 135.2 | 7.10 | 1 | 3,340 | 52.5 | 35 |
| 2-9-3 | 97.6 | 91.5 | 180.3 | 23.79 | 1 | 5,570 | 132 | 35 |

Fate of PFAS

During Activity I testing it was observed that no PFOS or PFOS was found in the concentrate chamber of the AEC. This finding was confirmed in Activity II testing.

Initial analytical activities directed at determining the fate of the PFOA and PFOS removed from the feed chamber included the following:

Analysis of the side chamber liquid (both AEM and CEM) for PFOA and PFOA.

Analysis of AEM membrane HPLC water rinse for PFOA and PFOS.

Analysis of AEM electrode rinse for PFOA and PFOS

Analysis of AEM electrode residue and deposits found in the AEM chamber. These residues were first extracted in methanol, taken to dryness, re-dissolved in HPLC water, and that water recombined with the AEM chamber water for analysis.

During Activity I a sample was collected and analyzed after the feed was placed in the Feed Chamber with no associated current and with no loss in PFOA and PFOS content.

The results of these evaluations are presented in Table 5-3

TABLE 5-3

AEM and CEM Chamber Liquid Analytical Results

| Run #/ Sample ID | Description | UTK Label | PFOA Conc. (ppb) | PFOS Conc. (ppb) |
|---|---|---|---|---|
| 2-2-AEM | Test 2-2, Anode Liquid | BL 89 | 0.006 | 0.018 |
| 2-2-AEM1 | Test 2-2. Anode Rinse + Solids Extract | BL 94 | 0.003 | 0.012 |
| 2-2-AEM2 | Test 2-2, AEM Rinse | BL 90 | 0.002 | 0.017 |
| 2-8AEM1 | Test 2-8, Anode Liquid | BL 65 | 0.010 | 0.030 |
| 2-8-AEM2 | Test 2-8, Anode Rinse + Solids Extract | BL 96 | 0.009 | 0.020 |
| 2-8AEM3 | Test 2-8 AEM Rinse | BL 67 | 0.010 | 0.030 |
| 2-9-AEM | Test 2-9, AEM Liquid | BL 91 | 0.002 | 0.018 |
| 2-9-AEM2 | Test 2-9, Anode Rinse + Solids Extract | BL 92 | 0.007 | 0.019 |
| 2-9-CEM | Test 2-9, CEM Liquid | BL 93 | 0.005 | 0.019 |

Analytical results show no significant PFOA or PFOS in either the AEM or CEM Chambers. Additionally, no significant concentrations of PFOA or PFOS were found in the anode electrode rinse, AEM rinse, or the sediment extract.

Subsequently, a study was undertaken to identify the fate of the two PFAS. This study was not a part of the original test plan. It was suspected that the PFAS was being degraded by oxidation and free radical attack at the anode. A supplemental test was developed to analyze liquid in all chambers, and generated solids.

This testing involved creating a feed sample with a higher concentration of each PFAS (i.e., 1 ppm) than was used with the "official" test matrix. This higher PFAS concentration was required to provide the necessary analytical detection of possible PFAS degradation products. Flow-through testing (Test 2-0-16) was conducted at 10.7 mL/m, at 610 to 850 A-hr/1000 gallons, and at 250 mg/L NaCl in the feed stock, producing greater than 99 percent salt removal (99.2 to 99.7 percent).

The samples from Run 2-0-16 were analyzed using a high-resolution Q Exactive (QE) Thermo Scientific Quadrupole-Orbitrap Mass Spectrometer, operated in the negative mode and set for a broad focus (nontargeted) to identify possible degradation products. This is a different instrument than the LC-MS/MS (QQQ) that was used to quantify PFOA and PFOS. Samples analyzed included AEM and CEM Chamber liquid, residue, feed, treated feed, and blank samples. The QE analysis, although non-quantitative, provided the following findings:

The QE analysis further supported the results from Phase I analytical program showing high removal of PFOA and PFOS from the feed stream.

The QE analysis identified a number of other PFAS impurities (low level impurities in the analytical standards) in the feed at lower levels than the PFOA and PFOS (i.e., C6 PFAS acid, C7 PFAS acid, C6 PFAS sulfonic acid, C9 PFAS acid), and all of these showed removals through AEC treatment similar to that of the spiked PFOA and PFOS.

The QE analysis showed no significant levels of PFOA or PFOS in any of the samples analyzed other than the relative expected chromatogram peak area ratios between in the feed inlet and outlet samples.

A large number of unknown features were detected in the QE screen across the sample types indicating the presence of potential breakdown products/pathways, many of which were not seen in the feed exit stream. Due to the high analytical sensitivity of this method, a portion of these features could be organic residues associated with PFAS impurities in the spike sample, PFAS degradation products, butyl rubber decomposition products, and AEM and CEM breakdown products. The AEM sample had the most features detected, including 26 that were only detected in the AEM. The high peak areas of the features identified in the AEM as compared to the other samples could be indicative of breakdown products.

The samples were also analyzed for fluorine, but the results were inconclusive because the samples used had been previously extracted for Method 537 analysis.

Follow-up testing was conducted to obtain more conclusive results. A 1 ppm PFOA and PFOS spike was added to the AEM Chamber feed and the sample train was operated in the same manner as 2-0-16. The sample was submitted to a local laboratory for Fluorine analysis to determine if the PFAS was being mineralized. Additionally, the same test setup was run with 10 ppb of PFOA and PFOS spiked into the AEM Chamber feed. The AEM exit sample was submitted to a commercial laboratory for PFAS analysis (24 compound list, including PFOA and PFOS). These results are not available as of this submittal.

In summary, the above results show that PFOA and PFOS are being chemically modified or decomposed within the AEC.

Comparison of Nafion® 117 Membrane and Fumesep® FKA-50 Membrane CEM

Figure 27:
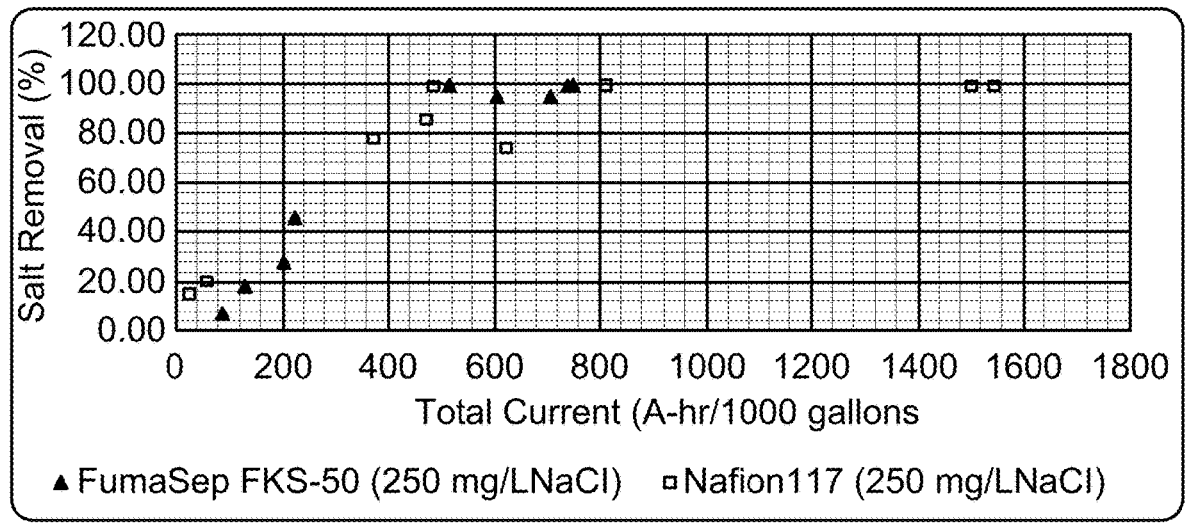
FIG. 27 is a graphic representation of Comparison of FKS-50® membrane and Nafion® 117 membrane CEM Performance.
Figure 28:
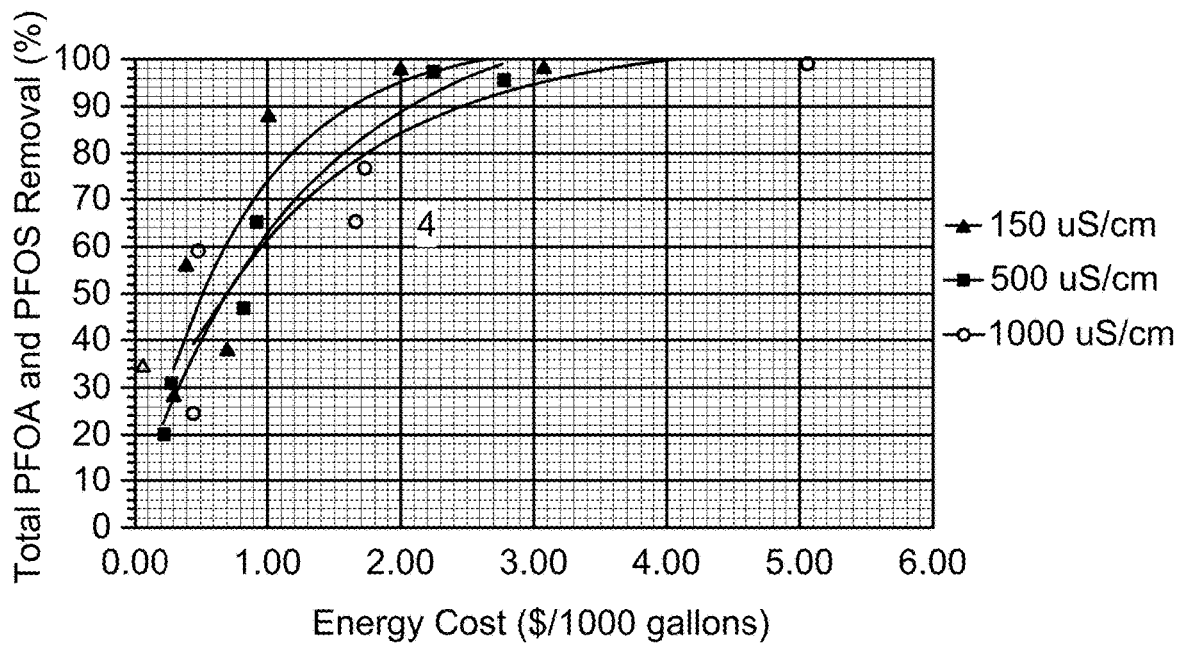
FIG. 28 shows total PFOA and PFAS removal % as a function of energy cost.

During Activity 1, Test 4, Runs 1-9, Nafion® membrane 117 CEM was used. FIG. 5-10 provides a graphical comparison of salt removal performance between Test 4 (Nafion®) and Test 3 (Fumasep® FKS-50). The Nafion® appears to require slightly lower current for a given removal, particularly at currents below 200 A-hr/1000 gallons. However, the results are not consistent throughout the graph in FIG. 27.

The fluoride detected in Sample 1 is likely the result of fluoridation of the water (Oak Ridge, TN tap water used in this test). The fluoride in Sample 2 (DI water source) suggests mineralization of organic fluoride.

Impact of AEC Residence Time on Performance

Test 2-8 was conducted to evaluate the effect of AEC module liquid feed residence time on performance. In this test the feed was operated at three rates (5, 10, and 35 mL/min). The operating voltage was varied to produce a constant electrical current in each test. All runs were conducted at the same initial feed conductivity of 491 uS/cm. Table 5-7 summarizes the results of the testing.

Figure 29:
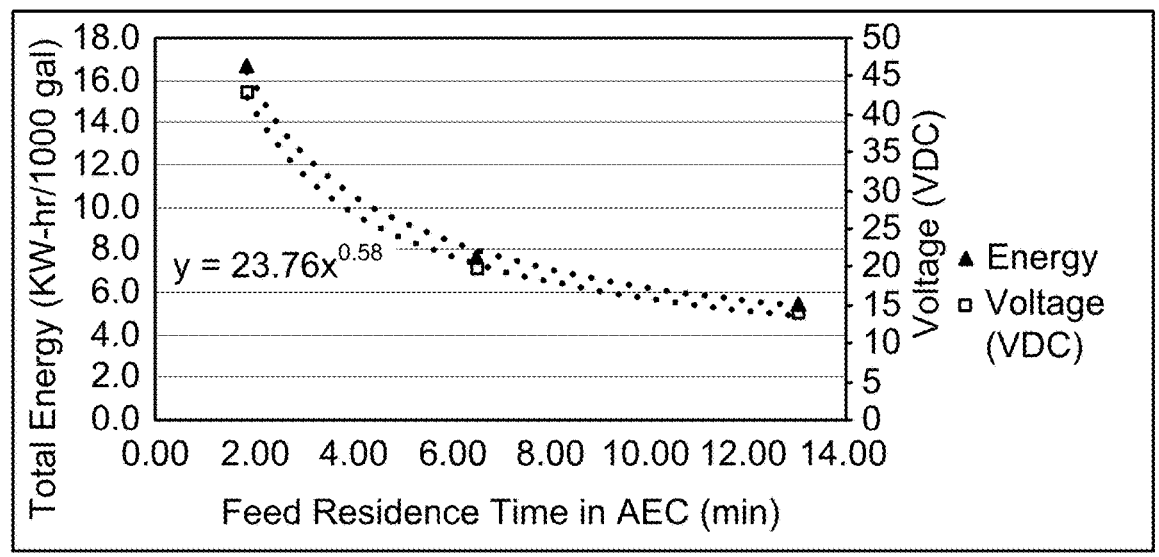
FIG. 29 is a graphic representation of Energy and Voltage as a Function of Feed Residence Time.

The results show that at a constant total current, salt removal was reasonably consistent (68.6 to 76 percent), with total PFOA and PFOS removal ranging from 45.2 to 55.7 percent. The energy required was inversely proportional to the square root of the residence time, as shown in FIG. 29, and the required voltage followed the same relationship.

In this test, at flow cross sectional dimensions of 8.525 mm×50.8 mm, or 4.33 $cm^2$, the flow rates are shown in Table 5-7 as superficial velocity (through empty area). The actual velocity through the chamber is estimated at 30% greater due to the presence of the feed chamber mesh spacer.

TABLE 5-7

Constant Total Current Test Results (Test 2-8)-Activity II

| Test Run | Total PFAS Removal (%) | Salt Removal (%) | Superficial Flow Velocity (cm/min) | Retention Time (min) | Total Current (A-hr/1000 gal) | Energy (KW-hr/1000 gal) | Voltage (VDC) | Current (mA) |
|---|---|---|---|---|---|---|---|---|
| 2-8-1 | 45.2 | 70.67 | 1.15 | 13.1 | 388.6 | 5.4 | 14 | 30.8 |
| 2-8-2 | 42.7 | 68.64 | 2.31 | 6.5 | 386.7 | 7.7 | 20 | 61.3 |
| 2-8-3 | 55.7 | 76.17 | 8.08 | 1.9 | 388.8 | 16.7 | 43 | 215.7 |

Characterization of AEM Residue

During the testing noticeable residue was observed in the AEM chamber after every test. It was believed that this was most likely titanium dioxide produced from titanium eroded from the electrode. Two samples were submitted for scanning electron microscope (SEM) analysis to ascertain the elemental composition. The results are presented in Table 5-6. Sample 1 represents the dried residue (originally pasty consistency) from Run 2-0-11, and Sample 2 represents residue from test run 2-9.

TABLE 5-6

SEM Analytical Results for AEM Chamber Residue

| Element | Units | Sample 1 | Sample 2 |
|---|---|---|---|
| Titanium | Mass % | 63.6 | 73.3 |
| Chloride | Mass % | 1.6 | 3.0 |
| Fluoride | Mass % | 0.6 | trace |
| Oxygen | Mass % | * | * |

*Oxygen was present as a significant component but not quantified.

5.11 Temperature Effects

Figure 30:
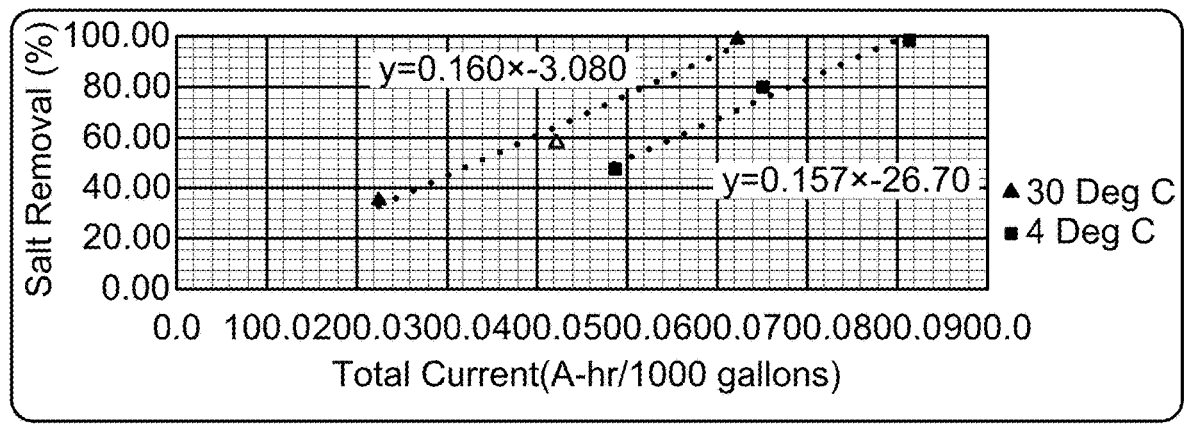
FIG. 30 is a graphic representation of Effect of Temperature on Salt Removal.

The effect of temperature on the removal of salt and PFOA and PFOS was evaluated in Tests 2-3 and 2-7. These two tests were conducted at the same two operating conditions and with an inlet feed salt concentration of 500 uS/cm. The results for salt are presented in FIG. 30. Equations fitting the results of each test are presented on the figure.

Because the trend lines are parallel, the required test current can be adjusted from a known reference current by subtracting 6.423 amps for every 1° C. temperature increase.

Figure 31:
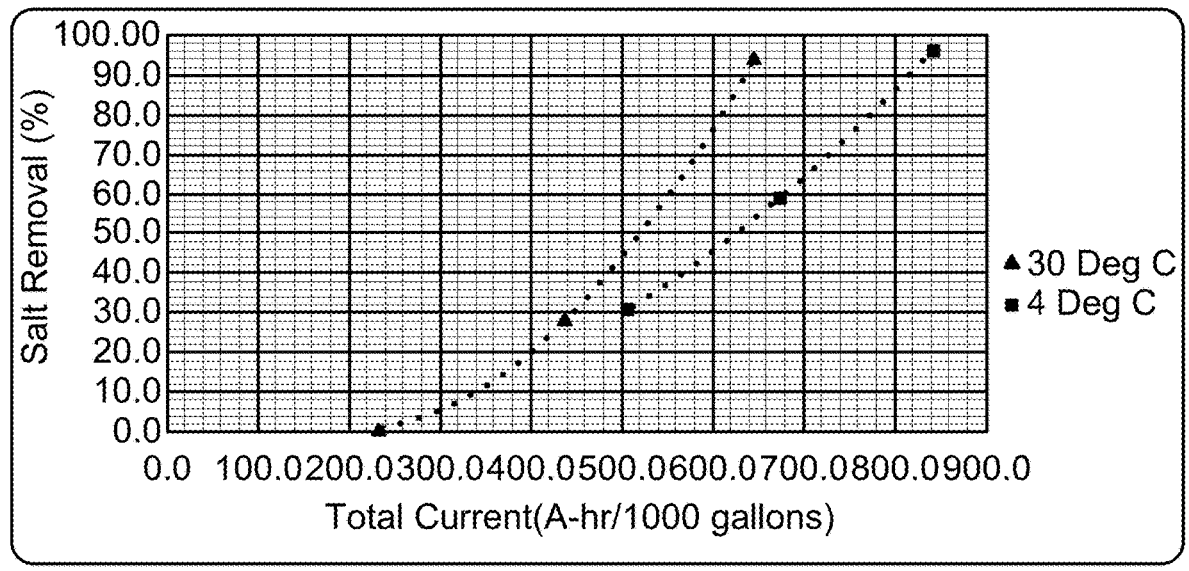
FIG. 31 is a graphic representation of Effect of Temperature on Total PFOA and PFOS Removal.

For total PFOA and PFOS evaluation of required current at different temperatures can be accomplished by interpolation from FIG. 31.

Scale-Up Evaluation

Economics of Phase I Bench Scale Testing

Figure 21:
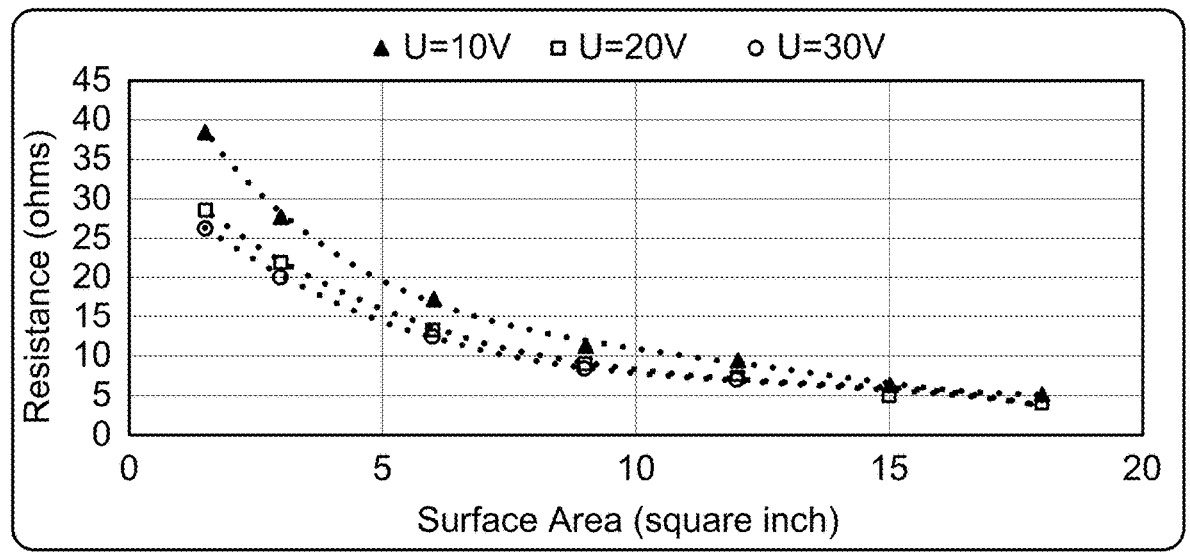
FIG. 21 is a graphic representation of Activity I Average Run Cell Resistance as a Function of Average Feed Conductivity.

At the bench scale the initial primary indication of the AEC's suitability for commercialization is the cost of electrical power required to remove the PFAS. The bench scale AEC system was designed primarily to demonstrate PFAS removal, without considerable consideration of economic optimization. Some changes that will be made to the next level of AEC development will include modifications to promote better electrical efficiency and operational stability, and considerations previously discussed. These will include considerations including minimizing module thickness and associated internal separation distances. Chamber housings will likely be reduced from 5 mm to between 1-2 mm, with much thinner sealing gasket materials used. Additional electrical efficiency will be gained by incorporating a platinum plated anode, and possibly a gold-plated cathode, and utilizing information from FIG. 21 to minimize overall electrical resistance. For example, as noted in FIG. 21, increasing the module electrode area will result in a 2 times reduction in electrical resistance. Further module resistance reduction will be achieved by maintaining a relatively high side chamber (AEM/CEM) conductivity by increasing the feed to side chamber feed flow rate ratio.

In cost discussion it is important to noteμ that the cost results are for a non-optimized system and should be viewed as order-of-magnitude costs. Due to optimization, electrical costs are expected to be lower in subsequent pilot generations of the AEC.

Economics of Batch Operation

Figure 32:
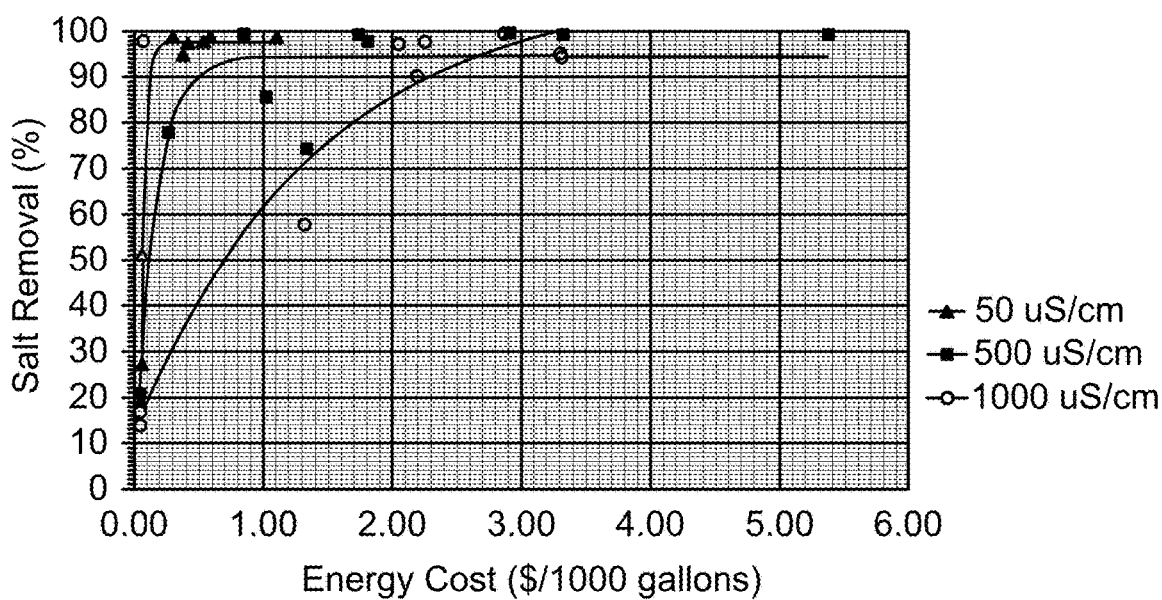
FIG. 32 is a graphic representation of Power Costs Based on Salt Rejection—Batch Testing.
Figure 33:
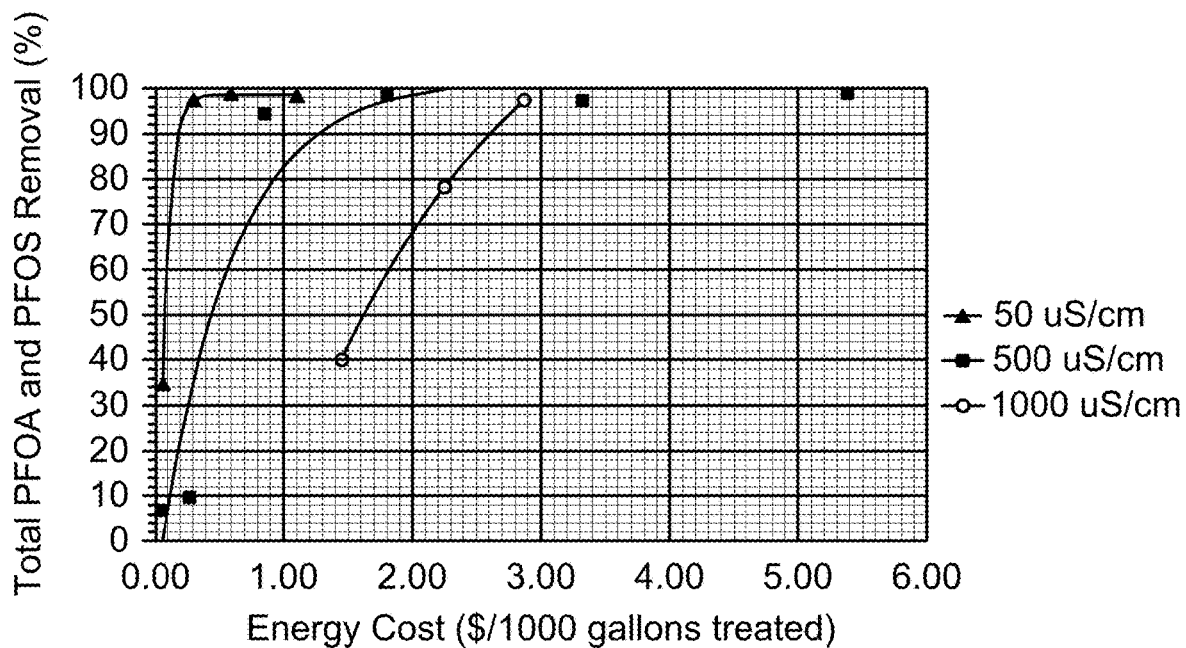
FIG. 33 is a graphic representation of Power Costs Based on PFAS Removal—Flow Through Testing.

Energy costs are presented in FIG. 32 (salt removal) and FIG. 33 (PFOA and PFOS removal) for the Activity I batch testing. Energy costs are presented as a function of salt removal. Power cost was estimated at $0.0718/KW-hr based on July 2019 EIA data for industrial energy cost. On close observation the general trend can be observed. This chart shows that power costs are lower for water feed streams with low conductivities, and increase with increasing inlet feed conductivity. For example, at 50 uS/cm feed conductivity, the power cost for 98% salt removal is in the range of $0.40/1000 gallons, and for 500 uS/cm is $1.75. For 1000 uS/cm the same removal appears to fall around $3-4/1000 gallons as shown in FIG. 32.

FIG. 33 shows that energy costs for PFAS removal (initial concentration 100 ppb PFOA and 100 ppb PFOS) are lower when the feed stream conductivity is lower, and increase with increasing feed conductivity. For example, at 50 uS/cm feed conductivity, the cost for 98% PFAS removal is in the range of $0.30/1000 gallons, and for 500 uS/cm is $1.75. For 1000 uS/cm the same removal appears to fall around $3.00/1000 gallons.

Flow Through Runs

Energy costs for the flow-through AEC operating mode are presented in FIG. 34 (salt removal), with costs presented as a function of percent removal. Energy cost was estimated at $0.0718/KW-hr. On close observation the general trend can be observed. This chart shows that power costs are lower for water feed streams with low conductivities, and increase with increasing feed conductivity. For example, at 150 uS/cm feed conductivity, the cost for 98% conductivity removal is in the range of $2.25/1000 gallons, and for 500 uS/cm is $3.00/1000 gallons. For 1,000 uS/cm the same removal appears to fall around $3.00/1000 gallons.

A semipermeable membrane (SPM) is a barrier that will only allow some molecules to pass through while blocking the passage of other molecules. A semipermeable barrier essentially acts as a filter. Different types of semipermeable membranes can block out different sized molecules. A semipermeable membrane can be made out of biological or synthetic material, The semipermeable membrane is defined by its pore size (to control the size of molecules allowed to pass through the SPM and its oleophilic/hydrophilic and ionic properties. Synthetic membrane can be fabricated from a large number of different materials. It can be made from organic or inorganic materials including solids such as metal or ceramic, homogeneous films (polymers), heterogeneous solids (polymeric mixes, mixed glasses), and liquids. Ceramic membranes are produced from inorganic materials such as aluminum oxides, silicon carbide, and zirconium oxide. Ceramic membranes are very resistant to the action of aggressive media (acids, strong solvents). They are very stable chemically, thermally, and mechanically, and biologically inert. Even though ceramic membranes have a high weight and substantial production costs, they are ecologically friendly and have long working life. Ceramic membranes are generally made as monolithic shapes of tubular capillaries.

Liquid Membranes

Liquid membranes refer to synthetic membranes made of non-rigid materials. Several types of liquid membranes can be encountered in industry: emulsion liquid membranes, immobilized (supported) liquid membranes, molten salts, and hollow-fiber contained liquid membranes. Liquid membranes have been extensively studied but thus far have limited commercial applications. Maintaining adequate long-term stability is the problem, due to the tendency of membrane liquids to evaporate or dissolve in the phases in contact with them.

Polymeric Membranes

Polymeric membranes lead the membrane separation industry market because they are very competitive in performance and economics. Bl Many polymers are available, but the choice of membrane polymer is not a trivial task. A polymer has to have appropriate characteristics for the intended application. The polymer sometimes has to offer a low binding affinity for separated molecules (as in the case of biotechnology applications), and has to withstand the harsh cleaning conditions. It has to be compatible with chosen membrane fabrication technology.[4] The polymer has to be a suitable membrane former in terms of its chains rigidity, chain interactions, stereoregularity, and polarity of its functional groups.[4] The polymers can form amorphous and semicrystalline structures (can also have different glass transition temperatures), affecting the membrane performance characteristics. The polymer has to be obtainable and reasonably priced to comply with the low-cost criteria of membrane separation process. Many membrane polymers are grafted, custom-modified, or produced as co[polymers to improve their properties.[4] The most common polymers in membrane synthesis are cellulose acetate, nitrocellulose and cellulose esters, (CN, and CE), polysulfone, polyether sulfone, polyacrylonitrile, polyamide, polyimide, polyalkylene (polyethyelene and polypropylene), polytetrafluoroethylene, polyvinylidenefluoride and polyvinyl chloride, as well as copolymers of these materials, Polymer membranes may be functionalized into ion exchange membranes by the addition of highly acidic or basic functional groups, e.g. sulfonic acid and quaternary ammonium, enabling the membrane to form water channels and selectively transport cations or anions, respectively. The most important functional materials in this category include proton exchange and alkaline anion exchange membranes, that are at the heart of many technologies in water treatment, energy storage, energy generation. Applications within water treatment include reverse osmosis, electrodialysis, and reversed electrodialysis Ceramic Membranes Ceramic membranes are made from inorganic materials (such as alumina, titania, and zirconia oxides, recrystallized silicon carbide or some glassy materials). By contrast with polymeric membranes, they can be used in separations where aggressive media (acids, strong solvents) are present.

They also have excellent thermal stability which make them usable in high temperature membrane operations.

The invention further includes an apparatus for moderating a concentration of at least highly fluorinated alkyl materials from a contaminated aqueous feed liquid containing an original concentration of between 60 parts per trillion and 300 parts per billion of the at least highly fluorinated materials per liter of water into an aqueous electronic separator, wherein the aqueous electronic separator comprises at least three chambers,
  wherein the at least three chambers comprise:
    a) a feed chamber having a liquid exit port from which a mediated aqueous contaminated feed liquid exits and a liquid input port into which the contaminated aqueous feed liquid enters the feed chamber;
    b) an anodic electrode chamber filled with an aqueous anodic liquid; and
    c) a cathodic electrode chamber filled with an aqueous cathodic liquid;
  wherein the feed chamber is between and adjacent to the anodic electrode chamber and the cathodic electrode chamber and the feed chamber is separated from each of the anodic electrode chamber and the cathodic electrode chamber by at least one semipermeable membrane; and wherein an electrical ground is in connection with the semipermeable membrane. The apparatus may have the ground effected by at least one structure selected from the group consisting of a resistor, a conductive grounding element, a time delay circuit, and a capacitor.

Other variations in the practice of the technology can be exercised using the teachings provided herein.

What is claimed:

1. A method of moderating concentration of at least highly fluorinated alkyl materials comprising poly- and perfluoroalkyl fluorinated alkyl materials from a contaminated aqueous feed liquid containing an original concentration of between 5 parts per trillion and 3000 parts per billion of the at least highly fluorinated alkyl materials in water in an aqueous electronic separator, wherein the aqueous electronic separator comprises at least three chambers,
  wherein the at least three chambers comprise:
    a) a feed chamber having a liquid exit port from which a mediated aqueous contaminated feed liquid exits and a liquid input port into which the contaminated aqueous feed liquid enters the feed chamber;
    b) an anodic electrode chamber filled with an aqueous anodic liquid and having an anodic exchange membrane; and
    c) a cathodic electrode chamber filled with an aqueous cathodic liquid;
  wherein the feed chamber is between and adjacent to the anodic electrode chamber and the cathodic electrode chamber and the feed chamber is separated from the anodic electrode chamber by the anodic exchange membrane and the cathodic electrode chamber is separated from the feed chamber by a cathodic exchange membrane; and
  wherein the process comprises:
    i) feeding the contaminated aqueous feed liquid into the feed chamber through the liquid input port;
    ii) feeding a second aqueous liquid into the anodic electrode chamber in contact with an anodic electrode;
    iii) feeding a third aqueous liquid into the cathodic electrode chamber in contact with a cathodic electrode;
    iv) applying a current between the anodic electrode chamber and the cathodic electrode chamber and across the feed chamber from a first electrode in the anodic electrode chamber to a second electrode in the cathodic electrode chamber;
    v) the current driving an aqueous liquid comprising the at least highly fluorinated alkyl materials from the contaminated aqueous feed liquid into the anodic exchange membrane between the feed chamber and the anodic electrode chamber and thereby forming the mediated aqueous contaminated feed liquid within the feed chamber; and
    vi) removing the mediated aqueous contaminated feed liquid through the liquid exit port with the mediated aqueous contaminated feed liquid having less the original concentration of the at least highly fluorinated alkyl materials per liter of water with at least 80% of the at least highly fluorinated alkyl materials being retained by the anodic exchange membrane,
  wherein a voltage at the anodic exchange membrane is controlled below 2 volts for at least some time during steps ii) through v).

2. The method of claim 1 wherein the anodic exchange membrane is a semipermeable membrane, the highly fluorinated alkyl materials comprise poly- and perfluoroalkyl fluorinated alkyl materials and at least 90% of the poly- and perfluoroalkyl fluorinated alkyl materials being retained by the anodic exchange membrane.

3. The method of claim 2 wherein the anodic exchange membrane restricts passage of the highly fluorinated alkyl materials in the aqueous liquid driven from the contaminated aqueous feed liquid into the semipermeable membrane.

4. The method of claim 3 wherein the anodic electrode and the cathodic electrode comprise a solid plate having a metal surface facing the feed chamber.

5. The method of claim 4 wherein the metal surface comprises a layer of titanium, platinum, or mixed metal oxides.

6. The method of claim 5 wherein the mediated aqueous contaminated feed liquid is withdrawn and the withdrawn liquid from the feed chamber comprises at least 90% less than the original concentration of the at least highly fluorinated alkyl materials per liter of water introduced into the feed chamber.

7. The method of claim 4 wherein liquid from the feed chamber is withdrawn and the withdrawn liquid from the feed chamber comprises less than the original concentration of the at least highly fluorinated alkyl materials per liter of water.

8. The method of claim 3 wherein the current comprises from 0.1-300 milliamps per square centimeter, and when the bulk fluid-membrane interface resistance becomes elevated, and excess charge accumulates at an interface between the anodic exchange membrane and the feed chamber, some of the excess charge is removed by an electrical circuit.

9. The method of claim 3 wherein the contaminated aqueous feed liquid has a direction of movement from the liquid input port to the liquid exit port and the current is applied approximately perpendicular to that direction of movement.

10. The method of claim 3 wherein when a bulk fluid-membrane interface resistance becomes elevated, and excess charge accumulates at an interface between the anodic exchange membrane and the feed chamber, some of the excess charge is removed by an electrical circuit.

11. The method of claim 1 wherein the anodic electrode and the cathodic electrode comprise a solid plate having a metal surface facing the feed chamber, and at least 95% of the at least highly fluorinated materials being retained by the anodic exchange membrane.

12. The method of claim 11 wherein the metal surface comprises a layer of titanium, platinum, or mixed metal oxides.

13. The method of claim 1 wherein the current comprises from 0.1-300 milliamps per square centimeter.

14. The method of claim 1 wherein liquid from the anodic electrode chamber is withdrawn separately from removal of the mediated aqueous contaminated feed liquid.

15. The method of claim 1 wherein voltage control at a surface of the semipermeable membrane is effected by at least one structure selected from the group consisting of a resistor, a conductive grounding element, a time delay circuit, and a capacitor maintaining surface voltage at the surface of the membrane at no more than 2 volts.

16. A method of moderating concentration of at least highly fluorinated alkyl materials comprising poly- and perfluoroalkyl fluorinated alkyl materials from a contaminated aqueous feed liquid containing less than the original composition of the at least highly fluorinated alkyl materials per liter of water into an aqueous electronic separator, wherein the aqueous electronic separator comprises at least three chambers,
  wherein the at least three chambers comprise:
    a) a feed chamber having a liquid exit port from which a mediated aqueous contaminated feed liquid exits and a liquid input port into which the contaminated aqueous feed liquid enters the feed chamber;
    b) an anodic electrode chamber filled with an aqueous anodic liquid; and
    c) a cathodic electrode chamber filled with an aqueous cathodic liquid;
  wherein the feed chamber is between and adjacent to the anodic electrode chamber and the cathodic electrode chamber and the feed chamber is separated from each of the anodic electrode chamber and the cathodic electrode chamber by at least one semipermeable membrane;
  and wherein the process comprises:
    d) feeding the contaminated aqueous feed liquid into the feed chamber through the liquid input port;
    e) applying a current between the anodic electrode chamber and the cathodic electrode chamber and across the feed chamber from a first electrode in the anodic electrode chamber to a second electrode in the cathodic electrode chamber;
    f) the current driving contaminated aqueous feed liquid comprising the at least highly fluorinated alkyl materials from the contaminated aqueous feed liquid into the at least one semipermeable membrane between the feed chamber and the anodic electrode chamber and thereby forming the mediated aqueous contaminated feed liquid within the feed chamber with at least 80% of the at least highly fluorinated alkyl materials being retained by the at least one semipermeable membrane; and
  removing the mediated aqueous contaminated feed liquid through the liquid exit port with the mediated aqueous contaminated feed liquid having less than the concentration of the at least highly fluorinated alkyl materials per liter of water in the contaminated aqueous feed liquid;
  wherein an anodic electrode in the anodic electrode chamber and a cathodic electrode in the cathodic electrode chamber are solid plates having a metal surface thereon, and the current comprises from 5-250 milliamps per square centimeter, and wherein the contaminated aqueous feed liquid comprises the mediated aqueous contaminated feed liquid of claim 1.

17. A method of moderating concentration of at least highly fluorinated alkyl materials comprising poly- and perfluoroalkyl fluorinated alkyl materials from a contaminated aqueous feed liquid containing an original concentration of as little as 5 parts per trillion of the at least highly fluorinated alkyl materials per liter of water into an aqueous electronic separator, wherein the aqueous electronic separator comprises at least three chambers,
  wherein the at least three chambers comprise:
    a) a feed chamber having a liquid exit port from which a mediated aqueous contaminated feed liquid exits and a liquid input port into which the contaminated aqueous feed liquid enters the feed chamber;
    b) an anodic electrode chamber filled with an aqueous anodic liquid; and
    c) a cathodic electrode chamber filled with an aqueous cathodic liquid;
  wherein the feed chamber is between and adjacent to the anodic electrode chamber and the cathodic electrode chamber and the feed chamber is separated from the anodic electrode chamber by an anodic exchange membrane and the cathodic electrode chamber is separated from the feed chamber by at least one cathodic exchange membrane which is a semipermeable membrane; and wherein the process comprises:
    i) feeding the contaminated aqueous feed liquid into the feed chamber through the liquid input port;
    ii) feeding a second aqueous liquid into the anodic electrode chamber in contact with an anodic electrode;
    iii) feeding a third aqueous liquid into the cathodic electrode chamber in contact with a cathodic electrode;
    iv) applying a current between the anodic electrode chamber and the cathodic electrode chamber and across the feed chamber from a first electrode in the anodic electrode chamber to a second electrode in the cathodic electrode chamber;
    v) the current driving the contaminated aqueous feed liquid comprising the at least highly fluorinated alkyl materials from the contaminated aqueous feed liquid into the anodic exchange membrane between the feed chamber and the anodic electrode chamber and into the second aqueous liquid thereby forming the mediated aqueous contaminated feed liquid within the feed chamber, and at least 70% of the at least highly fluorinated alkyl materials being retained by the anodic exchange membrane at a flow rate of between 1-100 liters/minute; and
    vi) removing the mediated aqueous contaminated feed liquid through the liquid exit port;
  wherein the anodic electrode and the cathodic electrode are solid plates having a metal surface thereon, and the current comprises from 5-250 milliamps per square centimeter, and an electronic voltage control is engaged with the anodic exchange membrane at least some time between steps iii) and v).

18. The method of claim 17 wherein voltage control at a surface of the semipermeable membrane is effected by at least one structure selected from the group consisting of a resistor, a conductive grounding element, a time delay circuit, and a capacitor maintaining surface voltage at the surface of the membrane at no more than 2 volts, and when a bulk fluid-membrane interface resistance becomes elevated, and excess charge accumulates at an interface between the semipermeable membrane and the feed chamber, some of the excess charge is removed by an electrical circuit.

19. A method for moderating a concentration of at least highly fluorinated alkyl materials comprising poly- and perfluoroalkyl fluorinated alkyl materials from a contaminated aqueous feed liquid containing an original concentration of at least 5 parts per trillion of at least highly fluorinated alkyl materials per liter of water into an aqueous electronic separator, wherein the aqueous electronic separator comprises:
- a) a feed chamber having a liquid exit port from which a mediated aqueous contaminated feed liquid exits and a liquid input port into which the contaminated aqueous feed liquid enters the feed chamber;
- b) an anodic electrode chamber filled with an aqueous anodic liquid;
- c) an anode and a cathode on opposed sides of liquid flow within the aqueous electronic separator;

wherein the feed chamber is between and adjacent to the anodic electrode chamber and the feed chamber is separated from each of the anode and the cathode by at least one semipermeable membrane; and wherein an electrical voltage control system is in connection with the anode and cathode;

wherein the at least one semipermeable membrane is configured to capture at least 70% of the at least highly fluorinated alkyl materials so that it is retained by the at least onesemipermeable membrane from the contaminated aqueous feed liquid as it passes, under voltage, in the feed chamber towards the anode;

the method comprising:
- d) applying a current between the anode and cathode and across the feed chamber between the anode to the cathode;
- e) the current driving the contaminated aqueous feed liquid comprising the at least highly fluorinated alkyl materials from the feed liquid into the semipermeable membrane between the feed chamber and the anodic electrode chamber and thereby forming the mediated aqueous contaminated feed liquid within the feed chamber with at least 80% of the at least highly fluorinated alkyl materials being retained by the at least one semipermeable membrane; and
- f) removing the mediated aqueous contaminated feed liquid through the liquid exit port with the mediated aqueous contaminated feed liquid having less than the original concentration of the at least highly fluorinated alkyl materials per liter of water in the contaminated aqueous feed liquid.

* * * * *